US006933032B2

(12) United States Patent
Sasa et al.

(10) Patent No.: US 6,933,032 B2
(45) Date of Patent: Aug. 23, 2005

(54) WRITE-ONCE-READ-MANY OPTICAL RECORDING MEDIA AND PROCESS FOR RECORDING AND REPRODUCING INFORMATION ON THE MEDIA

(75) Inventors: Noboru Sasa, Kanagawa (JP); Yoshitaka Hayashi, Kanagawa (JP); Hirotaka Komoda, Osaka (JP); Atsuyuki Watada, Shizuoka (JP); Kawori Tanaka, Kanagawa (JP); Toshishige Fujii, Kanagawa (JP); Hisamitsu Kamezaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/824,227

(22) Filed: Apr. 14, 2004

(65) Prior Publication Data

US 2004/0265532 A1 Dec. 30, 2004

(30) Foreign Application Priority Data

| Apr. 15, 2003 | (JP) | 2003-110867 |
| Apr. 16, 2003 | (JP) | 2003-112141 |
| Aug. 7, 2003 | (JP) | 2003-289428 |
| Sep. 9, 2003 | (JP) | 2003-317578 |
| Nov. 14, 2003 | (JP) | 2003-385810 |
| Mar. 8, 2004 | (JP) | 2004-064452 |
| Mar. 9, 2004 | (JP) | 2004-066210 |

(51) Int. Cl.$^7$ ............................................. B32B 3/02

(52) U.S. Cl. ................ 428/64.1; 428/64.4; 428/64.8; 430/270.12; 430/270.14

(58) Field of Search ............................. 428/64.1, 64.4, 428/64.5, 64.8; 430/270.12, 270.14

(56) References Cited

U.S. PATENT DOCUMENTS

| 4,370,391 | A | | 1/1983 | Mori et al. |
| 4,763,139 | A | | 8/1988 | Itoh et al. |
| 4,916,048 | A | | 4/1990 | Yamada et al. |
| 5,677,025 | A | | 10/1997 | Tomura et al. |
| 5,785,828 | A | | 7/1998 | Yamada et al. |
| 5,837,424 | A | * | 11/1998 | Chaiken et al. ......... 430/270.12 |
| 5,863,703 | A | | 1/1999 | Tomura et al. |
| 5,882,493 | A | | 3/1999 | Iwasaki et al. |
| 5,939,163 | A | | 8/1999 | Ueno et al. |
| 5,998,093 | A | | 12/1999 | Tomura et al. |
| 6,057,020 | A | | 5/2000 | Ueno et al. |
| 6,127,016 | A | | 10/2000 | Yamada et al. |
| 6,197,477 | B1 | | 3/2001 | Satoh et al. |
| 6,225,022 | B1 | | 5/2001 | Tomura et al. |
| 6,280,684 | B1 | | 8/2001 | Yamada et al. |
| 6,503,592 | B1 | | 1/2003 | Yamada et al. |
| 6,558,768 | B2 | | 5/2003 | Noguchi et al. |
| 6,628,595 | B1 | | 9/2003 | Sasa et al. |
| 6,741,547 | B2 | | 5/2004 | Tomura et al. |
| 6,762,008 | B2 | | 7/2004 | Satoh et al. |

(Continued)

FOREIGN PATENT DOCUMENTS

| DE | 3336445 A1 | 4/1984 |
| EP | 0045183 A2 | 2/1982 |
| EP | 0474311 A1 | 3/1992 |
| GB | 1563513 | 3/1980 |
| JP | 07304258 | 11/1995 |
| JP | 08083439 | 3/1996 |
| JP | 2506374 | 4/1996 |
| JP | 08138245 | 5/1996 |
| JP | 08297838 | 11/1996 |
| JP | 2591939 | 12/1996 |
| JP | 2591940 | 12/1996 |
| JP | 2591941 | 12/1996 |
| JP | 09198714 | 7/1997 |
| JP | 09265660 | 10/1997 |
| JP | 10124926 | 5/1998 |
| JP | 10134415 | 5/1998 |
| JP | 11058955 | 3/1999 |
| JP | 11221964 | 8/1999 |
| JP | 2982925 | 9/1999 |
| JP | 11306591 | 11/1999 |
| JP | 11334206 | 12/1999 |
| JP | 2000043423 | 2/2000 |
| JP | 2000108513 | 4/2000 |
| JP | 2000113504 | 4/2000 |
| JP | 2000149320 | 5/2000 |
| JP | 2000158818 | 6/2000 |
| JP | 2000218940 | 8/2000 |
| JP | 2000222771 | 8/2000 |
| JP | 2000222772 | 8/2000 |
| JP | 2000280620 | 10/2000 |
| JP | 2000280621 | 10/2000 |
| JP | 2000335110 | 12/2000 |
| JP | 2000343824 | 12/2000 |
| JP | 2000343825 | 12/2000 |
| JP | 2001039034 | 2/2001 |
| JP | 2001146074 | 5/2001 |
| JP | 2001158865 | 6/2001 |
| JP | 2001181524 | 7/2001 |
| JP | 2001184647 | 7/2001 |
| JP | 2002025114 | 1/2002 |
| JP | 2002083445 | 3/2002 |
| JP | 2002334438 | 11/2002 |
| JP | 2002352428 | 12/2002 |
| JP | 2002352429 | 12/2002 |
| JP | 2002367182 | 12/2002 |

*Primary Examiner*—Elizabeth Mulvaney
(74) *Attorney, Agent, or Firm*—Cooper & Dunham LLP

(57) ABSTRACT

For recording information at high density even at blue-laser wavelengths, a write-once-read-many optical recording medium includes a first inorganic thin film and at least one of a second inorganic thin film and an organic thin film, in which the first inorganic thin film contains at least "R" and "O," wherein "R" is at least one selected from Y, Bi, In, Mo, V and lanthanum series elements; and "O" is oxygen atom, and the second inorganic thin film and the organic thin film are capable of suppressing at least one of deformation and breakage of the first inorganic thin film and receiving the change of state of the first inorganic thin film.

43 Claims, 37 Drawing Sheets

U.S. PATENT DOCUMENTS

| | | |
|---|---|---|
| 2002/0098445 A1 | 7/2002 | Harigaya et al. |
| 2002/0182365 A1 | 12/2002 | Kamezaki et al. |
| 2003/0007448 A1 | 1/2003 | Kamezaki et al. |
| 2003/0048726 A1 | 3/2003 | Sasa |
| 2003/0053501 A1 | 3/2003 | Sekiya et al. |
| 2003/0059695 A1 | 3/2003 | Li et al. |
| 2003/0218941 A1 * | 11/2003 | Terao et al. ............. 369/13.01 |
| 2003/0224136 A1 | 12/2003 | Kamezaki et al. |
| 2004/0027959 A1 | 2/2004 | Sasa et al. |
| 2004/0241376 A1 * | 12/2004 | Chen et al. ................ 428/64.4 |

* cited by examiner

FIG. 5
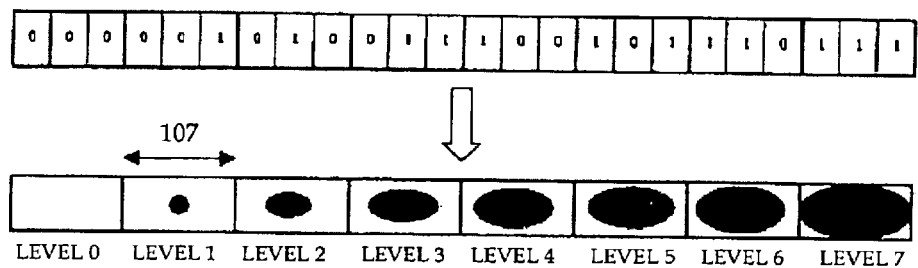
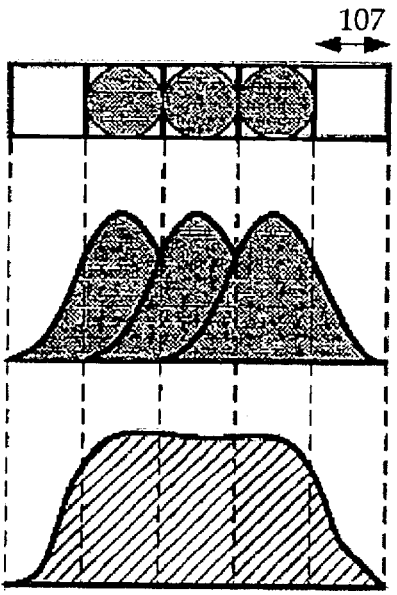
FIG. 6A
FIG. 6B
FIG. 6C

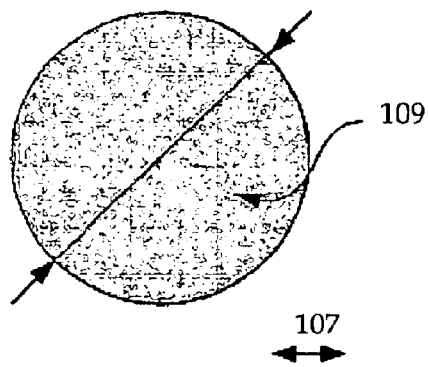
FIG. 7O
FIG. 7A
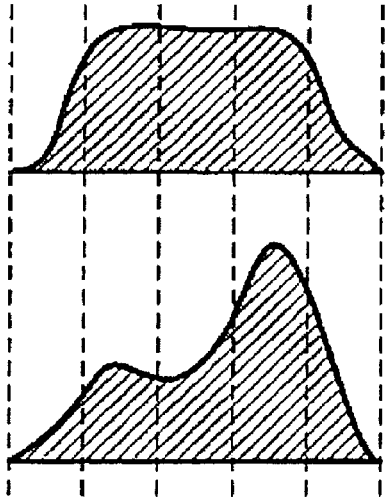
FIG. 7B
FIG. 7C
FIG. 7D
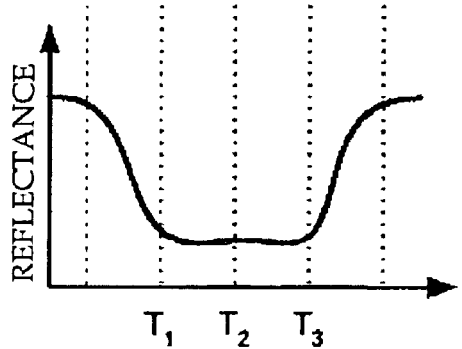
FIG. 7E

WRITE-ONCE-READ-MANY OPTICAL RECORDING MEDIA AND PROCESS FOR RECORDING AND REPRODUCING INFORMATION ON THE MEDIA

BACKGROUND OF THE INVENTION

1. Field of the Invention

The present invention relates to write-once-read-many (WORM) optical recording media. More specifically, it relates to write-once-read-many optical recording media on which information can be recorded at a high density even at blue-laser wavelengths and to processes for recording and/or reproducing information on the write-once-read-many optical recording media.

2. Description of the Related Art
1. Write-once-read-many Optical Recording Media Sensitive to Blue-laser Wavelengths or Shorter With an increasing development of blue laser capable of recording of information at a very high density, write-once-read-many optical recording media sensitive to blue-laser wavelengths have been increasingly developed.

In conventional write-once-read-many optical recording media, laser beams are irradiated to a recording layer comprising an organic material to change the refractive index typically due to the decomposition and degeneration of the organic material, and thus recording pits are formed. The optical constant and decomposition behavior of the organic material used in the recording layer play an important role to form satisfactory recording pits.

For use in a recording layer of write-once-read-many optical recording media sensitive to blue-laser wavelengths, an organic material must have suitable optical properties and decomposition behavior with respect to light at blue-laser wavelengths. More specifically, the wavelengths at which recording and reproduction is performed (hereinafter briefly referred to as "recording-reproducing wavelengths") are set at a tail on the longer-wavelength side of a major absorption band to increase the reflectance in unrecorded areas and to increase the change in refractive index caused by the decomposition of the organic material upon irradiation of laser to thereby yield a higher degree of modulation. This is because wavelengths at the tail on the longer-wavelength side of a major absorption band of such an organic material yield an appropriate absorption coefficient and a high refractive index. With reference to FIG. 1, a conventional write-once-read-many optical recording medium using an organic material in its recording layer has recording-reproducing wavelengths in the diagonally shaded area in FIG. 1.

However, no organic material having optical properties with respect to light at blue-laser wavelengths equivalent to those of conventional materials has not yet been found. To produce such an organic material having an absorption band in the vicinity of blue-laser wavelengths, the molecular skeleton must be downsized or the conjugate system must be shortened. However, this invites a decreased absorption coefficient and a decreased refractive index.

More specifically, there are many organic materials having an absorption band in the vicinity of blue-laser wavelengths, but they do not have a sufficiently high refractive index and fail to yield a high degree of modulation.

On conventional write-once-read-many optical recording media, information is recorded by the mechanism of deformation of a substrate as well as by change in refractive index due to decomposition and deformation of the organic material. For example, FIG. 3 illustrates a recorded area 101 on a substrate of a commercially available DVD-R medium observed by an atomic force microscope (AFM), showing that the substrate 105 deforms toward the reflective layer 103, which deformation leads to modulation Examples of organic materials sensitive to blue-laser wavelengths can be found in Japanese Patent Application Laid-Open (JP-A) No. 2001-181524, No. 2001-158865, No. 2000-343824, No. 2000-343825, and No. 2000-335110.

However, these publications only teach the spectra of a solution of an organic material and a thin film prepared therefrom in their examples and fail to teach recording and/or reproducing information using the materials.

JP-A No. 11-221964, No. 11-334206, and No. 2000-43423 mention recording using an organic material in their examples but information is recorded at a wavelength of 488 nm. They only describe that satisfactory recording pits are formed and fail to teach the recording conditions and recording densities.

JP-A No. 11-58955 mention recording using an organic material in the examples but information is recorded at a wavelength of 430 nm. It only describes that a satisfactory degree of modulation is obtained and fails to teach the recording conditions and recording densities.

JP-A No. 2001-39034, No. 2000-149320, No. 2000-113504, No. 2000-108513, No. 2000-222772, No. 2000-218940, No. 2000-222771, No. 2000-158818, No. 2000-280621, and No. 2000-280620 mention recording using an organic material at a wavelength of 430 nm and a numerical aperture NA of 0.65. However, the information is recorded at a low recording density in terms of a minimum pit of 0.4 $\mu$m, equivalent to that in DVD media.

JP-A No. 2001-146074 describes recording and/or reproducing at a wavelength of 405 to 408 nm but fails to teach a specific recording density. The recording herein is performed at a low density in which 14T-FEM signals are recorded.

The optical constants of the organic materials disclosed in the above publications at wavelengths around 405 nm, which is the center emitting wavelength of blue semiconductor laser now in practical use, are not equivalent to the required optical constant for recording layers of conventional write-once-read-many optical recording media. The publications fail to disclose examples in which information is recorded at a wavelength around 405 nm at a recording density higher than that in DVD media under specific conditions and fail to teach whether or not information can be recorded at a high density of 15 to 25 GB. In addition, most of the examples in the publications are performed using media of conventional configuration comprising a substrate, an organic material layer and a reflective layer, and colorants to be used therein must have optical properties and functions the same as conventional equivalents.

Such conventional write-once-read-many optical recording media can use only organic materials having a high refractive index and a relatively low absorption coefficient of about 0.05 to about 0.10 for ensuring a satisfactorily high degree of modulation and reflectance.

These conventional write-once-read-many optical recording media using organic materials have a major absorption band in the vicinity of the recording-reproducing wavelengths, thereby have a significantly varying optical constant depending on the wavelength, namely, show a large dependency on wavelength of the optical constant as shown in FIG. 2. They significantly change their recording properties such as recording sensitivity, degree of modulation, jitter and error rate as well as reflectance with varying recording-reproducing wavelengths due to individual difference of the laser or a varying environmental temperature.

The organic materials have insufficient absorptivity to the recording light, the thickness of the resulting organic layer cannot be reduced so much, and a substrate having deep grooves must be used. In this connection, a layer of an organic material is generally formed by spin coating, and such deep grooves are filled with the organic material to form a thick layer of the organic material. Such a substrate having deep grooves is difficult to prepare, and the resulting optical recording medium may have deteriorated quality.

In addition, such a large thickness of the organic material layer leads to a narrow recording power margin and other margins in recording-reproducing properties.

Examples of techniques on layer configurations and recording processes different from those of conventional CD media and DVD media can be found as follows.

JP-A No. 07-304258 discloses a technique for recording information on a medium comprising a substrate, a layer containing a saturable absorption colorant and a reflective layer in this order based on the change of the extinction coefficient (the "absorption coefficient" as used in the present invention) of the saturable absorption colorant.

JP-A No. 08-83439 discloses a technique for recording information on a medium comprising a substrate, a metal deposition layer, a light-absorptive layer and a protective sheet arranged in this order based on the discoloration or deformation of the metal deposition layer by action of heat generated from the light-absorptive layer.

JP-A No. 08-138245 discloses a technique for recording information on a medium comprising a substrate, a dielectric layer, a recording layer containing a photoabsorption material, and a reflective layer arranged in this order by changing the thickness of the recording layer to thereby change the thickness of the grooves.

JP-A No. 08-297838 discloses a technique for recording information on a medium comprising a substrate, a recording layer containing a photoabsorption material and a metal reflective layer arranged in this order by changing the thickness of the recording layer by a factor of 10 percent to 30 percent.

JP-A No. 09-198714 discloses a technique for recording information on a medium comprising a substrate, a recording layer containing an organic colorant, a metal reflective layer and a protective layer arranged in this order by increasing the groove width of the substrate broader than an unrecorded area by a factor of 20 percent to 40 percent.

Japanese Patent (JP-B) No. 2506374 discloses a technique for recording information on a medium comprising a substrate, an interlayer, and a metal thin film arranged in this order by deforming the metal thin layer to thereby form bubbles.

JP-B No. 2591939 discloses a technique for recording information on a medium comprising a substrate, a light-absorptive layer, an auxiliary recording layer and an optical reflective layer by deforming the auxiliary recording layer to a concave shape and deforming the optical reflective layer to a concave shape along the deformation of the auxiliary recording layer.

JP-B No. 2591940 discloses a technique for recording information on a medium comprising a substrate, a light-absorptive layer, a porous auxiliary recording layer and an optical reflective layer or comprising a substrate, a porous auxiliary recording layer, a light-absorptive layer and a reflective layer by deforming the auxiliary recording layer to a concave shape and deforming the reflective layer to a concave shape along the deformation of the auxiliary recording layer.

JP-B No. 2591941 discloses a technique for recording information on a medium comprising a substrate, a porous light-absorptive layer, and a reflective layer arranged in this order by deforming the light-absorptive layer to a concave shape and deforming the reflective layer to a concave shape along the deformation of the auxiliary recording layer.

JP-B No. 2982925 discloses a technique for recording information on a medium comprising a substrate, a recording layer containing an organic colorant and an auxiliary recording layer arranged in this order by allowing the auxiliary recording layer to mix with the organic colorant to thereby shift the absorption spectrum of the organic colorant to a shorter wavelength.

JP-A No. 09-265660 discloses a technique for recording information on a medium comprising a substrate, a multi-function layer having functions as a reflective layer and a recording layer, and a protective layer arranged in this order by forming a bump between the substrate and the multi-function layer. The publication specifies metals such as nickel, chromium and titanium and alloys of these metals as the material for the multi-function layer.

JP-A No. 10-134415 discloses a technique for recording information on a medium comprising a substrate, a metal thin layer, a deformable buffer layer, a reflective layer and a protective layer arranged in this order by deforming the substrate and the metal thin layer and reducing the thickness of the buffer layer in the deformed portion. The publication specifies metals such as nickel, chromium and titanium and alloys of these metals as the material for the metal thin layer and describes that a resin which is deformable and has an appropriate flowability is used in the buffer layer, which buffer layer may further comprise a colorant to accelerate the deformation.

JP-A No. 11-306591 discloses a technique for recording information on a medium comprising a substrate, a metal thin layer, a buffer layer and a reflective layer arranged in this order by deforming the substrate and the metal thin layer and changing the thickness and optical constant of the buffer layer in the deformed portion. The publication describes that a metal such as nickel, chromium or titanium or an alloy thereof is preferably used in the metal thin layer and that the buffer layer comprises a mixture of a colorant and an organic polymer, which colorant has a large absorption band in the vicinity of the recording-reproducing wavelengths.

JP-A No. 10-124926 discloses a technique for recording information on a medium comprising a substrate, a metal recording layer, a buffer layer and a reflective layer arranged in this order by deforming the substrate and the metal recording layer and changing the thickness and optical constant of the buffer layer in the deformed portion. The publication describes that a metal such as nickel, chromium or titanium or an alloy thereof is preferably used in the metal recording layer and that the buffer layer comprises a mixture of a colorant and a resin, which colorant has a great absorption band in the vicinity of the recording-reproducing wavelengths.

These conventional techniques do not intend to provide optical recording media sensitive to blue-laser wavelengths and do not teach layer configurations and recording processes usable at blue-laser wavelengths. In addition, according to the conventional techniques, the colorant in the recording layer must be capable of absorbing light and must have a major absorption band in the vicinity of the recording-reproducing wavelengths, thus the types of colorants to be used are severely restricted.

Most of the conventional techniques record information typically by mechanism of deformation. If information is recorded mainly by mechanism of deformation, the interference among recording marks increases and thereby margins in recording and/or reproducing properties decrease, even though a satisfactory low jitter and a high degree of modulation are obtained.

As a write-once-read-many optical recording medium according to "diffusion system", for example, TDK Corporation has announced a medium having a configuration of a substrate, ZnS—SiO$_2$, Si, Cu, ZnS—SiO$_2$ and Ag arranged in this order in CEATEC JAPAN 2003. The company has reported that the write-once-read-many optical recording medium has a degree of modulation of 65%, a jitter of 6% and a reflectance of 14%. An additional test made by the present inventors has revealed that when Si and Cu are arranged in adjacent layers, they gradually diffuse into another layer during storage and the recording medium shows deteriorated properties. This is a disadvantage of a medium in which components of two layers diffuse into and mix with each other. The medium requires two layers of a dielectric layer comprising ZnS—SiO$_2$ to yield a satisfactorily high degree of modulation and requires many processes and high cost.

Thus, these conventional technologies are insufficient to provide write-once-read-many optical recording media sensitive to blue-laser wavelengths and do not teach layer configurations and recording processes usable at blue-laser wavelengths.

2. Multi-level Recordable Write-once-read-many Optical Recording Media

To increase the recording capacity, multi-level recording techniques have been developed. Recent home users generally treat large-capacity audio data and image-motion picture data, and the capacity of hard disks have increased. However, current CD or DVD optical recording media cannot provide sufficiently high recording capacities.

Under these circumstances, the ML (trademark; Multi Level) Technology has been proposed by Calimetrics, Inc. (CA) as a recording technique to increase conventional optical recording media. In short, the recording linear density is increased according to the ML Technology.

In the conventional CD or DVD optical recording media, the position or length of each recording mark edge varies corresponding to a target data message in recording, and the length of the recording mark is determined in reproduction (slice system). The current slice system will be illustrated in short below.

With reference to FIG. 4, a recording mark row (c) is initially formed on an optical recording medium using a recording waveform (b) corresponding to a target recording data (a).

Reproducing light is applied to the recording mark row (c) recorded on the optical recording medium to reproduce the information to thereby yield a reproducing signal waveform (d).

The reproducing signal waveform (d) is a dull waveform different from the recording waveform (b), a rectangular pulse, and is thereby formatted using an equalizer to yield an equalized waveform (e). More specifically, high-frequency components of the reproducing signal are amplified.

Next, the point of intersection of the equalized waveform (e) and the threshold is detected. A binary data (f) is then outputted as one (1) when the point of intersection is detected within the window and as zero (0) when it is not detected. The binary data (f) obtained by the detection of point of intersection is converted according to a non-return-to-zero (NRZ) procedure to thereby yield a decoded data (g).

In contrast, according to the multi-level recording, a mark having a reflectance at multiple levels is recorded in a fixed-length area "cell", and the information is indicated by the multi-level reflectance. More specifically, one bit is indicated by the presence or absence of a recording mark in the conventional CD or DVD optical recording media. In contrast, recording marks are recorded at, for example, eight different levels of size and is read out as reflectance at eight different levels (FIG. 5). One recording mark indicates information corresponding to three bits, and the recording density can thereby be increased. Here, bidirectional arrow 107 indicates the size of each cell.

In the multi-level recording, the beam spot diameter of laser light in reproduction is generally larger than the cell length, and one recording mark indicates information corresponding to three bits. Thus, the recording linear density can be increased to thereby increase the recording capacity without narrowing the track pitch.

Examples of such multi-level recordable write-once-read-many optical recording media can be found in JP-A No. 2001-184647, No. 2002-25114, No. 2002-83445, No. 2002-334438, No. 2002-352428, No. 2002-352429 and No. 2002-367182. JP-A No. 2001-184647 discloses a concept of multi-level recording on an optical recording medium having a recording layer comprising an organic colorant and a concept of multi-level recording on the optical recording medium in a depth direction of the recording layer. However, this technique intends to provide a multi-level recordable write-once-read-many optical recording medium sensitive to red laser wavelengths, whose layer configuration and organic colorant used are the same as those of conventional CD or DVD write-once-read-many optical recording media.

Aforementioned JP-A No. 2002-25114 discloses a multi-level recordable optical recording medium including a substrate and a recording layer of an organic colorant, which substrate has a specific glass transition point, reflectance and thermal conductivity.

Aforementioned JP-A No. 2002-83445 discloses a multi-level recordable optical recording medium including a recording layer comprising an organic colorant, which organic colorant has specific thermal decomposition properties.

Aforementioned JP-A No. 2002-334438 and No. 2002-352428 each disclose a multi-level recordable optical recording medium having a recording layer comprising phthalocyanine or cyanine colorant, in which the relationships among the wavelength, numeral aperture NA and groove width are specified.

Aforementioned JP-A No. 2002-352429 discloses a multi-level recordable optical recording medium having a recording layer comprising an organic colorant, in which the relationship between the thickness of the recording layer on a groove and the groove depth is specified.

Aforementioned JP-A No. 2002-367182 discloses a multi-level recordable optical recording medium having a recording layer comprising an organic colorant, in which the reflectance in an unrecorded area is specified within a range of 40% to 80%.

To record information at a higher density, the cell length in the multi-level recording must be reduced to the same level as the minimum mark length in the conventional binary recording. Namely, the minimum mark in the multi-level recording is much shorter (smaller) than the minimum mark in the binary recording.

If multi-level recording can be performed at a sufficiently high density using a conventional recording material with a conventional layer configuration, this means that the minimum mark would be shortened even using the conventional recording material with a conventional layer configuration and means that the minimum mark length could be reduced in the binary recording and information could be recorded at a higher density. However, the recording density in the conventional binary recording technique cannot be actually increased unless a special recording-reproducing system is employed.

To provide multi-level recordable write-once-read-many optical recording media which are recordable at a higher density than conventional equivalents according to the binary recording, novel recording materials and layer configuration must be developed.

However, the aforementioned conventional technologies employ conventional recording materials and layer configurations in multi-level recording, although some of conditions such as the thickness of the recording layer and the material of the reflective layer are slightly modified. They cannot form shorter recording marks than conventional equivalents and cannot record and reproduce recording marks much smaller than conventional equivalents with a higher reliability. In short, they only achieve the reproduction of a somewhat smaller recording mark with good reliability by action of the recording and reproducing techniques, and simply apply the recording and reproducing techniques to write-once-read-many optical recording media.

In addition, the conventional techniques form recording marks typically by means of deformation (FIG. 3). The deformation presents no problem when the pitch between recording marks is sufficiently long, i.e., the recording linear density is low, or when the length of a cell in which a multi-level record is formed is not longer than the beam diameter of the reproducing light. However, the deformations interfere with each other and the interference becomes nonlinear when the recording linear density is high or when the length of a cell in which a multi-level record is formed is longer than the beam diameter of the reproducing light.

The phrase "the interference is linear" means that the deformation as a result of interference has a shape substantially indicated by the sum of the deformation in a cell and the deformation of an adjacent cell. FIGS. 6A, 6B and 6C are a plan view, a sectional view, and a sectional view as a sum, respectively of three recording marks which are formed in successive three cells mainly by means of deformation without interference.

FIGS. 7O, 7A, 7B, 7C, 7D and 7E schematically illustrate a reproducing signal which varies depending on the difference of interference among the deformations in three cells. In this case, three recording marks are formed in successive three cells mainly by means of deformation and the total length of the three recorded cells is smaller than the diameter 109 of reproducing beam. If the interference in deformation is linear, the resulting deformation is as shown in FIG. 7B. However, if the interference in deformation is not linear, the resulting deformation is modified as shown in FIG. 7C or FIG. 7D.

The interfered deformation has a length smaller than the diameter 109 of reproducing beam, and the difference in the deformation is therefore not detected. Accordingly, a reproducing signal as shown in FIG. 7E can be substantially obtained even when the deformation varies as shown in FIGS. 7B, 7C and 7D.

Exact data can therefore be decoded by detecting the reflection levels at sampling times $T_1$, $T_2$ and $T_3$ shown in FIG. 7E.

FIGS. 8O, 8A, 8B, 8C, 8D, 8E, 8F and 8G schematically illustrate the relationship between the interference in deformation and the reproducing signal when successive seven recording marks mainly based on deformation are formed in successive seven cells and the total length of the cells is larger than the diameter 109 of reproducing beam.

The interference in deformation in this case becomes more nonlinear than the case shown in FIGS. 7B, 7C and 7D, and the interfered deformation is as shown in FIGS. 8B, 8C and 8D when simply illustrated. The interfered deformations each have a length larger than the diameter 109 of reproducing beam, and the difference among the deformations can be clearly detected. Thus, reproducing signals shown in FIGS. 8E, 8F and 8G are obtained from the deformations in FIGS. 8B, 8C and 8D, respectively.

Accordingly, when reflection levels are detected at sampling times $T_1$ through $T_7$ shown in FIGS. 8E, 8F and 8G, different data corresponding to the different deformations are decoded, thus failing to decode the exact data.

As is described above, recording of data mainly based on deformation leads to different interference behaviors among recording marks depending on recording patters, and the resulting reproducing signals cannot be predicted. Thus, the data are not recorded and/or reproduced properly at a higher density.

3. Recording-reproducing Technique Using PRML system

As another possible solution to achieve high-density recording than the ML recording technique, the application of partial response and maximum likelihood (PRML) technique to optical recording media has been studied.

With an increasing recording linear density to achieve high-density recording, the reproducing signal has a dull waveform. In other words, with reference to FIG. 4, the reproducing signal waveform (d) is not a rectangular waveform as in the recording waveform (b). The high frequency components of the reproducing signal are amplified using an equalizer and the reproducing signal is converted to have an equalized waveform. When the reproducing signal has a dull waveform with an increasing density, a larger quantity of high frequency components must be amplified. In amplification of the high frequency components, signal degrading components are also amplified by the equalizer, thus inviting significantly decreased signal-to-noise ratio (SNR) of the reproducing signal. PRML is a reproducing signal processing system to prevent SNR of the reproducing signal from decreasing even in high density recording.

The PRML system will be briefly illustrated below.

FIG. 9 illustrates a recording data (a) as target information, a recording waveform (b), a recording mark row (c), a reproducing signal waveform (d) and equalized waveforms (e), (f) and (g).

More specifically, the equalized waveforms (e), (f) and (g) are obtained as a result of equalization of the reproducing waveform (d) by an equalizer depending on PR(1,1) characteristic, PR(1,2,1) characteristic and PR(1,2,2,1) characteristic, respectively. The PR(1,1) characteristic is a characteristic in which an impulse response appears at the rate of 1:1 at two successive identification points. The PR(1,2,1) characteristic is a characteristic in which an impulse response appears at the rate of 1:2:1 at three successive identification points. The PR(1,2,2,1) characteristic is a characteristic in which an impulse response appears at the rate of 1:2:2:1 at four successive identification points. The equalized waveforms (e), (f) and (g) in FIG. 9 show that an equalized waveform becomes duller with an increasing complexity of the PR characteristic.

In the PRML system, an increase in the signal degrading component in the equalizer can be suppressed by equalizing the reproduced waveform into a waveform of a PR characteristic which is closer to the characteristic of the reproduced waveform.

In the reproduction signal processing of PRML system, a Viterbi decoder which is a representative one of maximum likelihood decoders is generally used as a most-likelihood decoder in decoding of the equalized waveform signals. For example, if the reproduced waveform is equalized into a waveform of the PR(1,2,1) characteristic by the equalizer, the Viterbi decoder selects a series having the smallest error with respect to the sample series of the equalized waveform from all of the reproduced waveform series which satisfy the PR(1,2,1) characteristic and estimates and outputs recording data (binary data, decoded data) used as a source for generating the selected reproduced waveform series.

Thus, the PRML system realizes high-density recording even using a conventional optical system. However, even the PRML system cannot record and reproduce information with high reliability when the interference among recording marks (intersymbol interference) becomes large and becomes nonlinear, namely, when a predictable interference among recording marks occurs. In other word, the PRML system can be applied onto to such a case in which a predictable interference among recording marks occurs. If an interference among recording marks different from the predicted one occurs, the advantages of the PRML system are not obtained.

The deformation of recording marks must be prevented to suppress the interference among recording marks at a predictable level.

By providing write-once-read-many optical recording media on which information can be recorded by multi-level recording at a wavelength of blue-laser wavelengths or shorter, recording marks with higher quality than those obtained by the conventional binary recording technique can be formed. Information can be recorded on the resulting write-once-read-many optical recording media by the conventional binary recording technique at a wavelength of blue-laser wavelengths or shorter and also by multi-level recording at a higher density by the application of the PRML system. Requirements to achieve write-once-read-many optical recording media sensitive to blue-laser wavelengths or shorter wavelengths can be considered as requirements to provide write-once-read-many optical recording media that allow multi-level recording at a wavelength of blue-laser wavelengths or shorter.

The requirements to write-once-read-many optical recording media that allow multi-level recording at a wavelength of blue-laser wavelengths or shorter are the following requirements (1), (2) and (3):
(1) smaller recording marks;
(2) less interference among recording marks; and
(3) higher stability of recording marks.

In most of the conventional write-once-read-many optical recording media, information is recorded mainly based on deformation as described above.

In binary recording, the minimum mark has a sufficient size with respect to the diameter of reproducing beam (approximately half the diameter of reproducing beam), the amplitude derived from the minimum mark is sufficiently large, and the deformation in the minimum mark is large.

In contrast, in multi-level recording, the minimum mark has an insufficient size with respect to the diameter of reproducing beam, and the amplitude derived from the minimum mark in multi-level recording is approximately one-half to one-tenths or less the amplitude derived from the minimum mark in binary recording, and the deformation in the minimum mark is very small.

Conventional CD or DVD write-once-read-many optical recording media have a layer of an organic colorant having optical absorptivity arranged directly adjacent to a substrate. Thus, the substrate deforms to a large extent. The degree of modulation is primarily affected by the deformation of substrate and is secondarily affected by the decomposition of the organic colorant. A deformation of the substrate within an elastic deformation region may be relieved, for example, by extraneous heat. A deformation of the substrate exceeding the elastic deformation region is limited, but its shape may significantly vary with the heat applied upon the formation of an adjacent recording mark or with the deformation of the adjacent recording mark.

FIGS. 10 and 11 illustrate these phenomena.

FIG. 10 shows recording marks in a write-once-read-many optical recording medium having a conventional structure of a substrate, a colorant layer, an Ag reflective layer and a protective layer arranged in this order.

FIG. 10 illustrates a waveform A of a reproducing signal; an atomic force micrographic (AFM) image B of the surface of the substrate after removing the protective layer, Ag reflective layer and colorant layer; and a deformation C of the cross section of the substrate as determined based on the AFM image B. FIG. 10 shows that the recorded area is much largely deformed with a concave shape at a center part of the recording mark. The interference in deformation (interference within one recording mark) is nonlinear, as illustrated in FIGS. 7C, 7D, 8C and 8D.

FIG. 11 illustrates recording marks obtained by recording the information as in FIG. 10 on the conventional write-once-read-many optical recording medium and applying a weak direct-current light of about one-fifths of the recording power to the medium.

FIG. 11 illustrates a waveform A of a reproducing signal; an atomic force micrographic (AFM) image B of the surface of the substrate after removing the protective layer, Ag reflective layer and colorant layer; and a deformation C of the cross section of the substrate as determined based on the AFM image B. FIG. 11 shows that the deformation of substrate changes and thus the waveform of the reproducing signal changes upon irradiation of the weak direct-current light. This is probably because the application of the weak direct-current light relieves the strain in the deformed portion of the substrate.

The fact that the shape of deformed portion of the substrate varies upon irradiation of such a weak direct-current light shows that the colorant layer on the recording mark should have a sufficient optical absorptivity and that the conventional write-once-read-many optical recording medium generates the degree of modulation mainly based on deformation.

Recording mainly based on deformation invites the following problems:
(1) the interference in deformation within one recording mark increases, and the waveform of the reproducing signal varies depending on the deformation, i. e., depending on the recording mark length;
(2) the interference in deformation among recording marks increases, and the waveform of the reproducing signal varies depending on the deformation, i. e., depending on the recording pattern such as the types of recording marks between anterior and posterior tracks or between adjacent tracks; and
(3) the deformation is relieved in reproduction, in recording onto an adjacent track, in leaving at high temperatures or in leaving for a long period of time, and the waveform of the reproducing signal varies.

These problems invite the following disadvantages:
(a) deteriorated jitter, error rate and other properties;
(b) narrowed recording power margins in jitter, error rate and other properties;
(c) unreasonable asymmetry largely shifted from zero under recording conditions to yield the optimum jitter or minimum error rate;
(d) unstable formation of small recording marks; and
(e) unpredictable interference among recording marks.

These disadvantages and problems also occur in conventional binary recording but are significant in write-once-read-many optical recording media for recording at a higher density, i.e., write-once-read-many optical recording media corresponding to the multi-level recording and/or PRML system.

In addition, the conventional write-once-read-many optical recording media each having a recording layer comprising an organic material have the following disadvantages (i), (ii), (iii) and (iv):
(i) very narrow or small degree of freedom in selection of the organic material;
(ii) very large dependency on wavelength;
(iii) deep grooves of the substrate for satisfactory recording-reproducing properties; and
(iv) no recording in "lands" between grooves.

SUMMARY OF THE INVENTION

Accordingly, an object of the present invention is to solve these problems and to provide a write-once-read-many optical recording medium that can yield a high degree of modulation by recording marks with small deformation and to provide a process for recording and/or reproducing information for the medium.

Specifically, the present invention provides a write-once-read-many optical recording medium containing a first inorganic thin film; and at least one of a second inorganic thin film and an organic thin film, wherein the first inorganic thin film comprises at least "R" and "O," wherein "R" represents at least one selected from the group consisting of Y, Bi, In, Mo, V and lanthanum series elements; and "O" represents oxygen atom, and the second inorganic thin film and the organic thin film are capable of suppressing at least one of deformation and breakage of the first inorganic thin film and receiving the change of state of the first inorganic thin film. Information can be easily recorded on the write-once-read-many optical recording medium of the present invention at high density by binary recording or multi-level recording even at blue-laser wavelengths of 500 nm or less, typically at wavelengths around 405 nm.

The write-once-read-many optical recording medium may contain at least the first inorganic thin film and the organic thin film in a first aspect, may contain at least the first inorganic thin film and the second inorganic thin film in a second aspect and may contain at least the first inorganic thin film, the second inorganic thin film and the organic thin film in a third aspect.

The present invention further provides a process for recording and/or reproducing information on the write-once-read-many optical recording medium, the process including forming a recorded area by the photoabsorption function of at least one of the first inorganic thin film and the organic thin film at wavelengths at which recording and reproduction is performed. The process of the present invention can easily record and reproduce information on the write-once-read-many optical recording medium at a high density by binary recording or multi-level recording even at blue-laser wavelengths of 500 nm or less, typically at wavelengths around 405 nm.

Further objects, features and advantages of the present invention will become apparent from the following description of the preferred embodiments with reference to the attached drawings.

BRIEF DESCRIPTION OF THE DRAWINGS

FIG. 5 is a schematic diagram of recording marks in multi-level recording.

FIGS. 6A, 6B and 6C are a plan view, a sectional view of deformation without interference, and a sectional view of added deformation, respectively, of three recording marks formed in three successive cells mainly based on deformation and show linear interference in deformation.

FIGS. 7O, 7A, 7B, 7C, 7D and 7E are diagrams showing different reproducing signals due to different interference in deformation of three recording marks formed in three successive cells mainly based on deformation when the total length of the recorded cells is smaller than the diameter of reproducing beam, in which FIG. 7O illustrates the diameter of reproducing beam, FIG. 7A is a plan view of the recording marks, FIG. 7B illustrates an added deformation, FIGS. 7C and 7D illustrate a nonlinearly interfered deformation, respectively, and FIG. 7E illustrates a reproducing signal obtained in the cases of FIGS. 7B, 7C and 7D.

FIGS. 8O, 8A, 8B, 8C, 8D, 8E, 8F and 8G are diagrams showing different reproducing signals due to different interference in deformation of seven recording marks formed mainly based on deformation in seven successive cells when the total length of the recorded cells is larger than the diameter of reproducing beam, in which FIG. 8O illustrates the diameter of reproducing beam, FIG. 8A is a plan view of the recording marks, FIG. 8B illustrates an added deformation, FIGS. 8C and 8D illustrate a nonlinearly interfered deformation, respectively, and FIGS. 8E, 8F and 8G illustrate a reproducing signal obtained in the cases of FIGS. 8B, 8C and 8D, respectively.

DESCRIPTION OF THE PREFERRED EMBODIMENTS

Write-once-read-many Optical Recording Media

Figure 1:
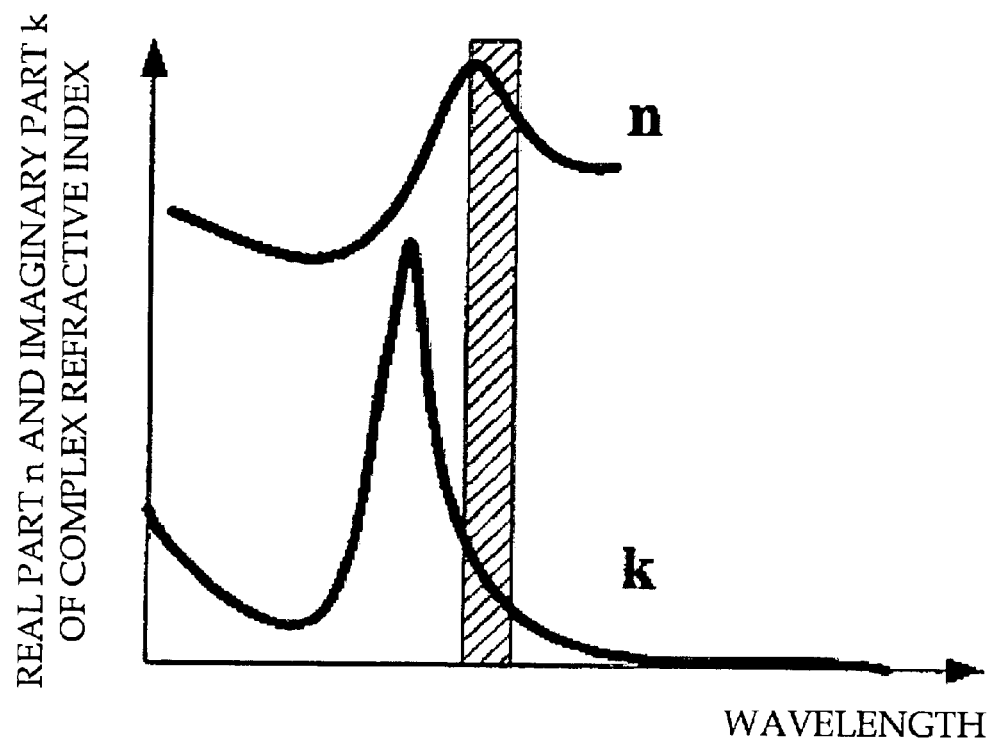
FIG. 1 is a diagram showing the relationship between the recording-reproducing wavelengths and the major absorption band of an organic material in a recording layer of a conventional write-once-read-many optical recording medium.
Figure 2:
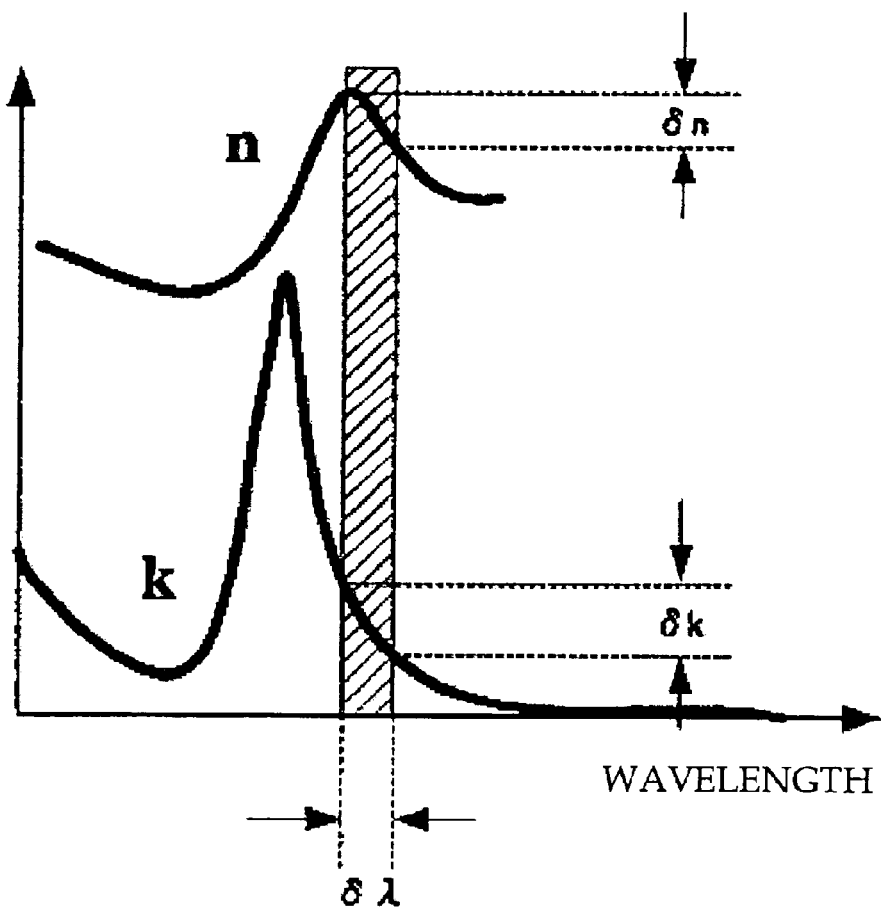
FIG. 2 is a diagram showing a large dependency on wavelength of the optical constant of the conventional write-once-read-many optical recording medium.
Figure 3:
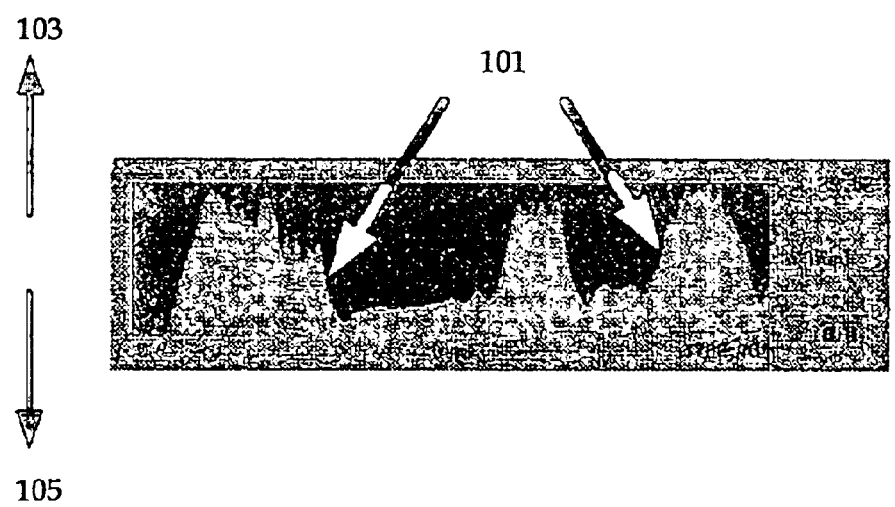
FIG. 3 is an atomic force micrograph of the deformation of the substrate of the conventional write-once-read-many optical recording medium.
Figure 4:
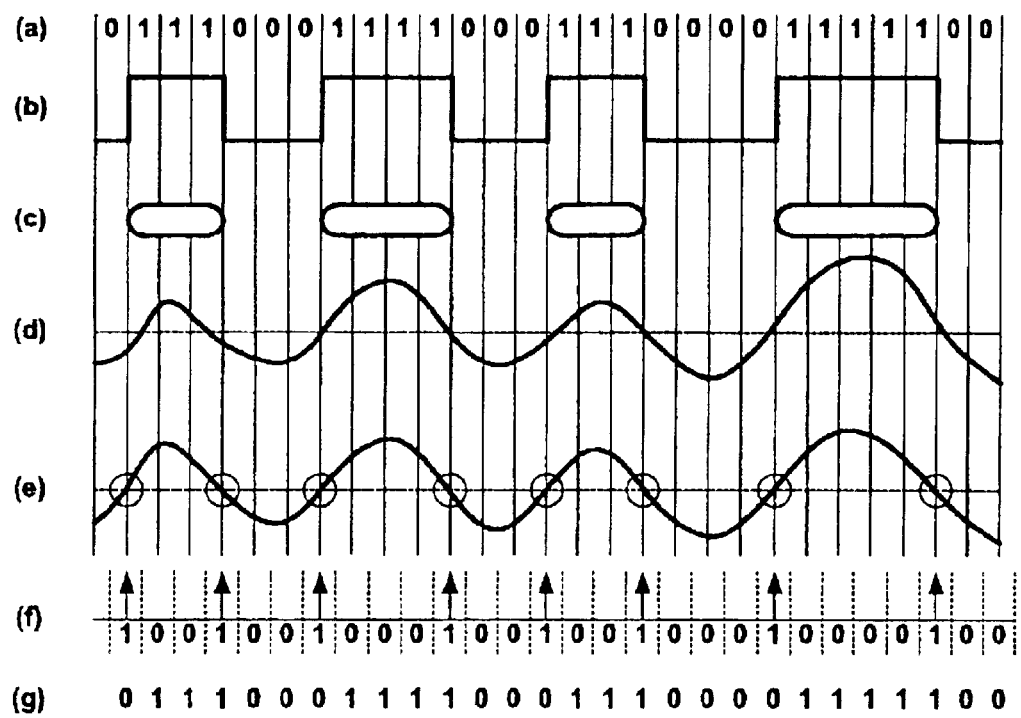
FIG. 4 is an illustration of data decoding according to a conventional level slice system and shows a recording data (a) as a target information, a recording waveform (b) corresponding to the recording data (a), a recording mark row (c) formed in an optical recording medium, a reproducing signal waveform (d) of the recording mark row (c), an equalized waveform (e) as a result of equalization of the reproducing signal waveform (d) by an equalizer, a binary data (f) obtained by detecting the point of intersection of the equalized waveform (e) and the threshold, and a decoded data (g) obtained by subjecting the binary data (f) to NRZ conversion.
Figure 8O:
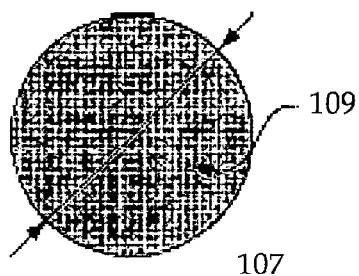
Figure 8A:
Figure 8B:
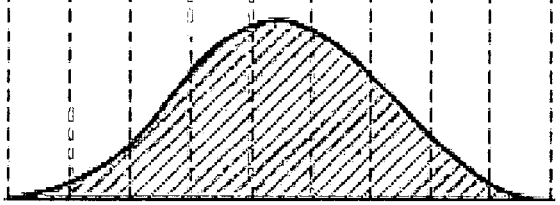
Figure 8C:
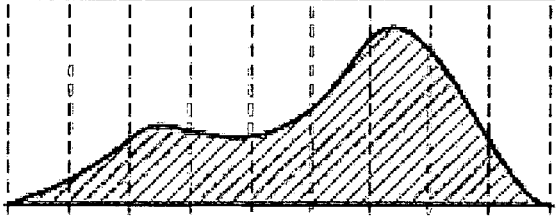
Figure 8D:
Figure 8E:
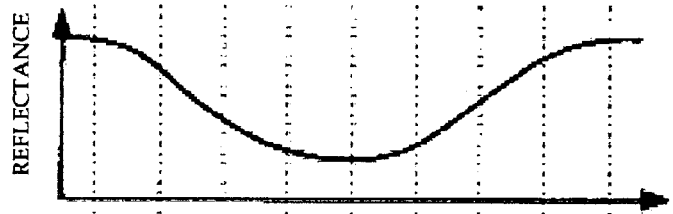
Figure 8F:
Figure 8G:
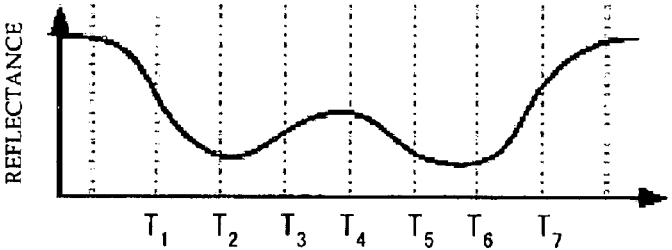
Figure 9:
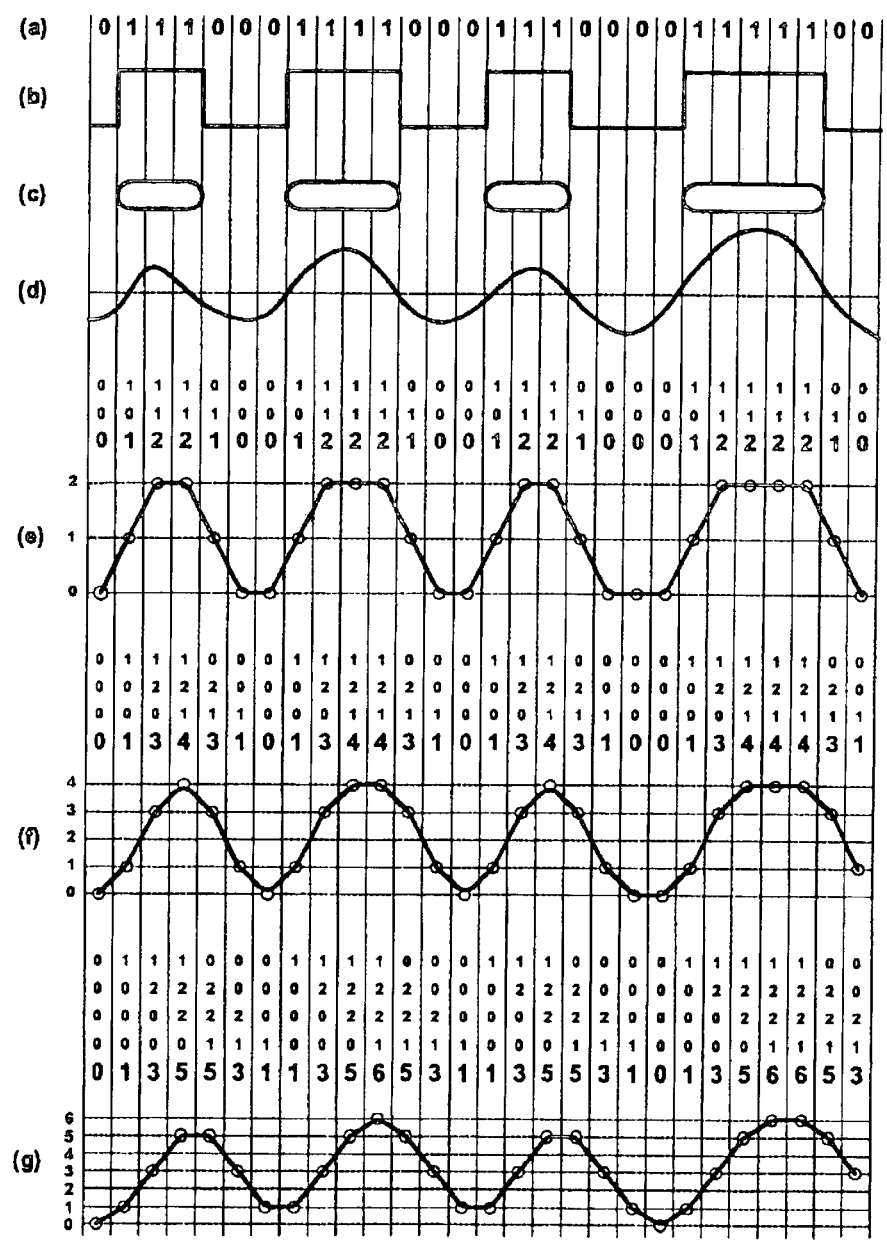
FIG. 9 is a diagram showing data decoding according to the PRML system and shows a recording data (a) as a target information, a recording waveform (b) corresponding to the recording data (a), a recording mark row (c) formed in an optical recording medium, a reproducing signal waveform (d) of the recording mark row (c), an equalized waveform (e) as a result of equalization of the reproducing signal waveform (d) based on the PR(1,1) characteristic by an equalizer, an equalized waveform (f) as a result of equalization of the reproducing signal waveform (d) based on the PR(1,2,1) characteristic by the equalizer, and an equalized waveform (g) as a result of equalization of the reproducing signal waveform (d) based on the PR(1,2,2,1) characteristic by the equalizer.
Figure 10:
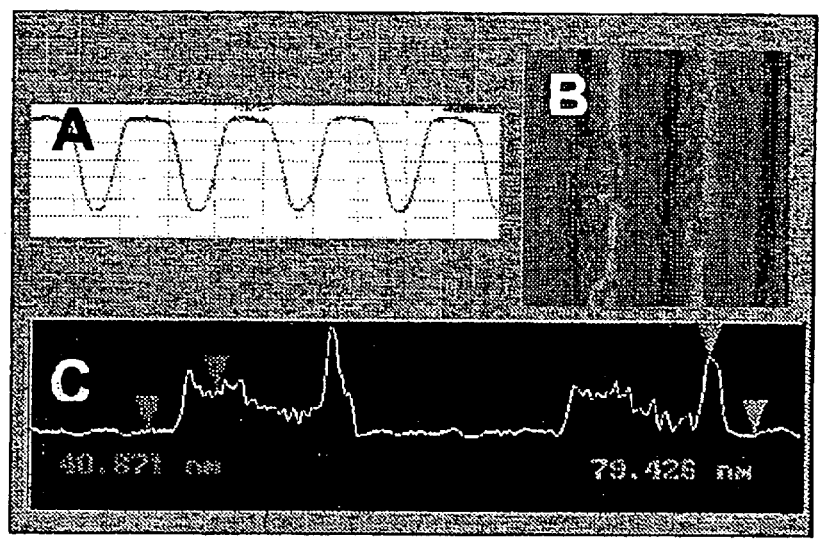
FIG. 10 is a diagram showing the relationship between the deformation of a substrate and the reproducing signal of a conventional write-once-read-many optical recording medium.
Figure 11:
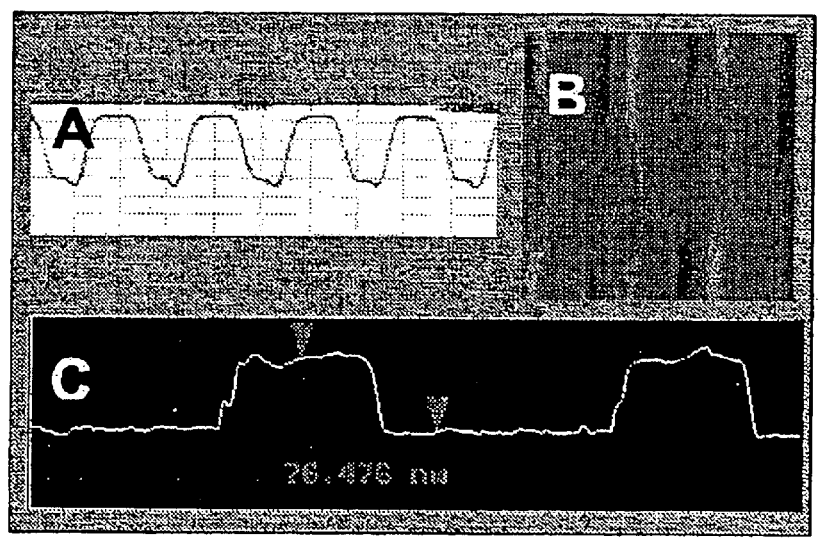
FIG. 11 is a diagram showing the relationship between the deformation of a substrate and the reproducing signal of a conventional write-once-read-many optical recording medium when a weak DC light is applied to the medium after recording.

The write-once-read-many optical recording media according to the present invention each comprise a first inorganic thin film, and at least one of a second inorganic thin film and an organic thin film and may further comprise a reflective layer, a cover layer and other layers according to necessity.

The write-once-read-many optical recording medium according to a first embodiment comprises at least the first inorganic thin film such as an RO film, wherein "R" is an element as mentioned below and "O" is oxygen atom, and the organic thin film and may further comprise a reflective layer, a cover layer and other layers according to necessity.

The write-once-read-many optical recording medium according to a second embodiment comprises at least the first inorganic thin film and the second inorganic thin film and may further comprise a reflective layer, a cover layer and other layers according to necessity.

The write-once-read-many optical recording medium according to a third embodiment comprises at least the first inorganic thin film, the second inorganic thin film and the organic thin film and may further comprise a reflective layer, a cover layer and other layers according to necessity.

In a write-once-read-many optical recording medium comprising, for example, a substrate, the first inorganic thin film such as an RO film, the organic thin film and the reflective layer arranged in this order, the thickness of the first inorganic thin film and the organic thin film must be optimized. If not, the first inorganic thin film largely deforms and may break in some cases. For example, a write-once-read-many optical recording medium having the above configuration can yield satisfactory recording-reproducing properties in the vicinity of the optimum recording power, but its first inorganic thin film largely deforms, may break in some cases and the medium shows decreased margins of the jitter and error rate at a recording power higher than the optimum recording power. More specifically, the medium shows a rapidly and discontinuously increasing degree of modulation with an increasing recording power.

The deformation increasingly affects the properties of the medium not only with an increasing recording power but also with an increasing recording mark length. Therefore, the asymmetry may be deteriorated to a negative region under such recording conditions as to yield the optimum jitter and error rate.

This is because, in one aspect, recording on the first inorganic thin film in the medium having this configuration is performed mainly by a recording mechanism accompanied with a relatively large change such as deformation and fusing. In other words, this configuration may often invite a relatively large change such as deformation and fusing of the first inorganic thin film in recording. In addition, the substrate is arranged in direct contact with the first inorganic thin film, and a large quantity of heat propagates into the substrate. Thus, the substrate expands and deforms to thereby further deform the first inorganic thin film, which may invite breakage of the first inorganic thin film.

Accordingly, the medium of the present invention may preferably further comprise the second inorganic thin film in addition to the first inorganic thin film. The second inorganic thin film works to suppress at least one of the deformation and breakage of the first inorganic thin film and to receive the change of state of the first inorganic thin film, such as fusing, change in composition, diffusion, change in crystalline state, oxidation and/or reduction.

The second inorganic thin film may preferably be arranged adjacent to the first inorganic thin film to effectively exhibit the aforementioned functions. However, it can also exhibit its functions even when another layer is interposed between the first inorganic thin film and the second inorganic thin film.

To yield a high degree of modulation using recording marks with less deformation, the following factors (1) to (5) are important:
(1) to prevent a light-absorptive layer from change of state such as fusing, change in composition including decomposition and degradation, diffusion, change in crystalline state, oxidation and/or reduction to thereby prevent the layer from largely deforming;
(2) to form a layer in the vicinity of the light-absorptive layer for preventing deformation and/or breakage of the light-absorptive layer to thereby prevent the light-absorptive layer from largely deforming;
(3) to prevent a light-absorptive layer from change of state such as fusing, change in composition including decomposition and degradation, diffusion, change in crystalline state, oxidation and/or reduction to thereby prevent the layer from conducting a large quantity of heat to an adjacent layer that easily deforms, such as the substrate, in other words to allow the light-absorptive layer to consume heat generated in the light-absorptive layer to thereby reduce the deformation of the adjacent layer such as the substrate;
(4) to have a layer that induces a large change in optical constant to thereby yield a sufficient degree of modulation even with a reduced deformation; and
(5) to perform recording in such a manner as to make fuzzy or unclear interface with an adjacent layer to thereby yield a sufficient degree of modulation even with a reduced deformation.

In consideration of these factors, the combination use of the first inorganic thin film and the second inorganic thin film can much reduce adverse effects of the deformation of recording marks and prevent increased adverse effects of such deformation with an increasing recording power. Thus, the problems in conventional technologies can be effectively solved. The second inorganic thin film herein works to suppress at least one of the deformation and breakage of the first inorganic thin film and to receive the change of state of the first inorganic thin film, such as fusing, change in composition, diffusion, change in crystalline state, oxidation and/or reduction.

In conventional write-once-read-many optical recording media, the absorption coefficient at the recording-reproducing wavelengths is reduced by at least one of decomposition and degradation of the organic material, and the resulting large change in refractive index is used to modulate the amplitude. An organic material layer used herein works as a heat generation layer due to its optical absorptivity and as a recording layer based on change in refractive index (a real part of complex refractive index) caused by the decomposition and/or degradation.

In contrast, according to one embodiment of the write-once-read-many optical recording media of the present invention, a function as a main heat generation layer is separated from such a conventional organic thin film, the first inorganic thin film having photoabsorptivity is formed in addition to the organic thin film, and the second inorganic thin film is further formed.

According to the present invention, recording marks are formed based on at least one of the following mechanisms (1) to (11):
(1) deforming at least one of the first inorganic thin film and the second inorganic thin film;
(2) changing the complex refractive index of at least one of the first inorganic thin film and the second inorganic thin film;
(3) changing the composition of at least one of the first inorganic thin film and the second inorganic thin film;
(4) fusing the first inorganic thin film;
(5) diffusing constitutional elements of the first inorganic thin film into at least one of the second inorganic thin film and the organic thin film;
(6) changing at least one of the crystalline state and crystalline structure of the first inorganic thin film;
(7) oxidizing and/or reducing a constitutional element of the first inorganic thin film;
(8) changing the composition distribution of the first inorganic thin film;
(9) changing the volume of the organic thin film;
(10) changing the complex refractive index of the organic thin film; and
(11) forming a cavity in the organic thin film.

Preferred recording mechanisms to form recording marks are those relating to the change of state of at least one of the first inorganic thin film and the second inorganic thin film, i.e., the recording mechanisms (1) to (8), of which recording mechanisms (2) to (8) are more preferred. According to these mechanisms, the "change of state" such as change in composition, fusing, change in crystalline state, oxidation and/or reduction, diffusion of constitutional elements into an adjacent layer can be utilized. Thus, the first inorganic thin film can have a significantly varied complex refractive index and can have an unclear interface with the adjacent layer to thereby reduce the influence of multiple reflection. Accordingly, a high degree of modulation can be yielded even with a small deformation.

Namely, information can be recorded not mainly based on deformation but mainly based on any of the above recording mechanisms.

1. Functions of First Inorganic Thin Film

According to the present invention, the first inorganic thin film performs a major photoabsorption function.

The first inorganic thin film exhibits normal dispersion, does not have a large absorption band within a range of certain wavelengths and its complex refractive index less depends on wavelength, in contrast to organic materials. Accordingly, the use of the first inorganic thin film can suppress large variation of recording properties such as recording sensitivity, degree of modulation, jitter and error rate and of reflectance even with varying recording-reproducing wavelengths derived from the individual difference of laser or varying environmental temperature.

In conventional write-once-read-many optical recording media, the organic thin film performs both functions as a recording layer and a light-absorptive layer. The constitutional organic material must thereby have a high refractive index n and a relatively low absorption coefficient k at the recording-reproducing wavelengths. Thus the organic thin film must have a relatively large thickness to reach a temperature at which the organic material decomposes. In a phase-change optical recording medium, the substrate must have very deep grooves.

In the optical recording media of the present invention, however, there is no need for the organic thin film to perform a major photoabsorption function and recording function. The organic thin film herein can have a smaller thickness than conventional equivalents.

The organic thin film having such a smaller thickness realizes the use of a substrate having shallow grooves and thus having satisfactory transfer ability (moldability). This type of substrate can be more easily prepared at lower cost than conventional equivalents. In addition, the resulting optical recording media have significantly improved signal quality.

Reproduction according to any of the aforementioned recording mechanisms is impervious to the shape of grooves in the substrate and has a large allowance (margin) with respect to variation of the shape of substrate. This type of substrate can be more easily prepared at lower cost than conventional equivalents.

The organic thin film having such a smaller thickness realizes broader recording power margins.

The first inorganic thin film performs a photoabsorption function as well as a recording function.

More specifically, the photoabsorption function of the first inorganic thin film causes any of the following changes of state of the first inorganic thin film itself:

(1) deformation (however, the degree of deformation is less than conventional equivalents);
(2) change in complex refractive index;
(3) change in composition;
(4) fusing;
(5) diffusion of constitutional elements into an adjacent layer;
(6) change in crystalline state and/or crystalline structure;
(7) oxidation and/or reduction of constitutional elements; and
(8) change in compositional distribution.

For example, to perform a recording function and a photoabsorption function with respect to a recording-reproducing wavelength of 500 nm or less, the first inorganic thin film preferably comprises an element capable of absorbing light at a recording-reproducing wavelength of 500 nm or less as element R and/or M.

For yielding a larger change in complex refractive index, change in composition, change in crystalline state, fusing or diffusion of constitutional elements into an adjacent layer, the first inorganic thin film preferably comprises, as Element R, an element having a relatively low melting point as an elementary substance or as an oxide.

Thus, Element R of the first inorganic thin film should be at least one selected from Y, Bi, In, Mo, V and lanthanum series elements. Among them, bismuth oxide BiO, wherein "R" is Bi, and a mixture of bismuth and bismuth oxide are preferred for multi-level recording. The first inorganic thin film preferably further comprises at least one element M selected from Al, Cr, Mn, Sc, In, Ru, Rh, Co, Fe, Cu, Ni, Zn, Li, Si, Ge, Zr, Ti, Hf, Sn, Pb, Mo, V and Nb.

Advantages of the combination use of R and O, or R, M and O in the first inorganic thin film are as follows.

(1) The presence of an oxide can increase the hardness of the first inorganic thin film to thereby suppress the deformation of the first inorganic thin film itself and/or of an adjacent layer such as the substrate.

(2) The presence of the oxide can increase the storage stability.

(3) The use of an element capable of highly absorbing light at wavelengths of 500 nm or less, such as Bi, can improve the recording sensitivity.

(4) The use of an element having a low melting point or being easily diffusible, such as Bi, can form recording marks that yield a high degree of modulation even with relatively small deformation.

(5) A satisfactory inorganic thin film can be prepared by a vapor phase epitaxy such as sputtering.

When the first inorganic thin film is represented by $R_xM_yO$, wherein "x" and "y" are atomic ratios, the ratio of "x" to the total of "x" and "y" [x/(x+y)] is preferably 0.3 or more. Thus, the deformation of the first inorganic thin film itself and/or the deformation of an adjacent layer such as the substrate can be reduced to thereby reduce interference among recording marks.

Element R is preferably Bi for further better recording-reproducing properties.

The first inorganic thin film is preferably represented by $Bi_a(4B)_bO_d$ or $Bi_a(4B)_bX_cO_d$, wherein "4B" is at least one of Group 4B elements of the Periodic Table of Elements for better recording-reproducing properties and for better storage stability. Examples of Group 4B elements are C, Si, Ge, Sn and Pb, of which Si and Ge are typically preferred. "X" is at least one element selected from Al, Cr, Mn, In, Co, Fe, Cu, Ni, Zn, Ti and Sn.

When the first inorganic thin film is represented by $Bi_a(4B)_bX_cO_d$, the element "X" works to cause a larger change in complex refractive index or in composition, to cause fusing or to yield a further diffusion of constitutional elements into an adjacent layer.

The first inorganic thin film may comprise the oxide RO alone but may further comprise Element R in another form than an oxide (this form of element other than an oxide is hereinafter referred to as "elementary"), in addition to RO (oxide of Element R) (hereinafter referred to as "R+RO").

When the first inorganic thin film further comprises Element M in addition to R and O, these elements may be contained as at least one of (1) a ternary compound of R—M—O, (2) a mixture of the elementary R and an oxide of Element M (R+MO), (3) a mixture comprising an oxide of Element R and an oxide of Element M (RO+MO), (4) a mixture of Element R, an oxide of Element R, and an oxide of Element M (R+RO+MO), and a combination of configurations (1) to (4). In other words, the "first inorganic thin film" for use in the present invention may comprise any of compounds, elements, and mixtures as mentioned above.

For example, oxidation of Element R not in the state of oxide upon recording can significantly change the complex refractive index of the first inorganic thin film. By using this recording mechanism of oxidation, information can be recorded not based on deformation and can be recorded with less intersymbol interference.

However, if first inorganic thin film contains a large amount of Element R and/or Element M not in the state of oxide, the medium may have decreased storage stability.

Accordingly, the content of elementary R and/or elementary M is preferably lower than the content of the oxide of Element R and/or the oxide of Element M. The ratio of the former to the latter is preferably set according to the balance of properties such as recording sensitivity, jitter and storage stability.

Information can be recorded based on reduction when Elements R and M are in the state of oxide, and the same advantages as in oxidation can be obtained.

According to the present invention, Element R and/or an oxide thereof performs a major photoabsorption function and a recording function, and above specified elements as Element R can exhibit specific advantages.

When the first inorganic thin film has a composition represented by $R_xM_yO$, wherein "x" and "y" are atomic ratios, the ratio $[x/(x+y)]$ is preferably 0.3 or more for better recording-reproducing properties. However, a first inorganic thin film having a ratio $[x/(x+y)]$ less than 0.3 can be used for fine control of recording-reproducing properties and storage stability. The ratio $[x/(x+y)]$ is not limited to the range of 0.3 or more in the present invention.

The first inorganic thin film preferably has a thickness of 20 to 500 angstroms (2–50 nm).

2. Functions of Second Inorganic Thin Film

The second inorganic thin film functions to suppress the deformation and/or breakage of the first inorganic thin film and to receive change of state of the first inorganic thin film, such as fusing, change in composition, diffusion, change in crystalline state, oxidation and/or reduction.

The first inorganic thin film is capable of absorbing light in a relatively large quantity at the recording-reproducing wavelengths and generally has a relatively small thickness for better reflectance, although the thickness of the first inorganic thin film may be set according to its absorption coefficient. A first inorganic thin film having a small thickness arranged directly in contact with the substrate may largely deform or break due to expansion of the substrate, even though the film has a high hardness.

Accordingly, the second inorganic thin film is used to suppress the deformation and/or breakage of the first inorganic thin film in the present invention. The second inorganic thin film may be arranged between the substrate and the first inorganic thin film to effectively suppress the deformation and/or breakage of the first inorganic thin film. However, the advantages of the second inorganic thin film can also be obtained even if the medium comprises the substrate, the first inorganic thin film and the second inorganic thin film arranged in this order. This is probably because the first inorganic thin film has a relatively small thickness, and the second inorganic thin film can easily exhibit its advantages through such a thin first inorganic thin film.

The second inorganic thin film performs a recording function in addition to the function of suppressing the deformation and/or breakage of the first inorganic thin film. As is described above, information is recorded on the write-once-read-many optical recording media of the present invention, for example, by:

(1) deforming at least one of the first inorganic thin film and the second inorganic thin film;

(2) changing the complex refractive index of at least one of the first inorganic thin film and the second inorganic thin film;

(3) changing the composition of at least one of the first inorganic thin film and the second inorganic thin film;

(4) fusing the first inorganic thin film;

(5) diffusing constitutional elements of the first inorganic thin film into at least one of the second inorganic thin film and the organic thin film;

(6) changing at least one of the crystalline state and crystalline structure of the first inorganic thin film;

(7) oxidizing or reducing a constitutional element of the first inorganic thin film; and/or (8) changing the composition distribution of the first inorganic thin film.

When the second inorganic thin film is arranged adjacent to the first inorganic thin film, it functions to receive the change of state of the first inorganic thin film and to have an unclear interface with the first inorganic thin film.

Such an "unclear interface" means that the interface between the two thin films becomes a different state from that before recording. For example, the unclear interface means that the complex refractive index becomes gradient in the vicinity of the interface between the first inorganic thin film and the second inorganic thin film typically by mixing or diffusion of components of the first inorganic thin film and the second inorganic thin film at the interface. In this case, the complex refractive index varies discontinuously at the interface in an unrecorded area but varies gradually in the vicinity of the interface in a recorded area.

Thus, the second inorganic thin film can receive the change of state of the first inorganic thin film such as fusing, change in composition, diffusion, change in crystalline state, oxidation and/or reduction and make the interface between the first inorganic thin film and the second inorganic thin film unclear. The influence of, for example, multiple reflection can be suppressed to thereby yield a high degree of modulation.

The second inorganic thin film has another essential function to control its thermal conductivity. Thus, fine recording marks with less variation can be efficiently formed.

The second inorganic thin film further functions to control the reflectance, tracking signals and recording sensitivity by appropriately selecting the material and thickness thereof.

Materials that do not undergo decomposition, sublimation or formation of cavities due to heat generated from the first inorganic thin film are preferably used in the second inorganic thin film. Examples of such materials are $Al_2O_3$, MgO, BeO, $ZrO_2$, $UO_2$, $ThO_2$ and other simple oxides; $SiO_2$, $2MgO—SiO_2$, $MgO—SiO_2$, $CaO—SiO_3$, $ZrO_2—SiO_2$, $3Al_2O_3—2SiO_2$, $2MgO\text{-}2Al_2O_3—5SiO_2$, $Li_2O—Al_2O_3—4SiO_2$ and other silicate-containing oxides; $Al_2TiO_5$, $MgAl_2O_4$, $Ca_{10}(PO_4)_6(OH)_2$, $BaTiO_3$, $LiNbO_3$, PZT [$Pb(Zr,Ti)O_3$], PLZT [$(Pb,La)(Zr,Ti)O_3$], ferrite and other double oxides; $Si_3N_4$, $Si_{6-Z}Al_ZO_ZN_{8-Z}$, AlN, BN, TiN and other nitride-based nonoxides; SiC, $B_4C$, TiC, WC and other carbide-based nonoxides; $LaB_6$, $TiB_2$, $ZrB_2$ and other boride-based nonoxides; CdS, $MoS_2$ and other sulfide-based nonoxides; $MoSi_2$ and other silicide-based nonoxides; amorphous carbon, graphite, diamond and other carbon-based nonoxides. The second inorganic thin film may comprise an organic substance.

For example, the second inorganic thin film preferably mainly comprises $SiO_2$, ZnS or ZnS—$SiO_2$ for better optical transparency to the recording-reproducing light or for better productivity. It may also preferably mainly comprise $ZrO_2$ for sufficient thermal insulation. It may also preferably comprise an oxide selected from ZnS, $ZrO_2$, $Y_2O_3$ and $SiO_2$ or an oxide comprising $ZrO_2$, $TiO_2$, $SiO_2$ and "X," wherein "X" is at least one selected from $Y_2O_3$, CeO, $Al_2O_3$, MgO, CaO, NbO and oxide of rare earth metals.

The thermal conductivity and hardness of the second inorganic thin film play an important role to effectively receive the change of state of the first inorganic thin film, such as fusing, change in composition, diffusion, change in crystalline state, oxidation and/or reduction. To have a suitable thermal conductivity and hardness, the second inorganic thin film preferably mainly comprises ZnS. If it comprises ZnS—SiO$_2$, the ratio of ZnS is preferably increased. When the second inorganic thin film mainly comprising ZnS is arranged adjacent to a reflective layer mainly comprising Ag, the medium may further comprise a sulfuration-resistant layer for preventing sulfuration of Ag.

In general, the second inorganic thin film is preferably transparent to light at the recording-reproducing wavelengths for higher reflectance. However, it can have some function for absorbing light at the recording-reproducing wavelength for controlling recording sensitivity.

The second inorganic thin film preferably has a thickness of 20 to 2000 angstroms (2–200 nm) and generally preferably has a thickness larger than that of the first inorganic thin film.

3. Functions of Organic Thin Film

Functions of the organic thin film are roughly classified as (a) a heat insulating function typically in a configuration in which the organic thin film is sandwiched between the reflective layer and the first inorganic thin film; (b) a function of yielding a high degree of modulation; (c) a function of compensating the reproducing signal waveform; (d) a function of controlling, for example, the reflectance and tracking signals; and (e) a function of controlling the recording sensitivity.

The heat insulating function (a) is as follows. When the write-once-read-many optical recording media have a reflective layer adjacent to the first inorganic thin film, energy absorbed by the first inorganic thin film may not be efficiently converted to heat and information may not be recorded at a suitable recording power. In this case, by arranging an organic thin film between the first inorganic thin film and the reflective layer, the organic thin film even in a very small thickness can serve to insulate the heat.

Such organic thin films are often prepared by spin coating. In this case, the resulting organic thin film has a larger thickness in grooves than in lands, and the grooves work to sufficiently insulate heat and the lands work to dissipate heat. Thus, crosstalk can be controlled. The use of the organic thin film as a heat insulating layer in groove recording can improve the recording-reproducing properties.

The organic thin film performs the function (b) of yielding a high degree of modulation based on the following mechanisms:

(1) the organic thin film changes its volume as a result of recording;

(2) it changes its complex refractive index as a result of recording;

(3) it forms cavities as a result of recording;

(4) it receives the change of state of the first inorganic thin film as a result of recording; and (5) it receives the deformation of the reflective layer.

The phrase "change of state of the first inorganic thin film" as used herein means and includes, for example, deformation, change in complex refractive index, change in composition, fusing, diffusion or mixing of constitutional elements into an adjacent layer, change in crystalline state and/or crystalline structure, oxidation and/or reduction, and change in composition distribution.

The function (c) of compensating the reproducing signal waveform is a function of converting the reproducing signal waveform into a desired waveform typically so as to yield a high-to-low single recording polarity. This function is achieved by arranging the organic thin film adjacent to the first inorganic thin film. If the organic thin film is not arranged, the reproducing signal waveform may become nonuniform and may not allow the recording polarity to be high-to-low single polarity.

The organic thin film can control its complex refractive index and thickness in very wide ranges and thereby performs the function (d) of controlling the reflectance and tracking signals.

According to the present invention, the first inorganic thin film performs a major photoabsorption function. However, the organic thin film can work as a secondary light-absorptive layer by controlling its complex refractive index, particularly the imaginary part of the complex refractive index and thus performs the function (e) of controlling the recording sensitivity.

Figure 12:
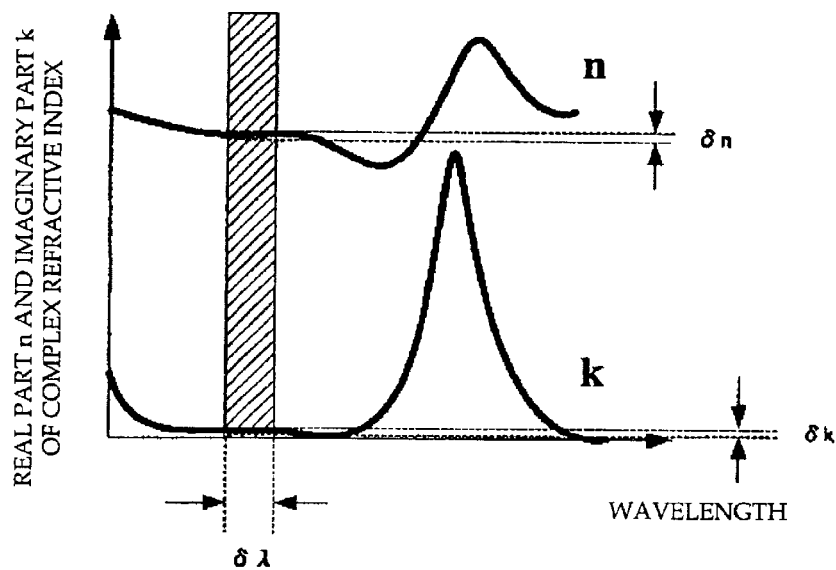
FIG. 12 is a diagram showing the relationship between the major absorption band and the recording-reproducing wavelengths of a write-once-read-many optical recording medium of the present invention.

The organic thin film preferably has its major absorption band at wavelengths longer than the recording-reproducing wavelength (FIG. 12, wherein the recording-reproducing wavelength is diagonally shaded). This configuration broadens the scope of selection of the organic material and reduces change in complex refractive index at around the recording-reproducing wavelength even though the write-once-read-many optical recording medium uses an organic thin film.

When the organic thin film functions as a secondary light-absorptive layer, the organic thin film preferably has an imaginary part of complex refractive index smaller than that of the first inorganic thin film at the recording-reproducing wavelength. An excessively large imaginary part of complex refractive index of the organic thin film at the recording-reproducing wavelength may increase wavelength dependency.

The organic thin film functioning as a light-absorptive layer more preferably has an absorption band not belonging to the major absorption band at the vicinity of the recording-reproducing wavelength in addition to the above configuration.

Figure 13:
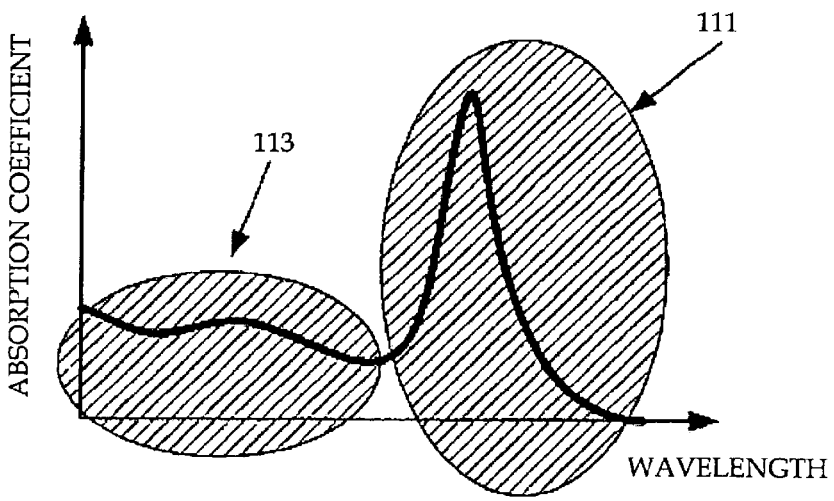
FIG. 13 is a diagram illustrating the "major absorption band" as used in the present invention.

The term "major absorption band" as used herein refers to an absorption band having the maximum absorption at visible ray wavelengths (FIG. 13) and generally means an absorption band based on HOMO-LUMO transition. The term "absorption band not belonging to the major absorption band at around the recording-reproducing wavelength" means and refers to an absorption band based on a transition other than HOMO-LUMO transition (FIG. 13). In FIG. 13, vertically oriented ellipse 111 designates the major absorption band of an absorption spetrum and horizontally oriented ellipse 113 the absorption band not belonging to the major absorption band.

Thus, even when the organic thin film performs a secondary photoabsorption function, the wavelength dependency can be reduced by allowing the organic thin film to have an absorption band not belonging to the major absorption band at around the recording-reproducing wavelength.

In the above description, the exemplified organic thin film comprises one organic material having a major absorption band and an absorption band not belonging to the major absorption band. However, the organic thin film for use in the present invention may comprise a mixture of two or more organic materials so as to have an absorption spectrum as shown in FIG. 13. The resulting write-once-read-many optical recording medium can also have a significantly reduced wavelength dependency as compared with conventional equivalents.

According to the present invention, information is recorded by a mechanism not mainly based on deformation. However, the present invention intends not to exclude deformation but to reduce deformation to a level at which the interference among recording marks can be predicted. Accordingly, the write-once-read-many optical recording media of the present invention can utilize deformation of, for example the first inorganic thin film, the second inorganic thin film and/or the reflective layer.

The organic thin film can control the tendency of deformation of an adjacent layer by controlling its thickness. Namely, the recording sensitivity can also be controlled by adjusting the thickness of the organic thin film when deformation is utilized in recording.

Thus, the organic thin film can control the recording sensitivity by changing its complex refractive index and/or thickness.

In the present invention, the first inorganic thin film performs a major recording function and a major photoabsorption function, and the organic thin film does not have to have such functions. Accordingly, there is no need of utilizing the change in real part of complex refractive index of the organic thin film at the recording-reproducing wavelength, and there is no need for the organic thin film of having a photoabsorption function at the recording-reproducing wavelength. Thus, conventional strict requirements in optical constant of the organic material are not required in the present invention. In this connection, the real part of complex refractive index may change as a result of recording. The present invention can employ organic materials having a large absorption band at red laser wavelengths but no large absorption band at blue laser wavelengths, such as colorants for CD-R or DVD-R media, even in recording and reproduction at blue-laser wavelengths.

Conventional equivalents must control wavelengths and thereby require colorants having a complicated substituent or being hardly synthetically prepared in a recording layer. In contrast, the organic thin film for use in the present invention does not require such a complicated control of wavelengths and can employ low-cost organic materials.

In addition, the organic thin film can employ colorants and other organic materials having a large absorption band at wavelengths far from the recording-reproducing wavelength, and the write-once-read-many optical recording media can significantly solve the conventional problems such as large variation in recording properties such as recording sensitivity, degree of modulation, jitter and error rate and reflectance with varying recording-reproducing wavelength caused by individual difference of laser or by change in environmental temperature. In this connection, the refractive index exhibits anomalous dispersion and varies largely with a varying wavelength at wavelengths in the vicinity of such a large absorption band. In contrast, the refractive index exhibits normal dispersion and varies gradually with a varying wavelength at wavelengths far from the large absorption band.

In some embodiments of the present invention, the organic thin film has its major absorption band at wavelengths longer than the recording-reproducing wavelength. However, the relationship between the major absorption band of the organic thin film and the recording-reproducing wavelength is not specifically limited thereto and can be arbitrarily set.

However, the organic thin film preferably has its major absorption band at wavelengths far from the recording-reproducing wavelength for higher reflectance, since the first inorganic thin film plays a major role as a light-absorptive layer. In this case, the organic thin film may have its major absorption band at wavelengths either longer than or shorter than the recording-reproducing wavelength.

Thus, the present invention can be applied to wide ranges of recording-reproducing wavelength including red laser wavelengths, and blue laser wavelengths or shorter and can yield a target optical recording medium corresponding to the recording-reproducing wavelength used by selecting materials satisfying the above requirements from among conventional organic materials such as colorants as mentioned below.

Colorants are preferably used as the organic material in the organic thin film.

The organic thin film preferably has its major absorption band at wavelengths far from the recording-reproducing wavelength for higher reflectance. For example, when the recording-reproducing is performed at red laser wavelengths, the organic material can have its major absorption band either longer than or shorter than the recording-reproducing wavelength. In contrast, when the recording-reproducing wavelength are equal to or shorter than blue laser wavelengths, the organic material should preferably have its major absorption band at wavelengths longer than the recording-reproducing wavelength. If not, the organic material must have a smaller molecular skeleton and a shorter conjugated system. This configuration may invite decreased decomposing ability or may invite insufficient formation of the organic thin film due to decreased solubility or increased crystallinity.

For satisfactory thermal decomposition properties and for forming a satisfactory thin film, therefore, an organic material having its major absorption band at wavelengths longer than the recording-reproducing wavelength is preferably used when the recording-reproducing wavelength is equal to or shorter than blue-laser wavelengths.

Examples of colorants satisfying the above requirements are polymethine colorants, naphthalocyanine colorants, phthalocyanine colorants, squarylium colorants, chroconium colorants, pyrylium colorants, naphthoquinone colorants, anthraquinone (indanthrene) colorants, xanthene colorants, triphenylmethane colorants, azulene colorants, tetrahydrocholine colorants, phenanthrene colorants, triphenothiazine colorants, azo colorants, formazan colorants, and metal complexes of these compounds.

A layer of such a colorant can be prepared according to a conventional procedure such as vapor deposition, sputtering, chemical vapor deposition (CVD) and coating using a solvent. For example, the layer can be prepared by coating in which the colorant such as a dye is dissolved in an organic solvent and the solution is applied according to a conventional coating procedure such as spraying, roller coating, dipping or spin coating.

Examples of the organic solvent are methanol, ethanol, isopropanol and other alcohols; acetone, methyl ethyl ketone, cyclohexanone and other ketones; N,N-dimethylacetamide, N,N-dimethylformamide and other amides; dimethyl sulfoxide and other sulfoxides; tetrahydrofuran, dioxane, diethyl ether, ethylene glycol monomethyl ether and other ethers; methyl acetate, ethyl acetate and other esters; chloroform, methylene chloride, dichloroethane, carbon tetrachloride, trichloroethane and other halogenated aliphatic hydrocarbons; benzene, xylenes, monochlorobenzene, dichlorobenzene and other aromatic hydrocarbons; hexane, pentane, cyclohexane, methylcyclohexane and other aliphatic or alicyclic hydrocarbons.

The thickness of the colorant layer (organic thin film) is preferably from 100 angstroms (10 nm) to 10 $\mu$m and more preferably from 100 angstroms to 2000 angstroms (10–200 nm).

According to the present invention, recording marks capable of yielding reproducing signals at three or more different levels can be formed in a plane direction and a thickness direction of the first inorganic thin film and/or the organic thin film.

To yield three or more different reproducing signal levels, the areal ratio (the areal ratio in a plane direction of the optical recording medium) of recording marks in cells (FIG. 5) is generally changed. However, according to the present invention, three or more different reproducing signal levels can be yielded by changing the size of recording marks in a sectional direction (thickness direction) of the optical recording medium in addition to changing the areal ratio.

The phrase "recording marks capable of yielding reproducing signals at three or more different levels are formed in a thickness direction" means that recording marks are formed by changing the size of recording marks in a sectional direction (thickness direction) of the optical recording medium, and the resulting recording marks can yield three or more different reproducing signal levels based on the difference in size of the recording marks in the sectional direction.

According to the present invention, the recording marks preferably have varying sizes in the sectional direction of the optical recording medium but can have varying sizes in a plane direction thereof.

The present invention can form recorded areas typically by change in composition of the first inorganic thin film and/or the second inorganic thin film, fusing of the first inorganic thin film, diffusion of constitutional elements in the first inorganic thin film, change in crystalline state and/or crystalline structure of the first inorganic thin film, oxidation and/or reduction of constitutional elements of the first inorganic thin film, change in composition distribution in the first inorganic thin film, change in volume of the organic thin film, or formation of cavities in the organic thin film. The present invention can therefore yield "super-resolution effects" caused by dispersion of nanoparticles or formation of cavities. The write-once-read-many optical recording media of the present invention are suitable for high-density recording and multi-level recording.

The write-once-read-many optical recording media of the present invention comprise at least (1) the substrate, the first inorganic thin film and the second inorganic thin film; (2) the substrate, the first inorganic thin film, the second inorganic thin film and the organic thin film; or (3) the substrate, the first inorganic thin film and the organic thin film. Other components than the first inorganic thin film, second inorganic thin film and organic thin film will be described below.

The material for the substrate is not specifically limited, as long as it has satisfactory thermal and mechanical properties, and when information is recorded and/or reproduced from the substrate side, as long as it has satisfactory optical transparency.

Examples of the material are polycarbonates, poly(methyl methacrylate)s, amorphous polyolefins, cellulose acetate and poly(ethylene terephthalate)s, of which polycarbonates and amorphous polyolefins are preferred.

The thickness of the substrate is not specifically limited and can be appropriately set according to the purpose and application thereof.

The material for the reflective layer preferably has a sufficiently high reflectance at wavelengths of the reproducing light. Examples of the material are metals such as Au, Al, Ag, Cu, Ti, Cr, Ni, Pt, Ta and Pd, and alloys of these metals. Among them, Au, Al, Ag, and alloys thereof have a high reflectance and are suitable as the material for the reflective layer.

The reflective layer may further comprise any of additional elements in addition to the main component metal or alloy. Examples of the additional elements are Mg, Se, Hf, V, Nb, Ru, W, Mn, Re, Fe, Co, Rh, Ir, Zn, Cd, Ga, In, Si, Ge, Te, Pb, Po, Sn, Bi and other metals and semimetals. Among them, Ag and alloys thereof are preferred for their low cost and higher reflectance.

The reflective layer may also comprise a multilayer film including a thin film having a low refractive index and a thin film having a high refractive index arranged alternately.

The reflective layer can be prepared, for example, by sputtering, ion plating, chemical vapor deposition or vacuum deposition.

The thickness of the reflective layer is preferably from 50 to 300 nm.

The write-once-read-many optical recording media may further comprise any of organic or inorganic upper coatings, under coatings and adhesive layers on the substrate or under the reflective layer for higher reflectance, better recording properties and higher adhesion.

The write-once-read-many optical recording media may further comprise a protective layer adjacent to the reflective layer or an interference layer. The material for the protective layer is not specifically limited, as long as it can protect the reflective layer and/or interference layer from external force. Examples of organic materials are thermoplastic resins, thermosetting resins, electron beam curable resins, and ultraviolet curable resins. Examples of inorganic materials are $SiO_2$, $SiN_4$, $MgF_2$ and $SnO_2$.

A layer of a thermoplastic resin or thermosetting resin can be formed by dissolving the resin in a suitable solvent to form a coating composition and applying and drying a film of the coating composition. A layer of an ultraviolet curable resin can be formed by applying a film of the resin as intact or as a coating composition in a suitable solvent, and applying ultraviolet rays to the film to thereby cure the resin. Examples of the ultraviolet curable resin are urethane acrylates, epoxy acrylates, polyester acrylates and other acrylate resins.

Each of these materials can be used alone or in combination. The resulting layer can comprise a single layer or multiple layers.

The protective layer can be formed typically by coating such as spin coating or casting, sputtering or chemical vapor deposition, of which spin coating is preferred.

The thickness of the protective layer is preferably from 0.1 to 100 $\mu$m, and more preferably from 3 to 30 $\mu$m.

The optical recording medium may further comprise another substrate adjacent to the reflective layer or interference layer. Two optical recording media may be attached with each other so that the reflective layers or interference layers face each other, to form an optical recording medium.

The optical recording medium may have a layer of an ultraviolet curable resin or an inorganic thin film on a free surface of the substrate to thereby protect the surface and to prevent attachment of dusts.

The cover layer is required when a lens with a high numerical aperture is used for higher recording density. With an increasing numeral aperture, a portion through which the reproducing light passes must have a decreased thickness. If the perpendicular direction to the plane of the medium deviates from the optical axis of an optical pickup at a certain angle (tilt angle), aberration occurs. The allowance in the aberration decreases with an increasing numerical aperture. The tilt angle is in proportional to the square of the product of reciprocal of the wavelength of an optical source and the numerical aperture of the objective lens and is susceptible to the aberration due to the thickness of the substrate.

To reduce the influence of the aberration on the tilt angle, the thickness of the substrate is reduced.

For this purpose, some optical recording media (ROM media) comprise a substrate, depressions and protrusions on the substrate as a recording layer, and an optically transparent thin cover layer in this order, in which the reproducing light is applied from the cover layer to reproduce information in the recording layer. Other optical recording media comprise a substrate, a reflective layer, a recording layer and an optically transparent cover layer in this order, in which the reproducing light is applied from the cover layer to reproduce information in the recording layer.

Thus, the media can allow the use of an objective lens with a high numerical aperture by decreasing the thickness of the cover layer. Namely, higher-density recording can be performed by recording and/or reproducing information on media having a thin cover layer, in which the reproducing light is applied from the cover layer side.

The cover layer may generally comprise a polycarbonate sheet or an ultraviolet curable resin. The cover layer for use herein may include an adhesive layer for attaching the cover layer to an adjacent layer.

The wavelength of the laser light for use in the write-once-read-many optical recording media is preferably short for higher-density recording, and is more preferably 500 nm or less and typically preferably from 350 nm to 500 nm. For example, laser light with a center wavelength of 405 nm is suitably used.

Process for Recording and/or reproducing Information on Write-once-read-many Optical Recording Media The process of the present invention is a process for recording and/or reproducing information on the write-once-read-many optical recording medium of the present invention and comprises the processes of forming a recorded area by action of an photoabsorption function of at least one of the first inorganic thin film and the organic thin film at wavelengths at which recording and reproduction is performed.

The process preferably further comprises forming recording marks capable of yielding reproducing signals at three or more different levels and identifying the type of the recording marks based on the reproducing signal levels, and/or further comprises recording and/or reproducing information according to a partial response maximum likelihood (PRML) signal processing system.

Such recording marks capable of yielding reproducing signals at three or more different levels are preferably formed in a plane direction and a thickness direction of at least one of the first inorganic thin film and the organic thin film.

Alternatively, the recording marks capable of yielding reproducing signals at three or more different levels are preferably formed in a plane direction and a thickness direction of at least one of the first inorganic thin film and the second inorganic thin film.

In the process, information is recorded and/or reproduced using light with a wavelength of preferably 500 nm or less, and more preferably from 350 to 500 nm.

The recording marks are preferably formed by the photoabsorption function of the first inorganic thin film through at least one of the following recording mechanisms (1) to (11):

(1) deforming at least one of the first inorganic thin film and the second inorganic thin film;
(2) changing the complex refractive index of at least one of the first inorganic thin film and the second inorganic thin film;
(3) changing the composition of at least one of the first inorganic thin film and the second inorganic thin film;
(4) fusing the first inorganic thin film;
(5) diffusing constitutional elements of the first inorganic thin film into at least one of the second inorganic thin film and the organic thin film;
(6) changing at least one of the crystalline state and crystalline structure of the first inorganic thin film;
(7) oxidizing and/or reducing a constitutional element of the first inorganic thin film;
(8) changing the composition distribution of the first inorganic thin film;
(9) changing the volume of the organic thin film;
(10) changing the complex refractive index of the organic thin film; and
(11) forming a cavity in the organic thin film.

The present invention can provide the following write-once-read-many optical recording media (1) to (7) and information recording-reproducing processes using the same:

(1) a write-once-read-many optical recording medium on which information can be recorded and/or reproduced at a high density by binary recording even at blue-laser wavelengths of 500 nm or less, particularly even at wavelengths around 405 nm, and a process for recording and/or reproducing information on the medium;

(2) a write-once-read-many optical recording medium on which information can be easily recorded and/or reproduced at a high density by multi-level recording even at blue-laser wavelengths of 500 nm or less, particularly even at wavelengths around 405 nm, and a process for recording and/or reproducing information on the medium;

(3) a write-once-read-many optical recording medium on which information can be recorded and/or reproduced at a high density by a PRML signal processing system even at blue-laser wavelengths of 500 nm or less, particularly even at wavelengths around 405 nm, and a process for recording and/or reproducing information on the medium;

(4) a write-once-read-many optical recording medium having wide margins in jitter, error rate and other properties with respect to the variation of recording power, and a process for recording and/or reproducing information on the medium;

(5) a write-once-read-many optical recording medium exhibiting less variation in recording sensitivity, degree of modulation, jitter, error rate and other recording properties and in reflectance with respect to a varying recording-reproducing wavelength, and a process for recording and/or reproducing information on the medium;

(6) a write-once-read-many optical recording medium on which information can be easily recorded and/or reproduced even with the use of a substrate having shallow grooves and having satisfactory moldability, and a process for recording and/or reproducing information on the medium; and (7) a write-once-read-many optical recording medium on which information can be recorded even in its lands, and a process for recording and/or reproducing information on the medium.

EXAMPLES

The present invention will be illustrated in further detail with reference to several examples below, which are not intended to limit the scope of the present invention.

Example 1-1

A write-once-read-many optical recording medium according to the present invention was prepared by sequentially forming, on a polycarbonate substrate with guide grooves 50 nm deep, a $Bi_3Fe_5O_{12}$ thin film (first inorganic thin film) 15 nm thick, wherein [x/(x+y)] is 0.375 and greater than 0.3, by sputtering; an organic thin film comprising a colorant of following Structural Formula (1) and having an average thickness of about 30 nm by spin coating; an Ag reflective layer 150 nm thick by sputtering; and a protective layer about 5 μm thick comprising an ultraviolet curable resin.

The colorant of Structural Formula (1) is for use in conventional DVD–R media and DVD+R media and has little absorption in blue-laser wavelengths.

Structural Formula (1)

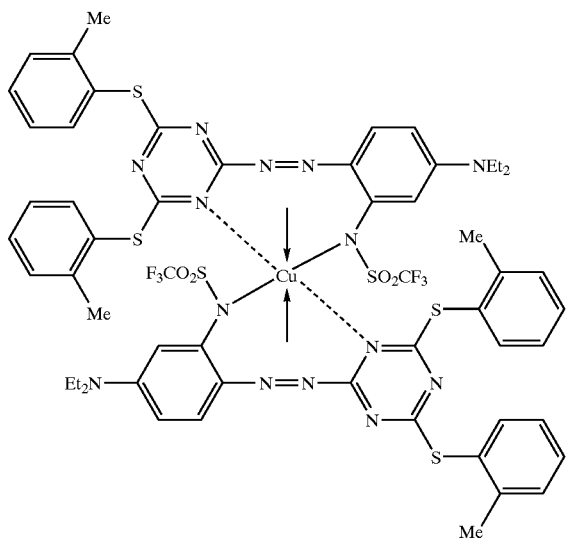

Eight to sixteen modulation signals were recorded on the above-prepared optical recording medium under the following conditions using an optical disk checker DDU-1000 (a product of Pulstec Industrial Co., Ltd.; wavelength: 405 nm, numerical aperture NA: 0.65) according to a conventional binary recording procedure.

Recording Conditions

Recording linear density: 1T of 0.0917 μm

Recording linear velocity: 6.0 m/s

Waveform equalization: normal equalizer

Figure 14:
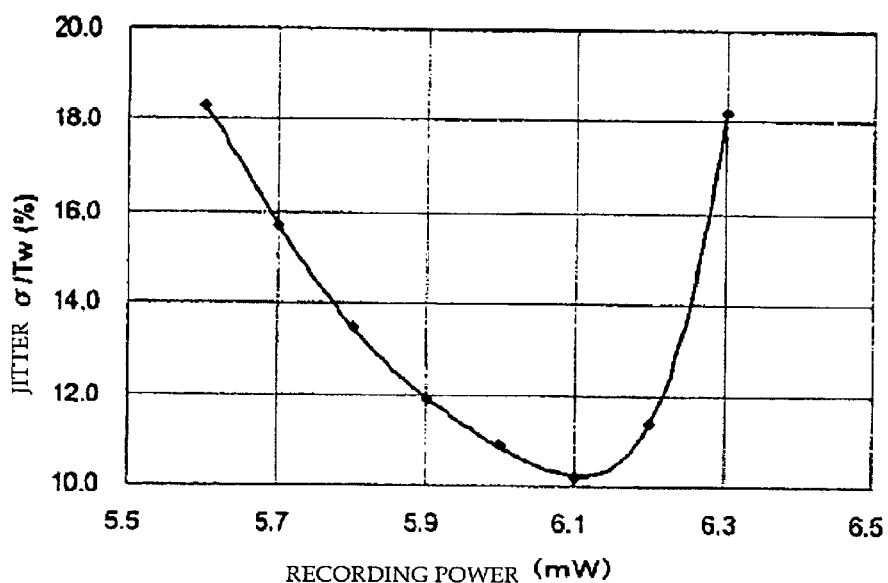
FIG. 14 is a diagram showing binary recording on a write-once-read-many optical recording medium according to Example 1-1.

The medium showed a satisfactorily low jitter of 10.2% at a recording power of 6.1 mW in binary recording (FIG. 14).

The medium having the above-specified composition was then subjected to a storage test at 80° C. at relative humidity of 85% for 100 hours, and an archival jitter and a shelf jitter were determined to find that both jitters only increased 1.0% or less.

The medium showed a deformation of 10 nm at most.

Example 1-2

A write-once-read-many optical recording medium according to the present invention was prepared and was tested by the procedure of Example 1-1, except for using $Bi_3Fe_4Cu_1O_{12}$ instead of $Bi_3Fe_5O_{12}$ as the first inorganic thin film. Information could be recorded on the medium with satisfactory binary recording properties as shown in Table 1.

The medium having the above-specified composition was then subjected to a storage test at 80° C. at relative humidity of 85% for 100 hours, and an archival jitter and a shelf jitter were determined to find that both jitters only increased 1.0% or less.

Example 1-3

A write-once-read-many optical recording medium according to the present invention was prepared and was tested by the procedure of Example 1-1, except for using $Bi_3Fe_1Al_4O_{12}$ instead of $Bi_3Fe_5O_{12}$ as the first inorganic thin film. Information could be recorded on the medium with satisfactory binary recording properties as shown in Table 1.

The medium having the above-specified composition was then subjected to a storage test at 80° C. at relative humidity of 85% for 100 hours, and an archival jitter and a shelf jitter were determined to find that both jitters only increased 1.0% or less.

Example 1-4

A write-once-read-many optical recording medium according to the present invention was prepared and was tested by the procedure of Example 1-1, except for using $Bi_3Al_5O_{12}$ instead of $Bi_3Fe_5O_{12}$ as the first inorganic thin film. Information could be recorded on the medium with satisfactory binary recording properties as shown in Table 1.

The medium having the above-specified composition was then subjected to a storage test at 80° C. at relative humidity of 85% for 100 hours, and an archival jitter and a shelf jitter were determined to find that both jitters only increased 1.0% or less.

Example 1-5

A write-once-read-many optical recording medium according to the present invention was prepared and was tested by the procedure of Example 1-1, except for using $Bi_{38}Dy_8Fe_{41}Ga_{13}O_{12}$ instead of $Bi_3Fe_5O_{12}$ as the first inorganic thin film. Information could be recorded on the medium with satisfactory binary recording properties as shown in Table 1.

The medium having the above-specified composition was then subjected to a storage test at 80° C. at relative humidity of 85% for 100 hours, and an archival jitter and a shelf jitter were determined to find that both jitters only increased 1.0% or less.

Example 1-6

A write-once-read-many optical recording medium according to the present invention was prepared and was tested by the procedure of Example 1-1, except for using $In_3Fe_5O_{12}$ instead of $Bi_3Fe_5O_{12}$ as the first inorganic thin film. Information could be recorded on the medium with satisfactory binary recording properties as shown in Table 1.

The medium having the above-specified composition was then subjected to a storage test at 80° C. at relative humidity of 85% for 100 hours, and an archival jitter and a shelf jitter were determined to find that both jitters only increased 1.0% or less.

Example 1-7

A write-once-read-many optical recording medium according to the present invention was prepared and was tested by the procedure of Example 1-1, except for using a colorant of following Structural Formula (2) instead of the colorant of Structural Formula (1). Information could be recorded on the medium with satisfactory binary recording properties as shown in Table 1. The organic material (colorant) of Structural Formula (2) is a material usable in conventional DVD–R media DVD+R media, has a major absorption band at wavelengths longer than the recording-reproducing wavelengths, but has a low, broad absorption at blue-laser wavelengths as shown in FIG. 13.

On the medium of the present example, information can be recorded by photoabsorption functions of both the $Bi_3Fe_5O_{12}$ thin film and the organic thin film comprising the colorant of Structural Formula (2) and can reduce the optimum recording power by factor of about 1.0 mW.

The medium having the above-specified composition was then subjected to a storage test at 80° C. at relative humidity of 85% for 100 hours, and an archival jitter and a shelf jitter were determined to find that both jitters only increased 1.0% or less.

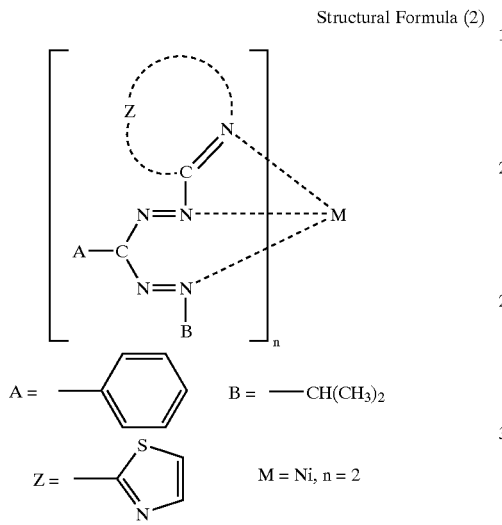

Structural Formula (2)

tested by the procedure of Example 1-1, except for using $Bi_{1.5}Fe_5O_z$ [z cannot be identified; [x/(x+y)] is 0.75 and is larger than 0.3] instead of $Bi_3Fe_5O_{12}$ as the first inorganic thin film. Information could be recorded on the medium with satisfactory binary recording properties as shown in Table 1.

The medium having the above-specified composition was then subjected to a storage test at 80° C. at relative humidity of 85% for 100 hours, and an archival jitter and a shelf jitter were determined to find that both jitters only increased 1.0% or less.

Example 1-10

A write-once-read-many optical recording medium according to the present invention was prepared and was tested by the procedure of Example 1-1, except for using $Bi_2O_3$ [[x/(x+y)] is 1.0 and is larger than 0.3] instead of $Bi_3Fe_5O_{12}$ as the first inorganic thin film. Information could be recorded on the medium with satisfactory binary recording properties as shown in Table 1.

The medium having the above-specified composition was then subjected to a storage test at 80° C. at relative humidity of 85% for 100 hours, and an archival jitter and a shelf jitter were determined to find that both jitters only increased 1.0% or less.

These results are shown in Table 1.

TABLE 1

|  | First inorganic thin film | Target composition | Thickness of first inorganic thin film | Organic material | Recording power (mW) | Jitter (%) |
| --- | --- | --- | --- | --- | --- | --- |
| Example 1-1 | BiFeO | $Bi_3Fe_5O_{12}$ | 15 | Structural Formula 1 | 6.1 | 10.2 |
| Example 1-2 | BiFeCuO | $Bi_3Fe_4Cu_1O_{12}$ | 15 | Structural Formula 1 | 6.2 | 10.0 |
| Example 1-3 | BiFeAlO | $Bi_3Fe_1Al_4O_{12}$ | 17 | Structural Formula 1 | 6.8 | 10.7 |
| Example 1-4 | BiAlO | $Bi_3Al_5O_{12}$ | 20 | Structural Formula 1 | 7.0 | 10.9 |
| Example 1-5 | BiDyFeGaO | $Bi_{38}Dy_8Fe_{41}Ga_{13}O_{12}$ | 15 | Structural Formula 1 | 6.8 | 10.6 |
| Example 1-6 | InFeO | $In_3Fe_5O_{12}$ | 20 | Structural Formula 1 | 6.8 | 10.9 |
| Example 1-7 | BiFeO | $Bi_3Fe_5O_{12}$ | 15 | Structural Formula 2 | 5.2 | 10.2 |
| Example 1-8 | BiFeO | $Bi_6Fe_5O_z$ | 15 | Structural Formula 1 | 5.8 | 9.7 |
| Example 1-9 | BiFeO | $Bi_{1.5}Fe_5O_z$ | 15 | Structural Formula 1 | 5.7 | 9.8 |
| Example 1-10 | BiO | $Bi_2O_3$ | 15 | Structural Formula 1 | 5.6 | 9.7 |

Example 1-8

A write-once-read-many optical recording medium according to the present invention was prepared and was tested by the procedure of Example 1-1, except for using $Bi_6Fe_5O_z$ [z cannot be identified; [x/(x+y)] is 0.545 and is larger than 0.3] instead of $Bi_3Fe_5O_{12}$ as the first inorganic thin film. Information could be recorded on the medium with satisfactory binary recording properties as shown in Table 1.

The medium having the above-specified composition was then subjected to a storage test at 80° C. at relative humidity of 85% for 100 hours, and an archival jitter and a shelf jitter were determined to find that both jitters only increased 1.0% or less.

Example 1-9

A write-once-read-many optical recording medium according to the present invention was prepared and was

Comparative Example 1-1

A write-once-read-many optical recording medium according to the present invention was prepared and was tested by the procedure of Example 1-1, except for using $Bi_1Fe_5O_z$ [z cannot be identified; [x/(x+y)] is 0.167 and is larger than 0.3] instead of $Bi_3Fe_5O_{12}$ as the first inorganic thin film. The medium showed a jitter exceeding 15%, and information could not be satisfactorily recorded thereon.

Comparative Example 1-2

A write-once-read-many optical recording medium according to the present invention was prepared and was tested by the procedure of Example 1-1, except for using $Bi_1Fe_5O_z$ [z cannot be identified; [x/(x+y)] is 0.286 and is larger than 0.3] instead of $Bi_3Fe_5O_{12}$ as the first inorganic thin film. The medium showed a jitter exceeding 15%, and information could not be satisfactorily recorded thereon.

Example 1-11

A write-once-read-many optical recording medium according to the present invention was prepared and was tested by the procedure of Example 1-1, except for using $MoO_3$ instead of $Bi_3Fe_5O_{12}$ as the first inorganic thin film. Information could be satisfactorily recorded on the medium with a low jitter of 11% or less.

The medium having the above-specified composition was then subjected to a storage test at 80° C. at relative humidity of 85% for 100 hours, and an archival jitter and a shelf jitter were determined to find that both jitters only increased 0.8% or less.

Example 1-12

A write-once-read-many optical recording medium according to the present invention was prepared and was tested by the procedure of Example 1-1, except for using $V_2O_5$ instead of $Bi_3Fe_5O_{12}$ as the first inorganic thin film. Information could be satisfactorily recorded on the medium with a low jitter of 11% or less.

The medium having the above-specified composition was then subjected to a storage test at 80° C. at relative humidity of 85% for 100 hours, and an archival jitter and a shelf jitter were determined to find that both jitters only increased 0.8% or less.

Example 1-13

A write-once-read-many optical recording medium according to the present invention was prepared by sequentially forming, on a polycarbonate substrate with guide grooves 50 nm deep, a $Bi_aSi_bO_d$ thin film (BiO film; first inorganic thin film) 12 nm thick by sputtering; an organic thin film comprising the colorant of Structural Formula (1) as in Example 1-1 and having an average thickness of about 30 nm by spin coating; an Ag reflective layer 100 nm thick by sputtering; and a protective layer about 5 $\mu$m thick comprising an ultraviolet curable resin.

Eight to sixteen modulation signals were recorded on the above-prepared optical recording medium under the following conditions using an optical disk checker DDU-1000 (a product of Pulstec Industrial Co., Ltd.; wavelength: 405 nm, numerical aperture NA: 0.65) according to a conventional binary recording procedure.

Recording Conditions

Recording linear density: 1T of 0.0917 $\mu$m

Recording linear velocity: 6.0 m/s.

Waveform equalization: normal equalizer

A series of media was prepared by the above procedure except for varying the composition of the $Bi_aSi_bO_d$ thin film, to find that the media showed a jitter of about 12% or less. Among them, media having a composition wherein a, b and d satisfy the following conditions: $10 \leq a \leq 40$, $3 \leq b \leq 20$, and $50 \leq d \leq 70$, showed a satisfactorily low jitter of 10% or less at a recording power of about 7.2 mW and had satisfactory binary recording properties.

The medium having the above-specified composition was then subjected to a storage test at 80° C. at relative humidity of 85% for 100 hours, and an archival jitter and a shelf jitter were determined to find that both jitters only increased 0.5% or less.

The protective layer of ultraviolet curable resin and Ag reflective layer were removed from the recorded write-once-read-many optical recording medium, and the organic thin film was washed out with ethanol. Deformation of the exposed surface of the $Bi_aSi_bO_d$ thin film was observed with an atomic force microscope (AFM) to find that the deformation was 17 nm at most.

Example 1-14

A series of write-once-read-many optical recording media according to the present invention was prepared and was tested by the procedure of Example 1-13, except for using $Bi_aGe_bO_d$ instead of $Bi_aSi_bO_d$. The media having a composition of the BiO film (first inorganic thin film), wherein a, b and d satisfy the above conditions as in Example 1-13, showed a satisfactorily low jitter of 10% or less at a recording power of about 7.2 mW and had satisfactory recording properties.

The medium having the above-specified composition was then subjected to a storage test at 80° C. at relative humidity of 85% for 100 hours, and an archival jitter and a shelf jitter were determined to find that both jitters only increased 0.8% or less.

Example 1-15

A series of write-once-read-many optical recording media according to the present invention was prepared and was tested by the procedure of Example 1-13, except for using $Bi_aSi_bFe_cO_d$ instead of $Bi_aSi_bO_d$ as the first inorganic thin film. Among the prepared media, those having a composition of the $Bi_aSi_bFe_cO_d$ thin film (BiOM film; first inorganic thin film), wherein a, b, c and d satisfy the following conditions: $10 \leq a \leq 40$, $3 \leq b \leq 20$, $3 \leq c \leq 20$, and $50 \leq d \leq 70$, showed a satisfactorily low jitter of 10% or less at a recording power of about 7.5 mW and had satisfactory binary recording properties.

The medium having the above-specified composition was then subjected to a storage test at 80° C. at relative humidity of 85% for 100 hours, and an archival jitter and a shelf jitter were determined to find that both jitters only increased 0.5% or less.

Example 1-16

A series of write-once-read-many optical recording media according to the present invention was prepared and was tested by the procedure of Example 1-15, except for using $Bi_3SiM_4O_{12}$, wherein M is one of Al, Cr, Mn, In, Co, Cu, Ni, Zn and Ti, instead of $Bi_aSi_bFe_cO_d$ as the first inorganic thin film. The prepared media having any of the above specified elements as M showed a satisfactorily low jitter of 10% or less at a recording power of about 7.0 mW and had satisfactory binary recording properties.

The medium having the above-specified composition was then subjected to a storage test at 80° C. at relative humidity of 85% for 100 hours, and an archival jitter and a shelf jitter were determined to find that both jitters only increased 0.5% or less.

Example 1-17

A write-once-read-many optical recording medium according to the present invention was prepared by sequentially forming, on a polycarbonate substrate with guide grooves 50 nm deep, an organic thin film comprising the colorant of Structural Formula (1) as in Example 1-1 and having an average thickness of about 30 nm by spin coating; a $Bi_aSi_bO_d$ thin film (BiO film; first inorganic thin film) 25 nm thick by sputtering; an Ag reflective layer 25 nm thick by sputtering; and a protective layer about 5 $\mu$m thick comprising an ultraviolet curable resin.

A series of media was prepared by the procedure of Example 1-13 except for varying the composition of the $Bi_aSi_bO_d$ thin film, to find that the media showed a jitter of about 12% or less. Among them, media having a composition wherein a, b and d satisfy the following conditions: $10 \leq a \leq 40, 3 \leq b \leq 20$, and $50 \leq d \leq 70$, showed a satisfactorily low jitter of 10% or less at a recording power of about 7.4 mW and had satisfactory binary recording properties.

The medium having the above-specified composition was then subjected to a storage test at 80° C. at relative humidity of 85% for 100 hours, and an archival jitter and a shelf jitter were determined to find that both jitters only increased 0.8% or less.

Example 1-18

A write-once-read-many optical recording medium according to the present invention was prepared and was tested by the procedure of Example 1-13, except for using the colorant of Structural Formula (2) as in Example 1-7 instead of the colorant of Structural Formula (1). Information could be satisfactorily recorded on the medium showed by binary recording. The organic material (colorant) of Structural Formula (2) is a material usable in conventional DVD–R media DVD+R media, has a major absorption band at wavelengths longer than the recording-reproducing wavelengths, but has a low, broad absorption at blue-laser wavelengths as shown in FIG. 13.

On the medium of the present example, information can be recorded by photoabsorption functions of both the $Bi_a$-$Si_bO_d$ thin film and the organic thin film comprising the colorant of Structural Formula (2) and can reduce the optimum recording power by factor of about 1.0 mW.

The medium having the above-specified composition was then subjected to a storage test at 80° C. at relative humidity of 85% for 100 hours, and an archival jitter and a shelf jitter were determined to find that both jitters only increased 1.0% or less.

Comparative Example 1-3

A write-once-read-many optical recording medium was prepared by sequentially forming, on a polycarbonate substrate with guide grooves 50 nm deep, an organic thin film comprising FOM-559 (phthalocyanine, available from Wako Pure Chemical Industries, Ltd.) and having an average thickness of about 80 nm by spin coating; an Ag reflective layer 150 nm thick by sputtering; and a protective layer about 5 μm thick comprising an ultraviolet curable resin. This is a comparative example of the application of a conventional layer configuration to recording at blue-laser wavelengths.

The phthalocyanine FOM-559 (Wako Pure Chemical Industries, Ltd.) shows a relatively small imaginary part of complex refractive index (absorption coefficient) and a relatively large real part thereof at around 405 nm, i.e., recording-reproducing wavelengths, as in organic materials used in conventional write-once-read-many optical recording media.

Eight to sixteen modulation signals were recorded on the above-prepared optical recording medium under the following conditions using an optical disk checker DDU-1000 (a product of Pulstec Industrial Co., Ltd.; wavelength: 405 nm, numerical aperture NA: 0.65) according to a conventional binary recording procedure.

Recording Conditions

Recording linear density: 1T of 0.0917 μm

Recording linear velocity: 6.0 m/s

Waveform equalization: normal equalizer

The medium showed a jitter of 10.1% at a recording power of about 11.0 mW.

The medium was then subjected to a storage test at 80° C. at relative humidity of 85% for 100 hours, and an archival jitter and a shelf jitter were determined to find that both jitters increased 0.6% or less.

However, the medium showed a maximum deformation exceeding 100 nm, indicating that the substrate deforms to an extent exceeding the depth of its guide grooves. The deformation herein was determined by removing the protective layer of ultraviolet curable resin and the Ag reflective layer from the recorded write-once-read-many optical recording medium, washing out the organic thin film with ethanol, and observing the deformation of the surface of substrate with an atomic force microscope (AFM) (FIG. 15).

Figure 15:
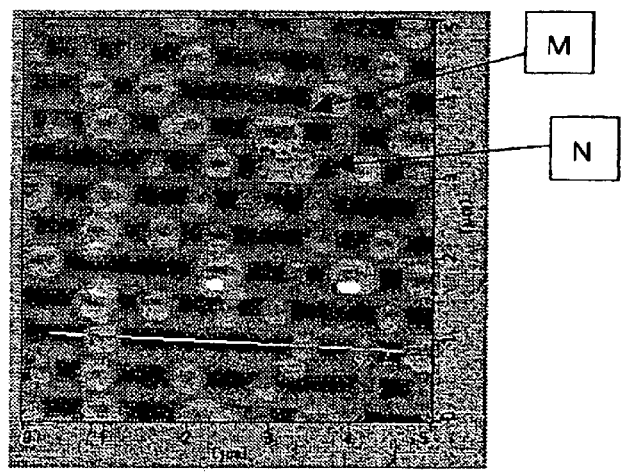
FIG. 15 is an AFM image of deformation of the substrate of a write-once-read-many optical recording medium according to Comparative Example 1-1.

With reference to FIG. 15, deformation of a recording mark (M) interferes with deformation of another recording mark (N) that was recorded previously to the former in an adjacent track, thus significantly modifying the deformation of the latter.

These results show that the medium is disadvantageous in higher-density recording.

Example 1-19

Information was recorded on the write-once-read-many optical recording medium prepared in Example 1-1 by eight-level recording under the following conditions using an optical disk checker DDU-1000 (a product of Pulstec Industrial Co., Ltd.; wavelength: 405 nm, numerical aperture NA: 0.65).

Recording Conditions

Recording linear density: cell length of 0.47 μm

Recording linear velocity: 3.5 m/s

Figure 16:
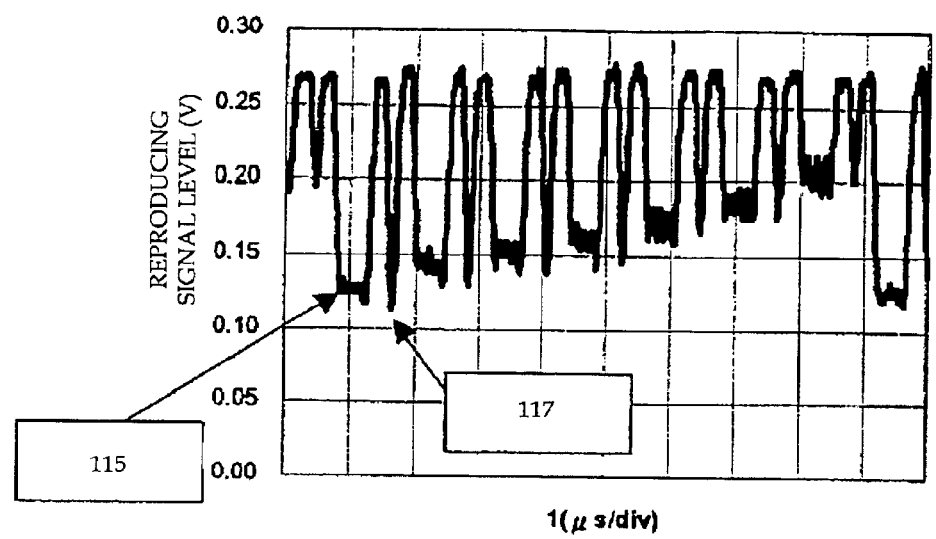
FIG. 16 is a diagram showing eight-level recording on a write-once-read-many optical recording medium according to Example 1-8.

Recording pattern: isolated mark and successive mark, in which four successive marks at one level and one isolated mark were recorded at different seven levels with the interposition of two blank cells As a result, information could be recorded on the medium with a sufficiently high degree of modulation (dynamic range) of 60% and with a very small variation multiple recording levels even in successively recorded areas (FIG. 16). In FIG. 16, one of successive marks is designated with arrow 115 and one of isolated marks with arrow 117.

In the above test, information was recorded in grooves of the medium by multi-level recording. Another test revealed that it could also be satisfactorily recorded even in lands.

Example 1-20

Information was recorded on the write-once-read-many optical recording medium prepared in Example 1-13 by the eight-level recording procedure of Example 1-19.

Information can be recorded on the medium with a sufficiently high degree of modulation (dynamic range) of 60% and with a very small variation in multiple recording levels even in successively recorded areas as in Example 1-19.

In the above test, information was recorded in grooves of the medium by multi-level recording. Another test revealed that it could also be satisfactorily recorded even in lands.

Comparative Example 1-4

Information was recorded on the write-once-read-many optical recording medium prepared in Comparative Example 1-3 by eight-level recording under the following conditions using an optical disk checker DDU-1000 (a product of Pulstec Industrial Co., Ltd.; wavelength: 405 nm, numerical aperture NA: 0.65).

Recording Conditions

Recording linear density: cell length of 0.47 μm

Recording linear velocity: 3.5 m/s

Recording pattern: isolated mark and successive mark as in

Example 1-19

Figure 17:
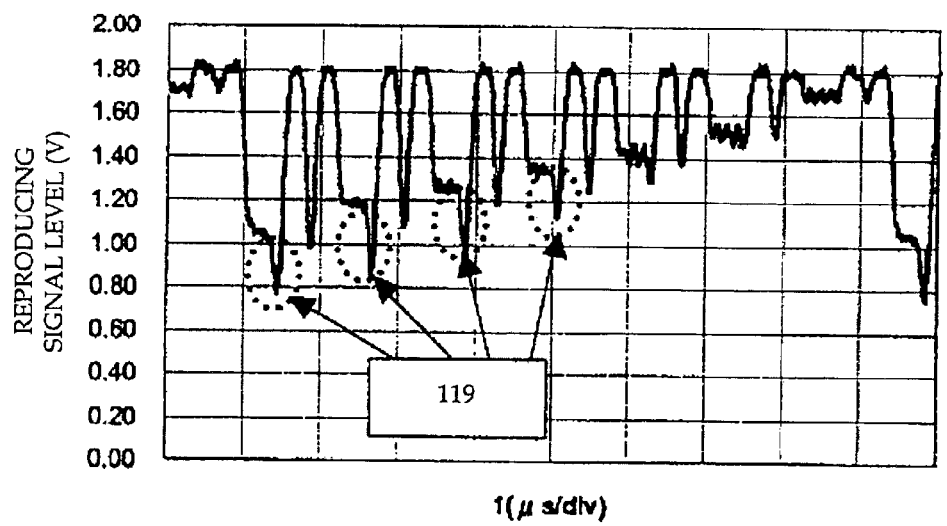
FIG. 17 is a diagram showing eight-level recording on a write-once-read-many optical recording medium according to Comparative Example 1-2.

The results are shown in FIG. 17, indicating that the medium shows "drops 119 in degree of modulation" in successively recorded areas and a very large variation in multiple recording levels, and that the medium is not suitable for multi-level recording. This is because the reproducing levels must be kept constant in such successively recorded areas in multi-level recording. At a low recording power, the medium showed no drop in degree of modulation but had a much decreased degree of modulation (dynamic range) of 20% and a decreased signal-to-noise ratio (SNR).

Then, the protective layer of ultraviolet curable resin and the Ag reflective layer were removed from the recorded write-once-read-many optical recording medium, the organic thin film was washed out with ethanol, and deformation of the surface of substrate was observed with an atomic force microscope (AFM).

Figure 18A:
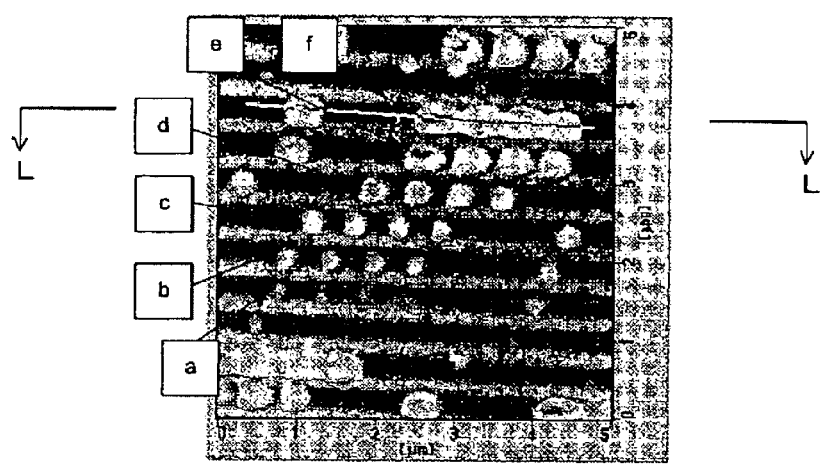
FIGS. 18A and 18B are an AFM image and a cross sectional view along the lines L—L of FIG. 18A, respectively, of deformed substrate of a write-once-read-many optical recording medium according to Comparative Example 1-2.
Figure 18B:
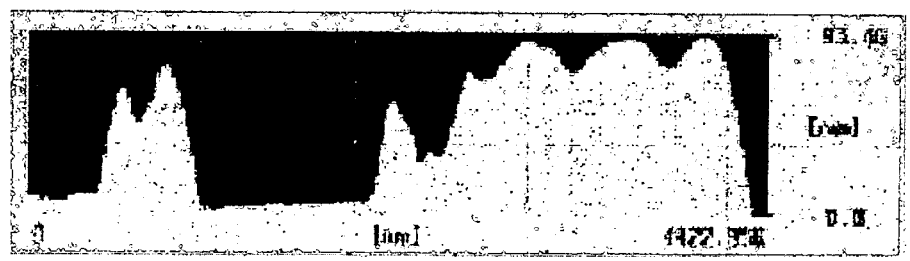

With reference to FIGS. 18A and 18B, nonlinear interference among recording marks was observed in successively recorded areas (d),(e) and (f) in which recording marks with large sizes were recorded in cells, verifying that the "drops in degree of modulation" is caused by remarkable modification of deformed waveforms due to interference.

Figure 19:
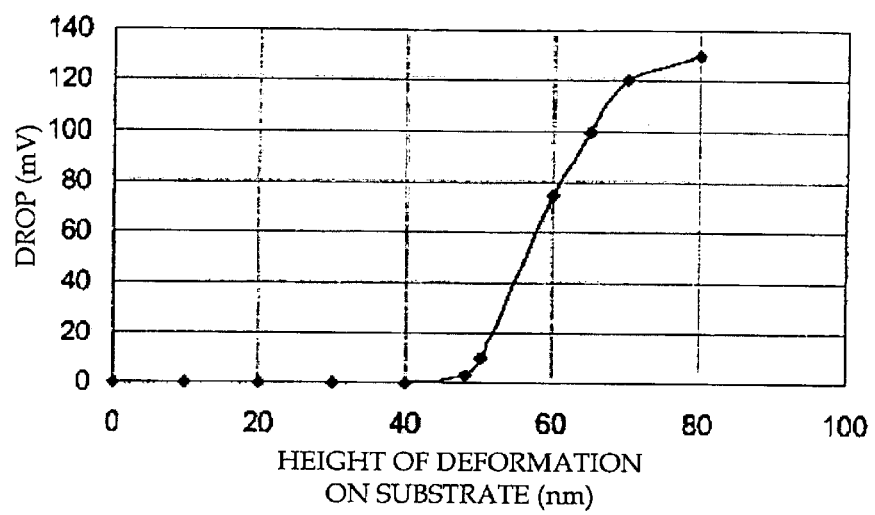
FIG. 19 is a diagram showing the relationship between the deformation height on the surface of substrate and the amount of drops of a write-once-read-many optical recording medium according to Comparative Example 1-2.

Then, the relationship between the deformation of the substrate and the drop in degree of modulation (the difference of reproducing levels between the head and tail of successively recorded marks) was determined (FIG. 19). At a deformation exceeding about 50 nm, information cannot be recorded at a uniform level in successively recorded areas, which is not suitable for multi-level recording.

More specifically, the write-once-read-many optical recording medium according to Comparative Example 1-4 cannot be applied to multi-level recording unless it has a reduced deformation. However, the medium cannot yield a sufficiently high degree of modulation unless it has a large deformation.

In the above test, information was recorded in grooves of the medium by multi-level recording. However, no information could be recorded in its lands.

Example 1-21

Information was recorded by the eight-level recording procedure of Example 1-19, except at a smaller cell length of 0.26 μm.

Figure 20:
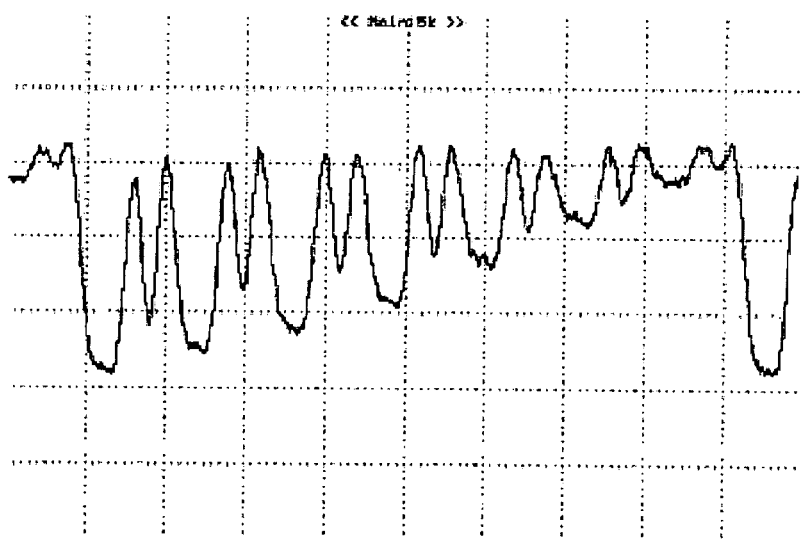
FIG. 20 is a diagram showing eight-level recording on a write-once-read-many optical recording medium according to Example 1-9.

As a result, information could be recorded on the medium with a sufficiently high degree of modulation (dynamic range) of 60% and with a very small variation multiple recording levels even in successively recorded areas (FIG. 20).

Then, deformation was observed by removing the protective layer of ultraviolet curable resin and the Ag reflective layer from the recorded write-once-read-many optical recording medium, washing out the organic thin film with ethanol, and observing the surface of the BiFeO film with a scanning electron microscope (SEM).

Figure 21:
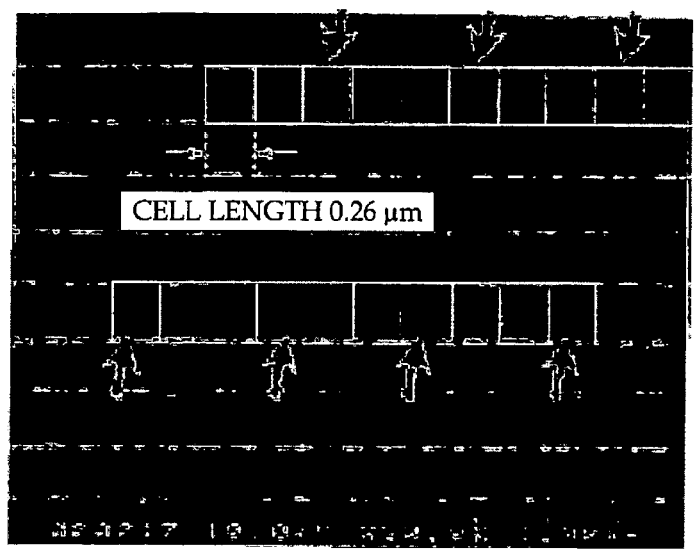
FIG. 21 is a diagram of scanning electron microscopic observation of the BiFeO surface of the write-once-read-many optical recording medium according to Example 1-9.

The result is shown in FIG. 21, showing that significant deformation is not observed in the scanning electron micrograph and recording marks are formed with substantially no deformation.

The surface and cross section of the recorded area were observed with a transmission electron microscope (TEM), showing that information can be recorded on the write-once-read-many optical recording medium of the present invention at multiple levels both in a plane direction and a thickness direction of the BiFeO thin film and/or the organic thin film.

Example 1-22

Information was recorded by the eight-level recording procedure of Example 1-20, except at a smaller cell length of 0.26 μm.

Information can be recorded on the medium with a sufficiently high degree of modulation (dynamic range) of 60% and with a very small variation in multiple recording levels even in successively recorded areas as in Example 1-21.

Then, deformation was observed by removing the protective layer of ultraviolet curable resin and the Ag reflective layer from the recorded write-once-read-many optical recording medium, washing out the organic thin film with ethanol, and observing the surface of the $Bi_aSi_bO_d$ film with a scanning electron microscope (SEM). Recording marks were formed with substantially no deformation as in Example 1-21.

The surface and cross section of the recorded area were observed with a transmission electron microscope (TEM), showing that information can be recorded on the write-once-read-many optical recording medium of the present invention at multiple levels both in a plane direction and a thickness direction of the $Bi_aSi_bO_d$ thin film and/or the organic thin film.

Example 1-23

Information was recorded and reproduced on the write-once-read-many optical recording medium prepared in Example 1-1 by a PR (1,2,1) system at such a recording linear density as to yield a minimum mark length of 0.205 μm.

The medium showed a jitter exceeding 20% in regular binary recording but had a bit error rate (BER) on the order of $10^{-5}$ when the signals were decoded by the PRML system, showing that information can be recorded and reproduced on the medium very satisfactorily.

Example 1-24

Information was recorded and reproduced on the write-once-read-many optical recording medium prepared in Example 1-13 by a PR (1,2,1) system at such a recording linear density as to yield a minimum mark length of 0.205 μm.

The medium showed a jitter exceeding 20% in regular binary recording but had a bit error rate (BER) on the order of $10^{-5}$ when the signals were decoded by the PRML system, showing that information can be recorded and reproduced on the medium very satisfactorily.

Comparative Example 1-5

Information was recorded and reproduced on the write-once-read-many optical recording medium prepared in Comparative Example 1-3 by a PR (1,2,1) system at such a recording linear density as to yield a minimum mark length of 0.205 μm.

The medium showed a jitter exceeding 20% in regular binary recording and had a bit error rate (BER) on the order of $10^{-3}$ when the signals were decoded by the PRML system, showing that information cannot be recorded and reproduced on the medium at this recording linear density even by the PRML system.

Example 1-25

Figure 22:
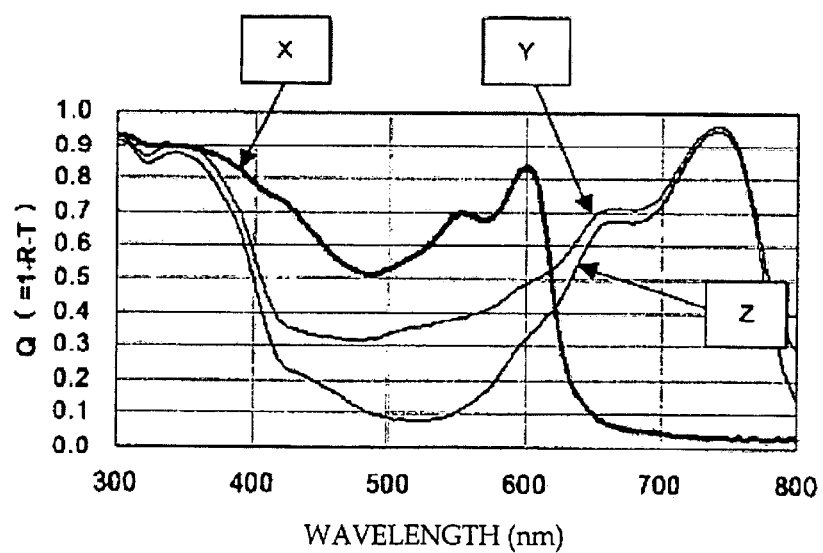
FIG. 22 is a diagram showing absorption factors Q of write-once-read-many optical recording media according to Example 1-1 and Comparative Example 1-1 and of a commercially available CD-R medium.

The absorption factor Q of the write-once-read-many optical recording medium prepared in Example 1-1 was determined (FIG. 22). More specifically, the reflectance R and the transmittance T of the optical recording medium were measured, and the absorption factor Q (X in FIG. 22) was calculated as 1-R-T.

For comparison, the absorption factors Q of a commercially available CD-R medium (Z in FIG. 22) using a phthalocyanine compound on which information can be recorded and reproduced even at blue-laser wavelengths and of the write-once-read-many optical recording medium prepared in Comparative Example 1-3 (Y in FIG. 22) were determined by the above procedure. In this connection, information cannot be recorded and reproduced on the commercially available CD-R medium using the phthalocyanine compound as intact at such a track pitch and thickness of the substrate as to be applied to the tester for tests at blue-laser wavelengths. However, information was recorded and reproduced on the commercially available CD-R medium using the tester for test at blue-laser wavelengths by breaking the medium, dissolving the phthalocyanine compound in a solvent to give a solution, and applying the solution to a substrate sensitive to blue-laser wavelengths.

With reference to FIG. 22, the write-once-read-many optical recording medium of Example 1-1 according to the present invention has a very little variation of absorption factor Q at wavelengths of 500 nm or less, typically at wavelengths around 400 nm.

These results show that the write-once-read-many optical recording media of the present invention have little variation in recording properties such as recording sensitivity, degree of modulation, jitter and error rate and in reflectance with varying recording-reproducing wavelengths.

Example 1-26

To verify on which recording mechanism recording marks are formed in the write-once-read-many optical recording medium prepared in Example 1-1, a test was performed.

Specifically, a recorded area of the write-once-read-many optical recording medium prepared in Example 1-1 was cut by a focused ion beam (FIB) micromachine and was observed with a transmission electron microscope (TEM).

Figure 23:
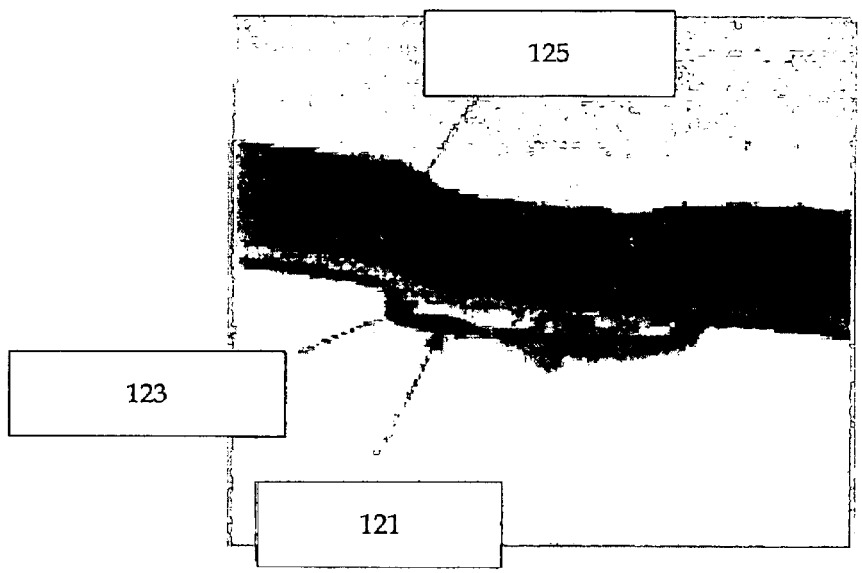
FIG. 23 is a transmission electron micrograph of a recorded area of a write-once-read-many optical recording medium according to Example 1-1 as a specimen cut by focused ion beam (FIB).

The result is shown in FIG. 23, showing that constitutional elements of the BiFeO thin film 121 diffuse into adjacent layers, the substrate and the organic thin film 123, and the composition of the BiFeO thin film may change in the recorded area. The thick dark layer 125 above the organic thin film 123 is the Ag reflective layer. Electron diffraction analysis shows that crystallization occurs and crystals are formed in the recorded area.

The organic thin film includes some cavities with a varied complex refractive index.

These results show that information is recorded according to the present invention not mainly based on deformation.

Example 1-27

To verify on which recording mechanism recording marks are formed in the write-once-read-many optical recording medium prepared in Example 1-13, a test was performed.

Specifically, a recorded area of the write-once-read-many optical recording medium prepared in Example 1-13 was cut by a focused ion beam (FIB) micromachine and was observed with a transmission electron microscope (TEM).

The result shows that constitutional elements of the $Bi_aSi_bO_d$ thin film diffuse into adjacent layers, the substrate and the organic thin film, and the composition of the $Bi_aSi_bO_d$ thin film may change in the recorded area, as in Example 1-26. Electron diffraction analysis shows that crystallization occurs and crystals are formed in the recorded area.

The organic thin film includes some cavities with a varied complex refractive index.

These results show that information is recorded according to the present invention not mainly based on deformation.

Example 2-1-1

A write-once-read-many optical recording medium according to the present invention was prepared in the following manner. On a polycarbonate substrate 0.6 mm thick with guide grooves 50 nm deep were sequentially formed a ZnS—$SiO_2$ thin film (second inorganic thin film, ZnS:$SiO_2$=85:15) 65 nm thick and a BiFeO thin film (first inorganic thin film, target composition: $Bi_3Fe_5O_{12}$) 15 nm thick by sputtering.

On the BiFeO thin film were sequentially formed an organic thin film comprising the colorant of following Structural Formula (1) and having an average thickness of about 30 nm by spin coating; an Ag reflective layer 150 nm thick by sputtering; and a protective layer about 5 μm thick comprising an ultraviolet curable resin to yield the medium.

The colorant of Structural Formula (1) is for use in conventional DVD-R media and DVD+R media and has little absorption in blue-laser wavelengths.

Structural Formula (1)

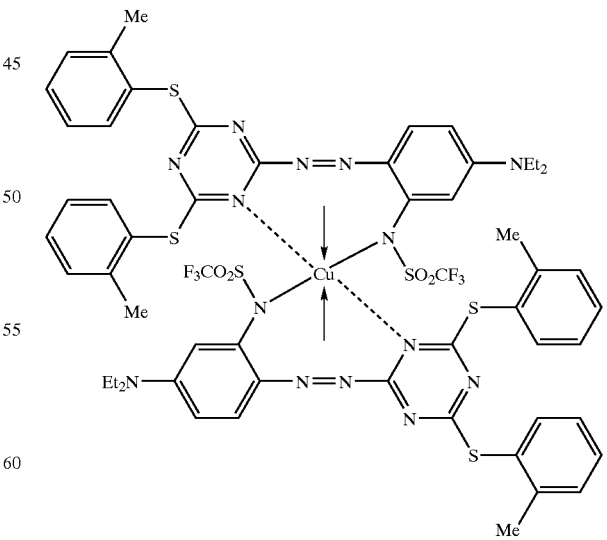

Information was recorded on the above-prepared optical recording medium under the following conditions using an optical disk checker DDU-1000 (a product of Pulstec Industrial Co., Ltd.; wavelength: 405 nm, numerical aperture NA: 0.65) according to a conventional binary recording procedure.

Recording Conditions

Modulation system: eight to sixteen modulation

Recording linear density: 1T of 0.0917 μm minimum mark length 3T of 0.275 (μm)

Recording linear velocity: 6.0 m/s

Waveform equalization: normal equalizer

Figure 25:
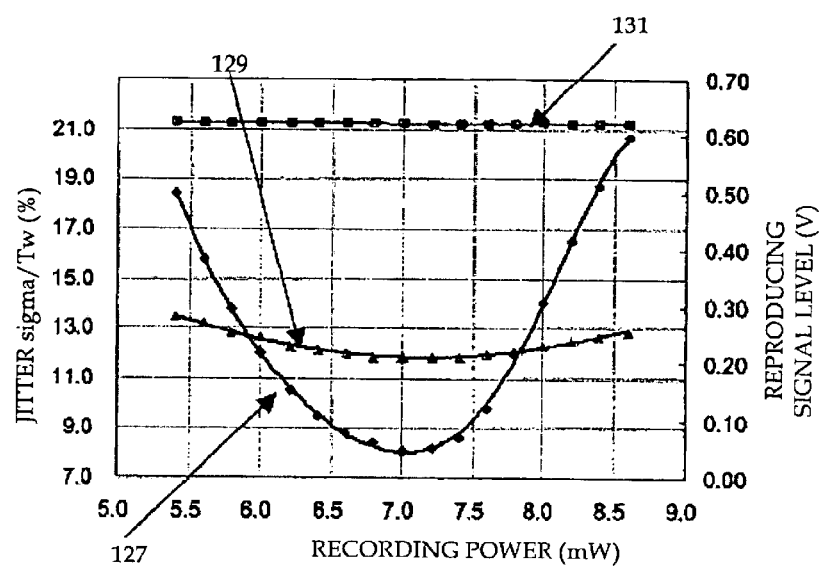
FIG. 25 is a diagram showing binary recording on a write-once-read-many optical recording medium according to Example 2-1-1.

The medium showed a satisfactorily low jitter of 8.0% at a recording power of 7.0 mW in binary recording (FIG. 25). In FIG. 25, curve 127 designates jitter, curve 129 reproducing signal levels in marks, and curve 131 reproducing signal levels in spaces.

In addition, information could be recorded on the medium with a high degree of modulation and a wide recording power margin without significant variation of the reproducing signal levels (RF levels) in the recorded marks even at a recording power higher than the optimum recording power.

Then, deformation was observed in the following manner. The protective layer of ultraviolet curable resin and the Ag reflective layer were removed from the recorded write-once-read-many optical recording medium, the organic thin film was washed out with ethanol, and the deformation of the surface of BiFeO thin film was observed with an atomic force microscope (AFM).

The medium showed a deformation of 20 nm at most.

Example 2-1-2

Figure 24:
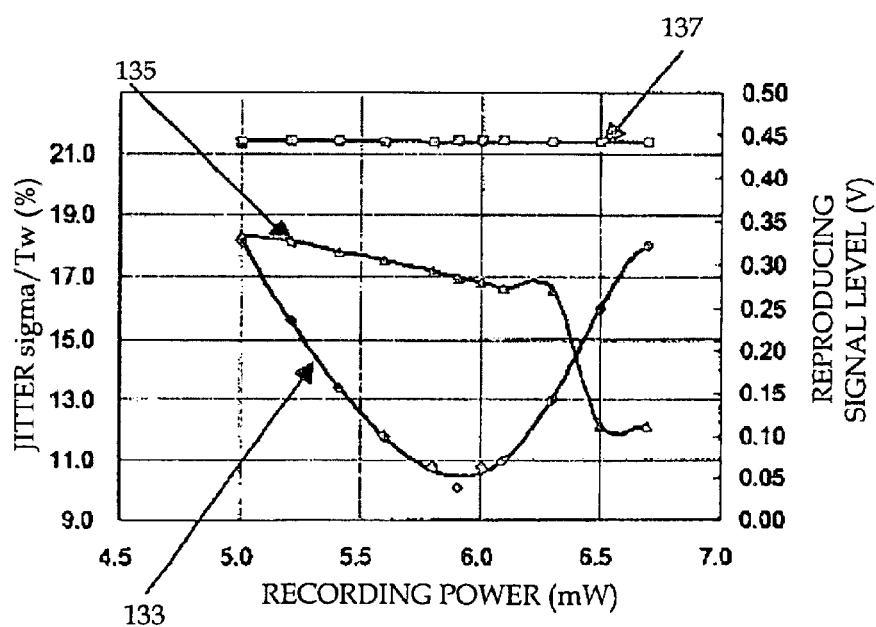
FIG. 24 is a diagram showing binary recording on a write-once-read-many optical recording medium according to Example 2-1-2.

A write-once-read-many optical recording medium was prepared and tested by the procedure of Example 2-1-1, except that the ZnS—SiO$_2$ thin film (the second inorganic thin film) was not formed and that the BiFeO thin film (the first inorganic thin film) was formed to a thickness of 5 nm. The result is shown in FIG. 24. In FIG. 24, curve 133 designates jitter, curve 135 reproducing signal levels in marks, and curve 137 reproducing signal levels in spaces.

The write-once-read-many optical recording medium showed a satisfactorily low jitter of 10.0% at a recording power of about 5.8 mW and had satisfactory binary recording properties.

However, the medium showed a varying recording signal level (RF level) at a recording power higher than the optimum recording power.

Figure 26:
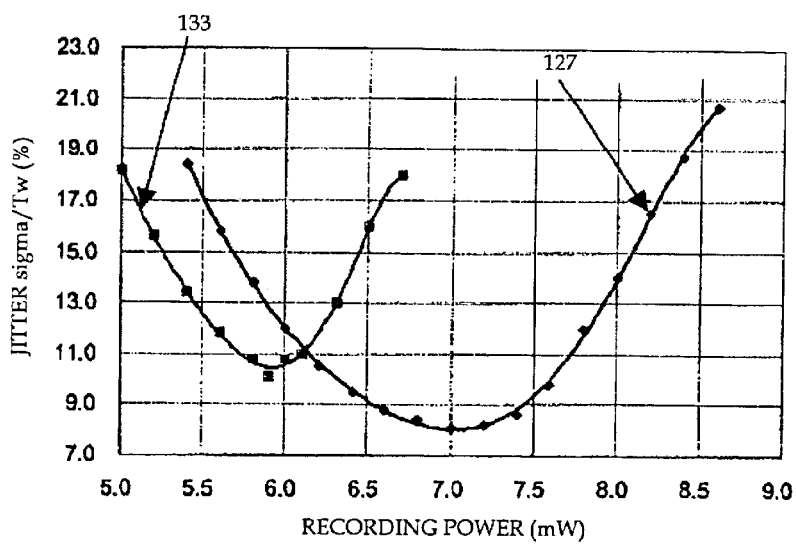
FIG. 26 shows jitters of write-once-read-many optical recording media according to Example 2-1-1 and Example 2-1-2, respectively.
Figure 27:
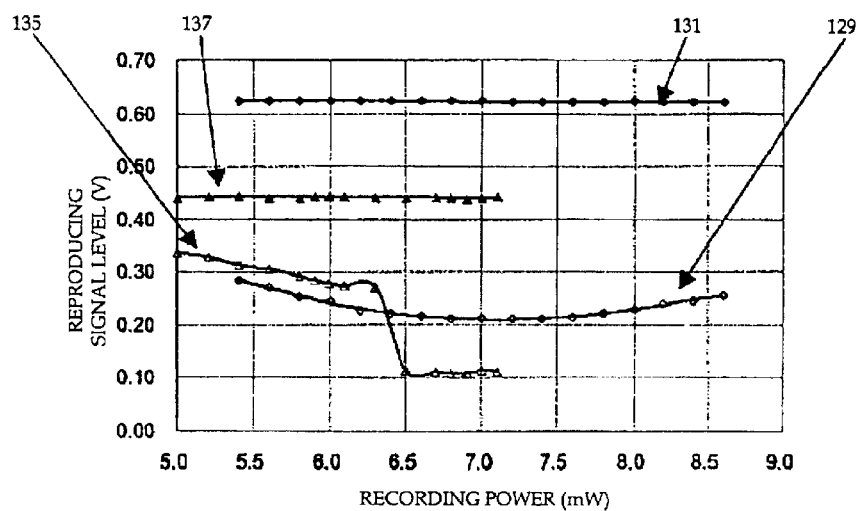
FIG. 27 is a diagram of reproducing signal levels in the space and recording marks of the write-once-read-many optical recording media according to Example 2-1-1 and Example 2-1-2, respectively.

The results of the media according to Example 2-1-1 and Example 2-1-2 are compared in FIGS. 26 and 27.

FIG. 26 illustrates jitters of the two media, and FIG. 27 illustrates reproducing signal levels in a space and a recording mark of the two media.

FIG. 27 shows that information can be recorded on the write-once-read-many optical recording medium with a high degree of modulation without rapid increase.

FIG. 26 shows that the medium can have a significantly reduced jitter with a wider recording power margin by suppressing the rapid increase of the degree of modulation.

Example 2-2

A write-once-read-many optical recording medium according to the present invention was prepared by the procedure of Example 2-1-1, except for forming the ZnS—SiO$_2$ film to a thickness of 50 nm and forming the BiFeO film to a thickness of 10 nm. The prepared medium was tested by the procedure of Example 2-1-1, except that recording was performed at a recording power shown in Table 2. As a result, the medium shows satisfactory binary recording properties as shown in Table 2.

Example 2-3

A write-once-read-many optical recording medium according to the present invention was prepared by the procedure of Example 2-1-1, except for forming a BiFeCuO film 12 nm thick instead of the BiFeO film. The prepared medium was tested by the procedure of Example 2-1-1, except that recording was performed at a recording power shown in Table 2. As a result, the medium shows satisfactory binary recording properties as shown in Table 2.

Example 2-4

A write-once-read-many optical recording medium according to the present invention was prepared by the procedure of Example 2-1-1, except for forming a BiFeAlO film 10 nm thick instead of the BiFeO film. The prepared medium was tested by the procedure of Example 2-1-1, except that recording was performed at a recording power shown in Table 2. As a result, the medium shows satisfactory binary recording properties as shown in Table 2.

Example 2-5

A write-once-read-many optical recording medium according to the present invention was prepared by the procedure of Example 2-1-1, except for forming a BiAlO film 7 nm thick instead of the BiFeO film. The prepared medium was tested by the procedure of Example 2-1-1, except that recording was performed at a recording power shown in Table 2. As a result, the medium shows satisfactory binary recording properties as shown in Table 2.

Example 2-6

A write-once-read-many optical recording medium according to the present invention was prepared by the procedure of Example 2-1-1, except for forming a BiDyFeO film 17 nm thick instead of the BiFeO film. The prepared medium was tested by the procedure of Example 2-1-1, except that recording was performed at a recording power shown in Table 2. As a result, the medium shows satisfactory binary recording properties as shown in Table 2.

Example 2-7

A write-once-read-many optical recording medium according to the present invention was prepared by the procedure of Example 2-1-1, except for forming a InFeO film 8 nm thick instead of the BiFeO film. The prepared medium was tested by the procedure of Example 2-1-1, except that recording was performed at a recording power shown in Table 2. As a result, the medium shows satisfactory binary recording properties as shown in Table 2.

Example 2-8

A write-once-read-many optical recording medium according to the present invention was prepared by the procedure of Example 2-1-1, except for using the colorant of following Structural Formula (2) instead of the colorant of Structural Formula (1) and for forming the first inorganic thin film to a thickness of 12 nm. The prepared medium was tested by the procedure of Example 2-1-1, except that recording was performed at a recording power shown in Table 2. Information could be recorded on the medium with satisfactory binary recording properties as shown in Table 2. The organic material (colorant) of Structural Formula (2) is a material usable in conventional DVD-R media DVD+R media, has a major absorption band at wavelengths longer than the recording-reproducing wavelengths, but has a low, broad absorption at blue-laser wavelengths as shown in FIG. 13.

On the medium of the present example, information can be recorded by photoabsorption functions of both the BiFeO thin film and the organic thin film comprising the colorant of Structural Formula (2) and can reduce the optimum recording power by factor of about 1.0 mW.

Structural Formula (2)

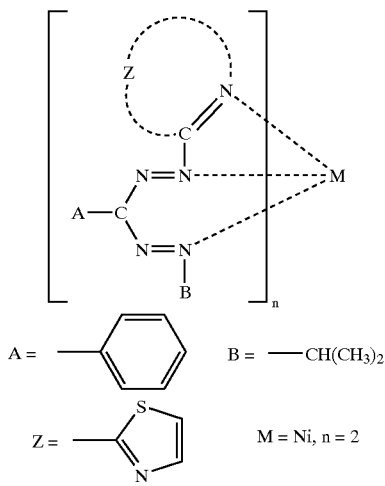

Example 2-9

A write-once-read-many optical recording medium according to the present invention was prepared by the procedure of Example 2-1-1, except for using AlN instead of ZnS—SiO$_2$ and for forming the first inorganic thin film to a thickness of 10 nm. The prepared medium was tested by the procedure of Example 2-1-1, except that recording was performed at a recording power shown in Table 2. As a result, the medium shows satisfactory binary recording properties as shown in Table 2.

Example 2-10

A write-once-read-many optical recording medium according to the present invention was prepared by the procedure of Example 2-1-1, except for using Si$_3$N$_4$ instead of ZnS—SiO$_2$ and for forming the first inorganic thin film to a thickness of 10 nm. The prepared medium was tested by the procedure of Example 2-1-1, except that recording was performed at a recording power shown in Table 2. As a result, the medium shows satisfactory binary recording properties as shown in Table 2.

Example 2-11

A write-once-read-many optical recording medium according to the present invention was prepared in the following manner. On a polycarbonate substrate 0.6 mm thick with guide grooves 50 nm deep were sequentially formed a BiFeO thin film (first inorganic thin film) 15 nm thick and a ZnS—SiO$_2$ thin film (second inorganic thin film) 100 nm thick by sputtering.

On the ZnS—SiO$_2$ thin film were sequentially formed an Ag reflective layer 150 nm thick by sputtering and a protective layer comprising an ultraviolet curable resin about 5 μm thick to give the write-once-read-many optical recording medium.

Information was recorded on the optical recording medium by binary recording under the conditions of Example 2-1-1.

The medium showed satisfactory binary recording properties as shown in Table 2.

In addition, information could be recorded on the medium with a high degree of modulation and a wide recording power margin without significant variation of the reproducing signal levels (RF levels) in the recorded marks even at a recording power higher than the optimum recording power.

Example 2-12

A write-once-read-many optical recording medium according to the present invention was prepared by the procedure of Example 2-1-1, except for forming a BiO film 12 nm thick instead of the BiFeO film. The prepared medium was tested by the procedure of Example 2-1-1, except that recording was performed at a recording power shown in Table 2. As a result, the medium shows satisfactory binary recording properties as shown in Table 2.

This write-once-read-many optical recording medium has a high reflectance of about 25% before recording and shows a high degree of modulation of about 70%.

The medium was then subjected to a storage test at 80° C. at relative humidity of 85% for 100 hours, and an archival jitter and a shelf jitter were determined to find that both jitters increased 0.7% or less, showing that the medium can be stored very stably.

Example 2-13

A write-once-read-many optical recording medium according to the present invention was prepared and tested by the procedure of Example 2-11, except for using BiO instead of BiFeO and for recording information at a recording power shown in Table 2. As a result, the medium shows satisfactory binary recording properties as shown in Table 2.

This write-once-read-many optical recording medium has a high reflectance of about 25%–30% before recording and shows a high degree of modulation of about 70%.

Example 2-14

A series of write-once-read-many optical recording media having different compositions was prepared in the following manner. On a polycarbonate substrate 0.6 mm thick with guide grooves 50 nm deep were sequentially formed a ZnS—SiO$_2$ thin film (second inorganic thin film, ZnS:SiO$_2$= 70:30) 50 nm thick and a BiFeO thin film (first inorganic thin film) having a varying thickness of 10 to 15 nm and having a varying composition of Bi$_x$Fe$_y$O, wherein x and y are atomic ratios, using a target having a composition of Bi$_x$Fe$_y$O by sputtering.

On the BiFeO thin film were sequentially formed an organic thin film having an average thickness of about 40 nm and comprising the colorant of Structural Formula (1) by spin coating; an AgPdCu reflective layer 150 nm thick by sputtering; and a protective layer comprising an ultraviolet curable resin about 5 μm thick to give the write-once-read-many optical recording media.

Information was recorded on the above-prepared optical recording medium under the following conditions using an optical disk checker DDU-1000 (a product of Pulstec Industrial Co., Ltd.; wavelength: 405 nm, numerical aperture NA: 0.65) according to a conventional binary recording procedure.

Recording Conditions

Figure 58:
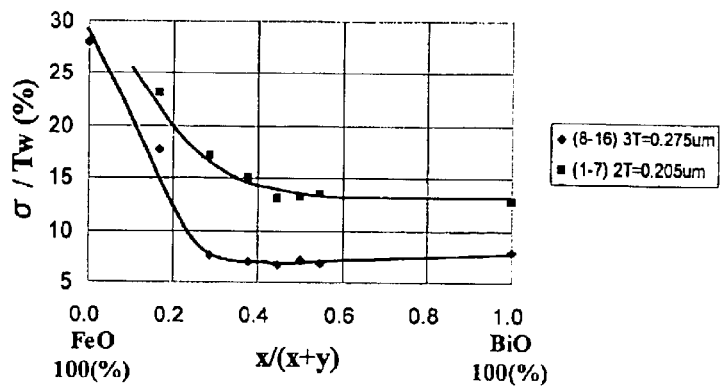
FIG. 58 is a diagram showing the relationship between x/(x+y) and the jitter (σ/Tw) in conventional binary recording on a write-once-read-many optical recording medium according to Example 2-14.
Figure 59:
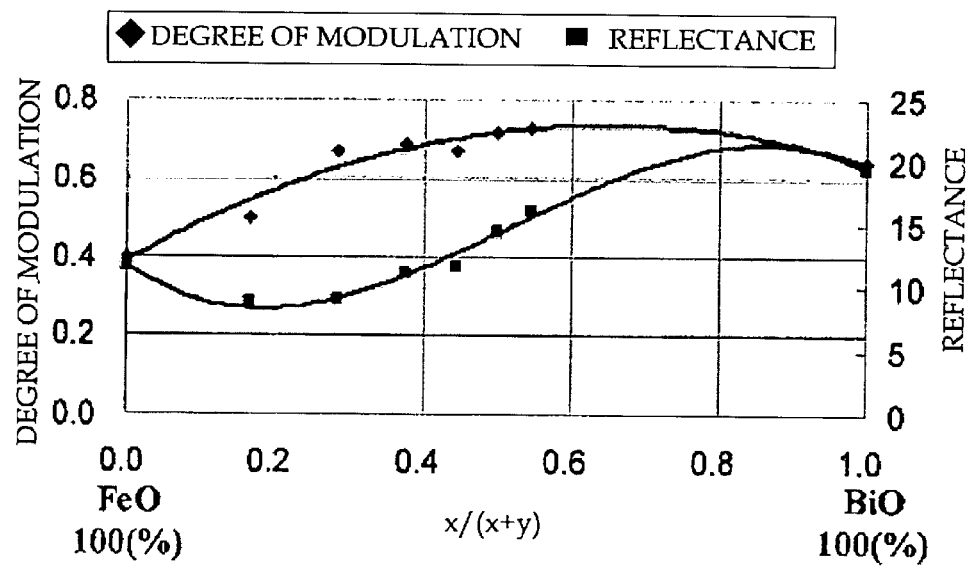
FIG. 59 is a diagram showing the relationships among x/(x+y), the degree of modulation and the reflectance in conventional binary recording on a write-once-read-many optical recording medium according to Example 2-14.

Modulation system: (1) eight to sixteen modulation, and (2) one to seven modulation Recording linear density:

(1) eight to sixteen modulation:
1T of 0.0917 µm
minimum mark length 3T of 0.275 µm (2) one to seven modulation
1T of 0.1026 µm
minimum mark length 2T of 0.205 µm Recording linear velocity: 6.0 m/s Waveform equalization: normal equalizer FIG. 58 illustrates the relationship between the ratio $[x/(x+y)]$ and the jitter ($\sigma$/Tw), and FIG. 59 illustrates the relationship among the ratio $[x/(x+y)]$, the degree of modulation (modulated amplitude) and the reflectance in one to seven modulation. The abscissa $[x/(x+y)]$ in FIGS. 58 and 59 indicates that the film comprises FeO alone when it is 0, and that the film comprises BiO alone when it is 1.

These results show that, when the first inorganic thin film has a composition represented by $R_xM_yO$, wherein x and y are atomic ratios, the media have a satisfactorily low jitter and a high degree of modulation and reflectance when x and y satisfy the condition: $[x/(x+y)] \geq 0.3$, verifying the efficacy of the present invention.

Comparative Example 2-1

A write-once-read-many optical recording medium was prepared by sequentially forming, on a polycarbonate substrate 0.6 mm thick with guide grooves 50 nm deep, an organic thin film comprising FOM-559 (phthalocyanine, available from Wako Pure Chemical Industries, Ltd.) and having an average thickness of about 80 nm by spin coating; an Ag reflective layer 150 nm thick by sputtering; and a protective layer about 5 µm thick comprising an ultraviolet curable resin. This is a comparative example of the application of a conventional layer configuration to recording at blue-laser wavelengths.

The phthalocyanine FOM-559 (Wako Pure Chemical Industries, Ltd.) shows a relatively small imaginary part of complex refractive index (absorption coefficient) and a relatively large real part thereof at around 405 nm, i.e., recording-reproducing wavelengths, as in organic materials used in conventional write-once-read-many optical recording media.

Information was recorded on the above-prepared optical recording medium by conventional binary recording under the conditions of Example 2-1-1.

The medium showed a jitter of 10.1% at a recording power of about 11.0 mW as shown in Table 2.

The medium showed a maximum deformation exceeding 100 nm, indicating that the substrate deforms to an extent exceeding the depth of its guide grooves. The deformation herein was determined by removing the protective layer of ultraviolet curable resin and the Ag reflective layer from the recorded write-once-read-many optical recording medium, washing out the organic thin film with ethanol, and observing the deformation of the surface of substrate with an atomic force microscope (AFM) (FIG. 28).

Figure 28:
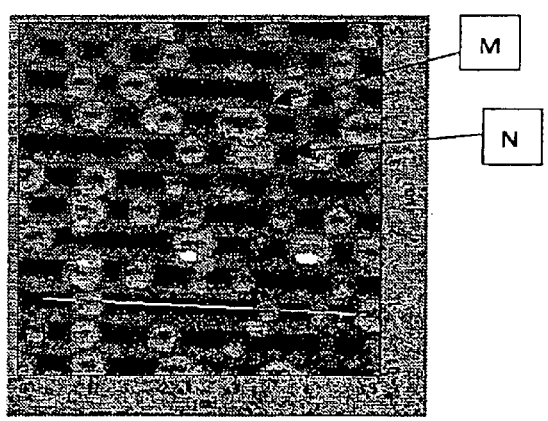
FIG. 28 is an AFM image of a deformed substrate of a write-once-read-many optical recording medium according to Comparative Example 2-1.

With reference to FIG. 28, deformation of a recording mark (M) interferes with deformation of another recording mark (N) that was recorded previously to the former in an adjacent track, thus significantly modifying the deformation of the latter.

These results show that the medium is disadvantageous in higher-density recording.

Example 2-15

A write-once-read-many optical recording medium according to the present invention was prepared in the following manner. On a polycarbonate substrate 0.6 mm thick with guide grooves 50 nm deep were sequentially formed a $Bi_aSi_bO_d$ thin film (first inorganic thin film) 12 nm thick by sputtering; a ZnS—$SiO_2$ thin film (second inorganic thin film) 65 nm thick by sputtering; an Ag reflective layer 100 nm thick by sputtering; and a protective layer comprising an ultraviolet curable resin about 5 µm thick.

Information was recorded on the above-prepared optical recording medium under the following conditions using an optical disk checker DDU-1000 (a product of Pulstec Industrial Co., Ltd.; wavelength: 405 nm, numerical aperture NA: 0.65) according to a conventional binary recording procedure.

Recording Conditions

Modulation system: eight to sixteen modulation

Recording linear density: 1T of 0.0917 µm

Recording linear velocity: 6.0 m/s

Waveform equalization: normal equalizer

A series of media was prepared by the above procedure except with a varying composition of the $Bi_aSi_bO_d$ thin film, to find that the media had a jitter of about 12% or less. Among them, media having a composition wherein a, b and d satisfy the following conditions: $10 \leq a \leq 40$, $3 \leq b \leq 20$, and $50 \leq d \leq 70$, showed a satisfactorily low jitter of 10% or less at a recording power of about 8.5 mW and had satisfactory binary recording properties.

The media having the above-specified composition were then subjected to a storage test at 80° C. at relative humidity of 85% for 100 hours, and an archival jitter and a shelf jitter were determined to find that the archival jitter and shelf jitter increased 0.8% or less and 0.4% or less, respectively.

Example 2-16

A series of write-once-read-many optical recording media according to the present invention was prepared and tested by the procedure of Example 2-15, except for using $Bi_aGe_bO_d$ instead of $Bi_aSi_bO_d$. Among the prepared media, those having a composition, wherein a, b and d satisfy the following conditions: $10 \leq a \leq 40$, $3 \leq b \leq 20$, and $50 \leq d \leq 70$, showed a satisfactorily low jitter of 10% or less at a recording power of about 8.4 mW and had satisfactory binary recording properties.

The media having the above-specified composition were then subjected to a storage test at 80° C. at relative humidity of 85% for 100 hours, and an archival jitter and a shelf jitter were determined to find that the archival jitter and shelf jitter increased 0.7% or less and 0.4% or less, respectively.

Example 2-17

A series of write-once-read-many optical recording media according to the present invention was prepared and tested by the procedure of Example 2-15, except for using $Bi_aSi_bFe_cO_d$ instead of $Bi_aSi_bO_d$. Among the prepared media, those having a composition, wherein a, b, c and d satisfy the following conditions: $10 \leq a \leq 40$, $3 \leq b \leq 20$, $3 \leq c \leq 20$, and $50 \leq d \leq 70$, showed a satisfactorily low jitter of 9.5% or less at a recording power of about 8.8 mW and had satisfactory binary recording properties.

The media having the above-specified composition were then subjected to a storage test at 80° C. at relative humidity of 85% for 100 hours, and an archival jitter and a shelf jitter were determined to find that the archival jitter and shelf jitter increased 0.8% or less and 0.2% or less, respectively.

Example 2-18

A series of write-once-read-many optical recording media according to the present invention was prepared and tested by the procedure of Example 2-17, except for setting the composition of $Bi_aSi_bFe_cO_d$ to $Bi_3SiFe_4O_{12}$ and for using Al, Cr, Mn, In, Co, Cu, Ni, Zn or Ti instead of Fe. The resulting media having any element instead of Fe had a satisfactorily low jitter of 10% or less at a recording power of about 8.2 mW and showed satisfactory binary recording properties.

The media having the above-specified composition were then subjected to a storage test at 80° C. at relative humidity of 85% for 100 hours, and an archival jitter and a shelf jitter were determined to find that the archival jitter and shelf jitter increased 1.0% or less and 0.3% or less, respectively.

Comparative Example 2-2

A series of write-once-read-many optical recording media according to the present invention was prepared and tested by the procedure of Example 2-15, except for using $Bi_1Fe_9O_{12}$ instead of $Bi_aSi_bO_d$. Among the prepared media, those having a composition, wherein a, b and d satisfy the following conditions: $10 \leq a \leq 40$, $3 \leq b \leq 20$, and $50 \leq d \leq 70$, showed a satisfactorily low jitter of 12% or less.

The medium was then subjected to a storage test at 80° C. at relative humidity of 85% for 100 hours, and an archival jitter and a shelf jitter were determined to find that the archival jitter and shelf jitter significantly increased 4.8% and 0.9%, respectively.

Example 2-19

A write-once-read-many optical recording medium according to the present invention was prepared in the following manner. On a polycarbonate substrate 0.6 mm thick with guide grooves 50 nm deep was formed a ZnS—$SiO_2$ thin film (second inorganic thin film; $ZnS:SiO_2=90:10$) 65 nm thick by sputtering.

On the second inorganic thin film was formed a BiFeO thin film 10 nm thick by binary sputtering using a Bi target and an FeO target ($Fe_2O_3$) at varying sputtering powers of the Bi and FeO targets.

On the first inorganic thin film were sequentially formed an organic thin film having an average thickness of about 30 nm and comprising the colorant of Structural Formula (1) by spin coating; an AgNdCu reflective layer 150 nm thick by sputtering; and a protective layer comprising an ultraviolet curable resin about 5 μm thick to give the medium.

The colorant of Structural Formula (1) is for use in conventional DVD–R media and DVD+R media and has little absorption in blue-laser wavelengths.

Eight to sixteen modulation signals were recorded on the above-prepared optical recording medium under the following conditions using an optical disk checker DDU-1000 (a product of Pulstec Industrial Co., Ltd.; wavelength: 405 nm, numerical aperture NA: 0.65) according to a conventional binary recording procedure.

Recording Conditions

Figure 60:
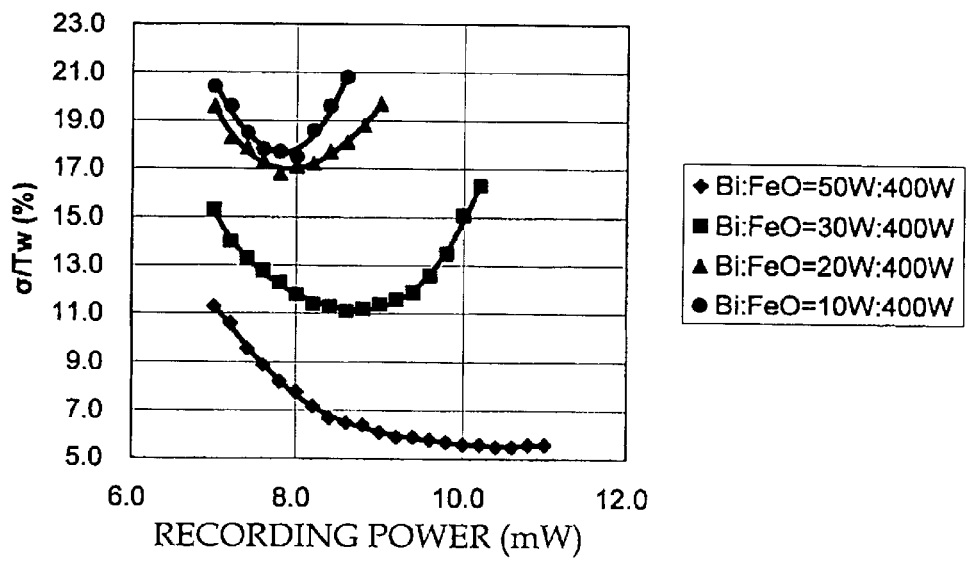
FIG. 60 is a diagram showing the relationship between the recording power and the jitter in conventional binary recording on a write-once-read-many optical recording medium according to Example 2-19.

Modulation system: eight to sixteen modulation, repetitive recording of 3T signals Recording linear density: minimum mark length (3T) of 0.275 μm Recording linear velocity: 6.0 m/s Waveform equalization: normal equalizer The results are shown in FIG. 60, indicating that the jitter significantly decreases with an increasing ratio of the sputtering power of the Bi target to the sputtering power of the FeO target.

The remarks at the right side of FIG. 60 indicate sputtering powers applied on the Bi and FeO targets, respectively.

The film prepared by binary sputtering has a composition represented by $Bi_xFe_yO$ and is speculated to be a mixture of Bi and FeO or a mixture of Bi, BiO and FeO.

These results show that a mixture of Bi and FeO and a mixture of Bi, BiO and FeO play an important role in high-density recording.

In above Example 2-2 through 2-13 and Comparative Example 2-1, information was recorded by conventional binary recording at a moderate recording density. The results are listed in Table 2.

TABLE 2

| | First inorganic thin film | Target composition | Thickness of first inorganic thin film (nm) | Second inorganic thin film | Thickness of second inorganic thin film (nm) | Organic material | Recording power (mW) | Jitter (%) |
|---|---|---|---|---|---|---|---|---|
| Example 2-2 | BiFeO | $Bi_3Fe_5O_{12}$ | 10 | ZnS—$SiO_2$ | 50 | Structural Formula 1 | 6.8 | 6.8 |
| Example 2-3 | BiFeCuO | $Bi_3Fe_4Cu_1O_{12}$ | 12 | ZnS—$SiO_2$ | 65 | Structural Formula 1 | 6.9 | 7.9 |
| Example 2-4 | BiFeAlO | $Bi_3Fe_4Al_1O_{12}$ | 10 | ZnS—$SiO_2$ | 65 | Structural Formula 1 | 6.8 | 7.5 |
| Example 2-5 | BiAlO | $Bi_3Al_5O_{12}$ | 7 | ZnS—$SiO_2$ | 65 | Structural Formula 1 | 7.4 | 7.4 |
| Example 2-6 | BiDyFeO | $Bi_3Dy_1Fe_4O_{12}$ | 17 | ZnS—$SiO_2$ | 65 | Structural Formula 1 | 7.0 | 7.4 |
| Example 2-7 | InFeO | $In_3Fe_5O_{12}$ | 8 | ZnS—$SiO_2$ | 65 | Structural Formula 1 | 7.2 | 7.6 |
| Example 2-8 | BiFeO | $Bi_3Fe_5O_{12}$ | 12 | ZnS—$SiO_2$ | 65 | Structural Formula 2 | 6.0 | 7.9 |
| Example 2-9 | BiFeO | $Bi_3Fe_5O_{12}$ | 10 | AlN | 65 | Structural Formula 1 | 7.5 | 8.0 |
| Example 2-10 | BiFeO | $Bi_3Fe_5O_{12}$ | 10 | $Si_3N_4$ | 65 | Structural Formula 1 | 7.7 | 8.1 |
| Example 2-11 | BiFeO | $Bi_3Fe_5O_{12}$ | 15 | ZnS—$SiO_2$ | 100 | none | 10.0 | 9.0 |
| Example 2-12 | BiO | $Bi_2O_3$ | 12 | ZnS—$SiO_2$ | 65 | Structural Formula 1 | 6.0 | 8.0 |
| Example 2-13 | BiO | $Bi_2O_3$ | 15 | ZnS—$SiO_2$ | 100 | none | 9.0 | 8.5 |
| Comp. Ex. 2-1 | none | — | — | none | — | phthalocyanine dye | 11.0 | 10.1 |

In Example 2-20 through 2-28 below, information was recorded by conventional binary recording at a high recording density.

Example 2-20

For achieving a higher-density recording, information was recorded on the write-once-read-many optical recording medium prepared in Example 2-1-1 by binary recording under the following conditions.

Recording Conditions

Modulation system: :one to seven modulation

Recording density: minimum mark length 2T of 0.273, 0.261, 0.250, 0.240, 0.231, 0.222, 0.214 or 0.205 ($\mu$m)

Recording linear velocity: 6.0 m/s

Waveform equalization: normal equalizer

Figure 29:
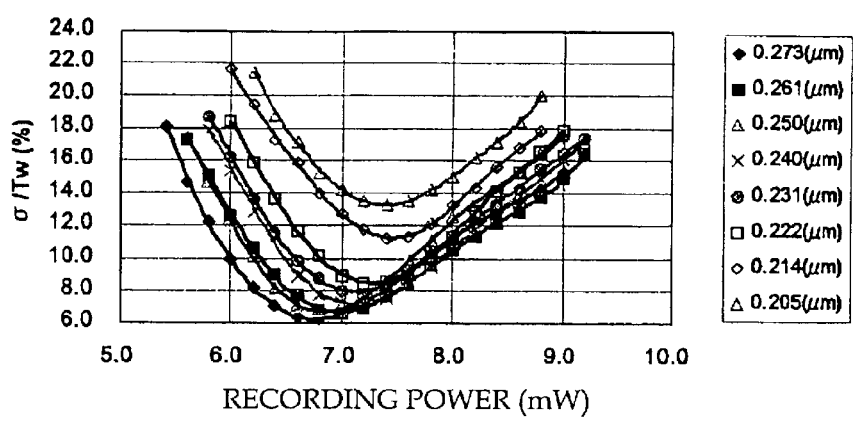
FIG. 29 is a diagram showing the relationship between the recording power and the jitter ($\sigma$/Tw) of a write-once-read-many optical recording medium according to Example 2-20 in one track recording at a varying minimum mark length (2T).
Figure 30:
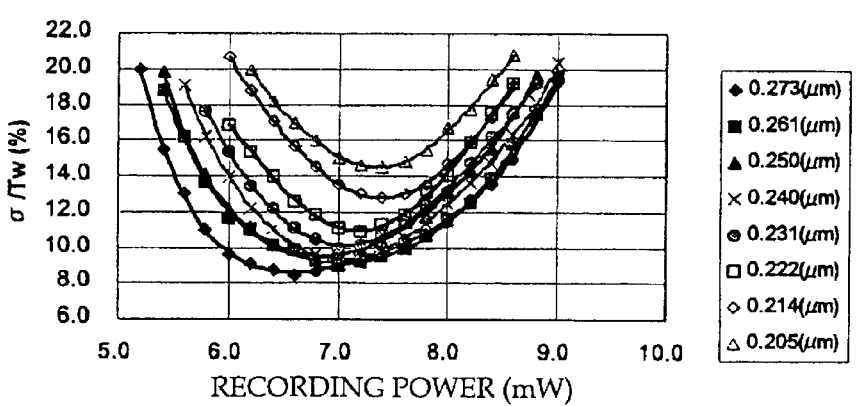
FIG. 30 is a diagram showing the relationship between the recording power and the jitter ($\sigma$/Tw) of the write-once-read-many optical recording medium according to Example 2-20 in continuous recording at a varying minimum mark length (2T).

FIGS. 29 and 30 show the relationship between the jitter ($\sigma$/Tw) and the recording power in single-track recording and in successive-track recording, respectively. In these figures, the remarks indicate the minimum mark length 2T.

These results show that information can be satisfactorily recorded and reproduced on the write-once-read-many optical recording medium of the present invention even at a very high recording density.

Information could not be recorded on the write-once-read-many optical recording medium according to Comparative Example 2-1 at a minimum mark length 2T of 0.205 $\mu$m, and the jitter could not be determined. In contrast, information was satisfactorily recorded on the write-once-read-many optical recording medium of the present invention with a satisfactorily low jitter ($\sigma$/Tw) of 13.3% in single-track recording at a recording power of about 7.4 mW even under recording conditions at a minimum mark length 2T of 0.205 $\mu$m. These results show that the difference in recording properties between the write-once-read-many optical recording medium of the present invention (Example 2-1-1) and the conventional write-once-read-many optical recording medium (Comparative Example 2-1) is not so remarkable in recording at a relatively low recording density but becomes significant in recording at a high density.

Example 2-21

To verity the efficacy of a write-once-read-many optical recording medium according to an embodiment of the present invention, the capabilities for forming short recording marks of the write-once-read-many optical recording media prepared in Example 2-1-1 and Comparative Example 2-1 were determined.

Information was recorded on these media under the following conditions with a single period 2T for avoiding the influence of the recording strategy.

Recording Conditions

Modulation system: one to seven modulation in recording of 2T single mark

Recording density: minimum mark length 2T of 0.273, 0.261, 0.250, 0.240, 0.231, 0.222, 0.214 or 0.205 ($\mu$m)

Recording linear velocity: 6.0 m/s

Waveform equalization: normal equalizer

The minimum jitter ($\sigma$/Tw) was determined at a varying recording power at different recording linear velocities. The relationship between the minimum jitter and the 2T mark length is as shown in FIG. 31.

Figure 31:
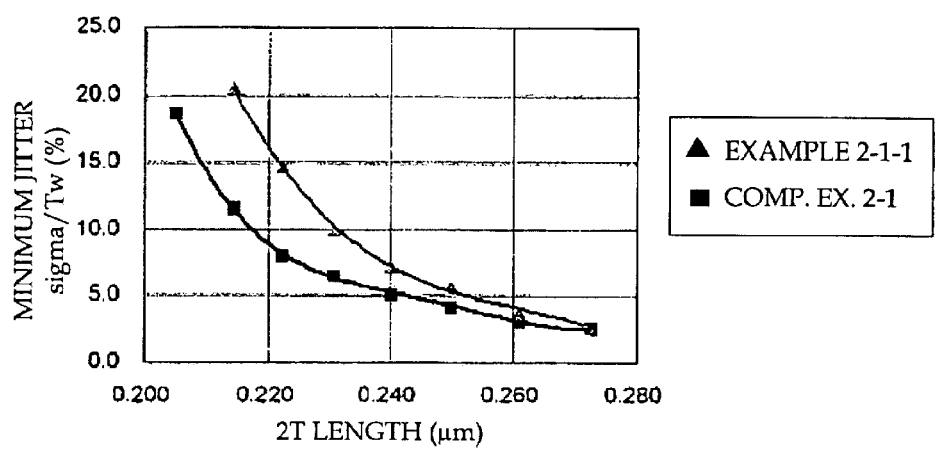
FIG. 31 is a diagram showing the suitability for high-density recording of write-once-read-many optical recording media according to Example 2-1-1 and Comparative Example 2-1.

FIG. 31 shows that the write-once-read-many optical recording medium according to the present invention is capable of forming short marks thereon more satisfactorily than the conventional write-once-read-many optical recording medium.

Example 2-22

To verity the efficacy of a write-once-read-many optical recording medium according to another embodiment of the present invention, the capabilities for forming short recording marks of the write-once-read-many optical recording media prepared in Example 2-11 and Comparative Example 2-1 were determined.

Information was recorded on these media under the following conditions with a single period 2T for avoiding the influence of the recording strategy.

Recording Conditions

Modulation system: one to seven modulation in recording of 2T single mark

Recording density: minimum mark length 2T of 0.273, 0.261, 0.250, 0.240, 0.231, 0.222, 0.214 or 0.205 ($\mu$m)

Recording linear velocity: 6.0 m/s

Waveform equalization: normal equalizer

The minimum jitter ($\sigma$/Tw) was determined at a varying recording power at different recording linear velocities. The relationship between the minimum jitter and the 2T mark length is as shown in FIG. 32.

Figure 32:
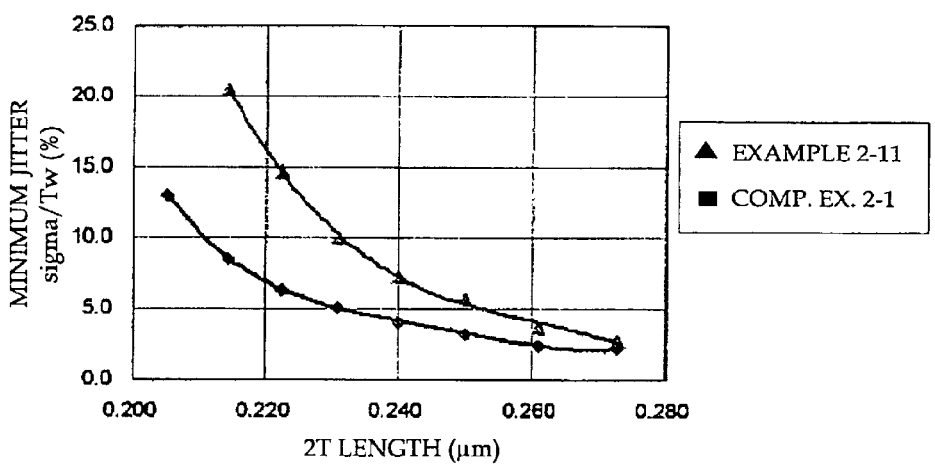
FIG. 32 is a diagram showing the suitability for high-density recording of write-once-read-many optical recording media according to Example 2-11 and Comparative Example 2-1.

FIG. 32 shows that the write-once-read-many optical recording medium according to the present invention is capable of forming short marks thereon more satisfactorily than the conventional write-once-read-many optical recording medium.

Example 2-23

A write-once-read-many optical recording medium according to the present invention was prepared in the following manner. On a polycarbonate substrate 0.6 mm thick with guide grooves 50 nm deep were sequentially formed a ZnS—SiO$_2$ thin film (second inorganic thin film) 65 nm thick by sputtering; a BiFeO thin film (first inorganic thin film) 10 nm thick by sputtering; an organic thin film comprising the colorant of Structural Formula (1) and having an average thickness of about 30 nm by spin coating; an Ag reflective layer 150 nm thick by sputtering; and a protective layer comprising an ultraviolet curable resin about 5 $\mu$m thick.

The colorant of Structural Formula (1) is for use in conventional DVD–R media and DVD+R media and has little absorption in blue-laser wavelengths.

Eight to sixteen modulation signals were recorded on the above-prepared optical recording medium under the following conditions using an optical disk checker DDU-1000 (a product of Pulstec Industrial Co., Ltd.; wavelength: 405 nm, numerical aperture NA: 0.65) according to a conventional binary recording procedure.

Recording Conditions

Modulation system: one to seven modulation

Recording linear density: minimum mark length (2T) of 0.231 $\mu$m

Recording linear velocity: 6.0 m/s

Waveform equalization: normal equalizer

Figure 33:
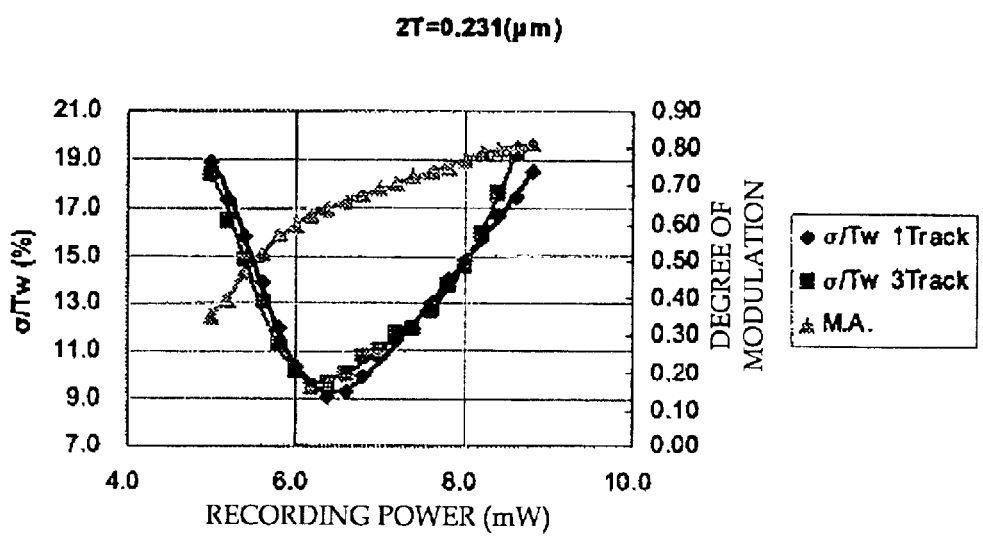
FIG. 33 is a diagram showing the relationship among the recording power and the jitter ($\sigma$/Tw) and the degree of modulation in recording at a recording density of 2T=0.231 ($\mu$m) on a write-once-read-many optical recording medium according to Example 2-23.

The results are shown in FIG. 33, in which the remarks "$\sigma$/Tw 1Track", "$\sigma$/Tw 3Track" and "M.A." represent a successively recorded area, a single-track recording area in which recording was performed only in one track and adjacent tracks were not recorded, and a degree of modulation (modulated amplitude). In the successively recorded area, information can be satisfactorily recorded on the medium by binary recording with a satisfactorily low jitter of 9.5% at a recording power of 6.2 mW with a degree of modulation of 60% or more. The difference between jitters of single-track recording and successive recording is trivial, showing that information can be recorded with little crosstalk.

Example 2-24

A write-once-read-many optical recording medium was prepared and was tested by the procedure of Example 2-23, except for recording information at a minimum mark length 2T of 0.222 μm.

Figure 34:
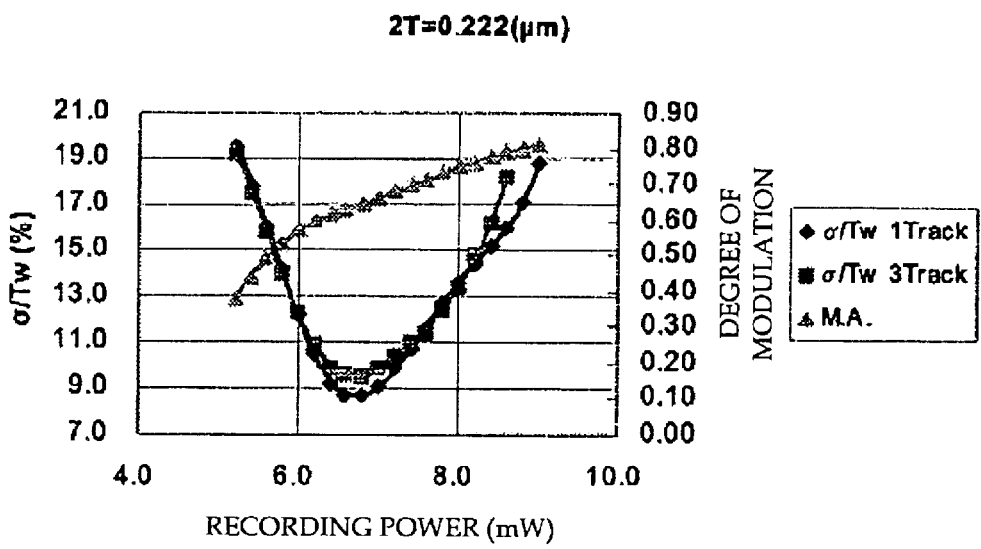
FIG. 34 is a diagram showing the relationship among the recording power and the jitter ($\sigma$/Tw) and the degree of modulation in recording at a recording density of 2T=0.222 ($\mu$m) on a write-once-read-many optical recording medium according to Example 2-23.

The results are shown in FIG. 34, in which the remarks "σ/Tw 1Track", "σ/Tw 3Track" and "M.A." represent a successively recorded area, a single-track recording area in which recording was performed only in one track and adjacent tracks were not recorded, and a degree of modulation (modulated amplitude). In the successively recorded area, information can be satisfactorily recorded on the medium by binary recording with a satisfactorily low jitter of 9.5% at a recording power of 6.8 mW with a degree of modulation of 60% or more. The difference between jitters of single-track recording and successive recording is trivial, showing that information can be recorded with little crosstalk.

Example 2-25

A write-once-read-many optical recording medium was prepared and was tested by the procedure of Example 2-23, except for recording information at a minimum mark length 2T of 0.214 μm.

Figure 35:
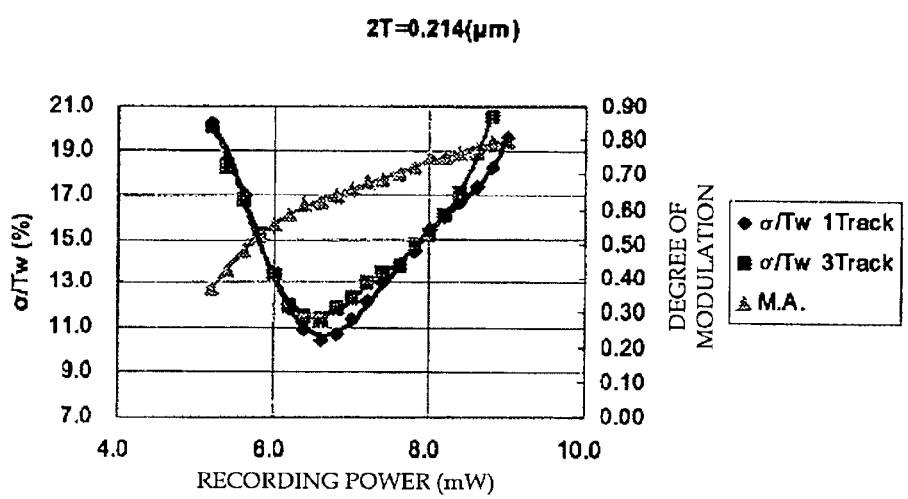
FIG. 35 is a diagram showing the relationship among the recording power and the jitter ($\sigma$/Tw) and the degree of modulation in recording at a recording density of 2T=0.214 ($\mu$m) on a write-once-read-many optical recording medium according to Example 2-23.

The results are shown in FIG. 35, in which the remarks "σ/Tw 1Track", "σ/Tw 3Track" and "M.A." represent a successively recorded area, a single-track recording area in which recording was performed only in one track and adjacent tracks were not recorded, and a degree of modulation (modulated amplitude). In the successively recorded area, information can be satisfactorily recorded on the medium by binary recording with a satisfactorily low jitter of 11.4% at a recording power of 6.6 mW with a degree of modulation of 60% or more. The difference between jitters of single-track recording and successive recording is trivial, showing that information can be recorded with little crosstalk.

Example 2-26

A write-once-read-many optical recording medium was prepared and was tested by the procedure of Example 2-23, except for recording information at a minimum mark length 2T of 0.205 μm.

Figure 36:
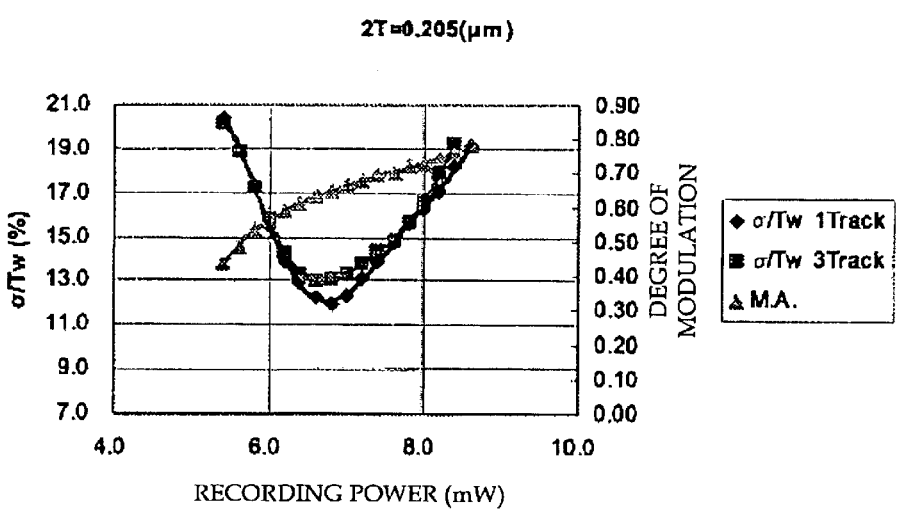
FIG. 36 is a diagram showing the relationship among the recording power and the jitter ($\sigma$/Tw) and the degree of modulation in recording at a recording density of 2T=0.205 ($\mu$m) on a write-once-read-many optical recording medium according to Example 2-23.

The results are shown in FIG. 36, in which the remarks "σ/Tw 1Track", "σ/Tw 3Track" and "M.A." represent a successively recorded area, a single-track recording area in which recording was performed only in one track and adjacent tracks were not recorded, and a degree of modulation (modulated amplitude). In the successively recorded area, information can be satisfactorily recorded on the medium by binary recording with a satisfactorily low jitter of 13.0% at a recording power of 6.6 mW with a degree of modulation of 60% or more. The difference between jitters of single-track recording and successive recording is trivial, showing that information can be recorded with little crosstalk.

Information could not be recorded on the write-once-read-many optical recording medium according to Comparative Example 2-1 at a minimum mark length 2T of 0.205 μm, and the jitter could not be determined. In contrast, information was satisfactorily recorded on the write-once-read-many optical recording medium of the present invention with a satisfactorily low jitter (σ/Tw) of 11.8% in single-track recording at a recording power of about 6.6 mW even under recording conditions at a minimum mark length 2T of 0.205 μm. These results show that the difference in recording properties between the write-once-read-many optical recording medium of the present invention (Example 2-1-1) and the conventional write-once-read-many optical recording medium (Comparative Example 2-1) is not so remarkable in recording at a relatively low recording density but becomes significant in recording at a high density.

Example 2-27

A write-once-read-many optical recording medium according to the present invention was prepared and was tested by the procedure of Example 2-23, except for using a colorant of following Structural Formula (2) instead of the colorant of Structural Formula (1). The organic material (colorant) of Structural Formula (2) is a material usable in conventional DVD−R media DVD+R media, has a major absorption band at wavelengths longer than the recording-reproducing wavelengths, but has a low, broad absorption at blue-laser wavelengths as shown in FIG. 13.

On the medium of the present example, information can be recorded by photoabsorption functions of both the BiO thin film (first thin film) and the organic thin film comprising the colorant of Structural Formula (2) and can reduce the optimum recording power by factor of about 0.8 mW.

Example 2-28

A write-once-read-many optical recording medium according to the present invention was prepared in the following manner. On a polycarbonate substrate 0.6 mm thick with guide grooves 50 nm deep were sequentially formed a ZnS—SiO$_2$ thin film (second inorganic thin film, ZnS:SiO$_2$=80:20) 50 nm thick by sputtering; a BiFeO thin film (first inorganic thin film, target composition: Bi$_6$Fe$_5$O$_z$, wherein z could not be determined) 15 nm thick by sputtering; an organic thin film comprising the colorant of Structural Formula (1) and having an average thickness of about 30 nm by spin coating; an Ag reflective layer 150 nm thick by sputtering; and a protective layer comprising an ultraviolet curable resin about 5 μm thick.

The colorant of Structural Formula (1) is for use in conventional DVD−R media and DVD+R media and has little absorption in blue-laser wavelengths.

Eight to sixteen modulation signals were recorded on the above-prepared optical recording medium under the following conditions using an optical disk checker DDU-1000 (a product of Pulstec Industrial Co., Ltd.; wavelength: 405 nm, numerical aperture NA: 0.65) according to a conventional binary recording procedure.

Recording Conditions

Modulation system: one to seven modulation

Recording linear density: minimum mark length (2T) of 0.205 μm

Recording linear velocity: 6.0 m/s

Waveform equalization: limit equalizer

Figure 61:
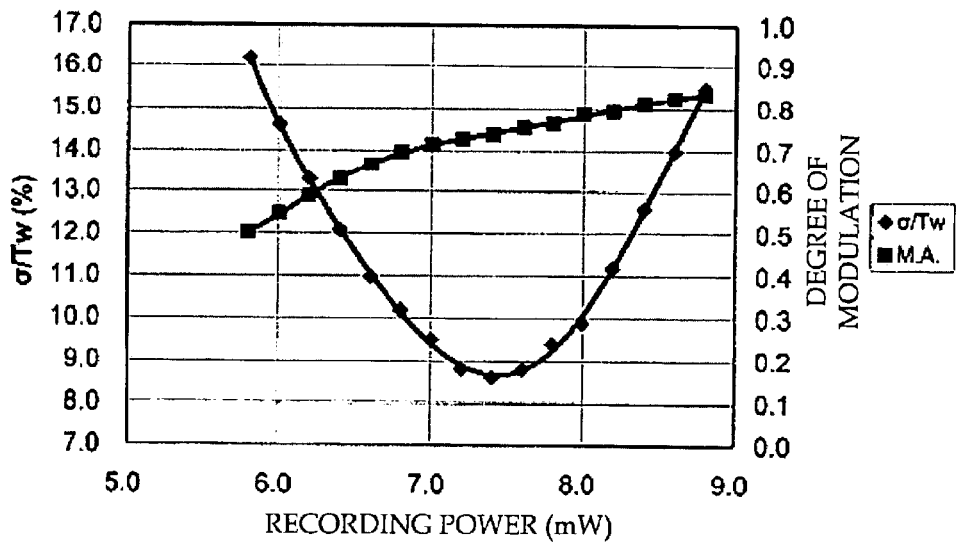
FIG. 61 is a diagram showing the relationship between the recording power and the jitter in conventional binary recording on a write-once-read-many optical recording medium according to Example 2-28.

The results are shown in FIG. 61, showing that information can be satisfactorily recorded on the medium by binary recording with a very satisfactorily low jitter of 8.6% at a recording power of about 7.5 mW with a degree of modulation of 70% or more at a reproducing power of 0.5 mW in a successively recorded area.

In FIG. 61, the symbols "σ/Tw" and "M.A." represent the jitter and the degree of modulation, respectively.

Figure 62:
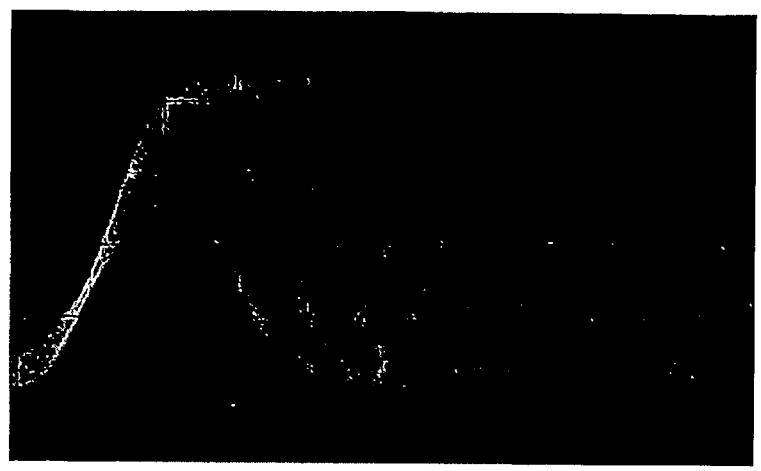
FIG. 62 is a diagram showing an eye pattern (eye diagram) in conventional binary recording on a write-once-read-many optical recording medium according to Example 2-28.

The eye patterns in this test are shown in FIG. 62, indicating that information is very satisfactorily recorded.

Information was recorded by multi-level recording in the following Examples 2-29 to 2-35 and Comparative Examples 2-3 and 2-4.

Example 2-29

Information was recorded on the write-once-read-many optical recording medium prepared in Example 2-1 by eight-level recording under the following conditions using an optical disk checker DDU-1000 (a product of Pulstec Industrial Co., Ltd.; wavelength: 405 nm, numerical aperture NA: 0.65).

Recording Conditions

Recording linear density: cell length of 0.47 $\mu$m

Recording linear velocity: 3.5 m/s

Recording pattern: isolated mark and successive mark, in which four successive marks at one level and one isolated mark were recorded at different seven levels with the interposition of two blank cells.

Figure 37:
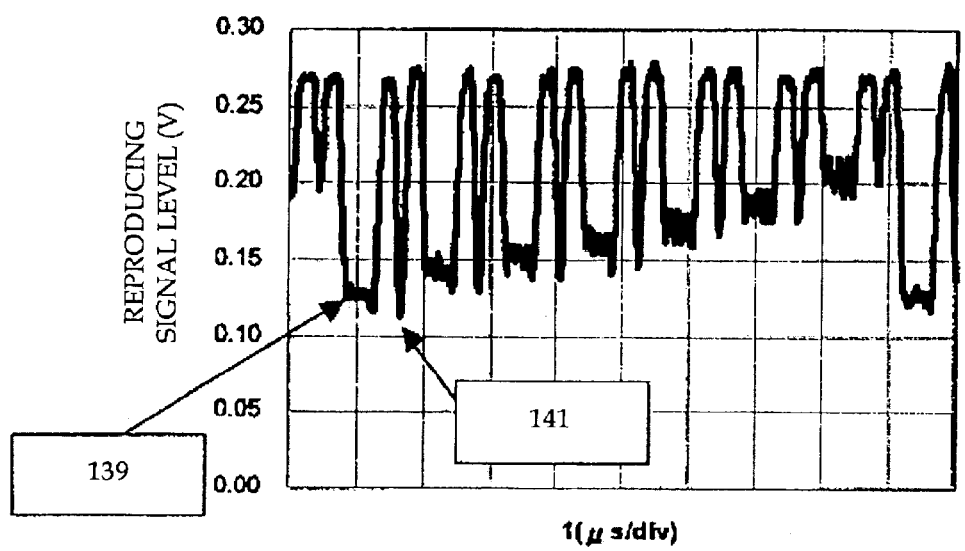
FIG. 37 is a diagram showing eight-level recording on a write-once-read-many optical recording medium according to Example 2-1-1.

As a result, information could be recorded on the medium with a sufficiently high degree of modulation (dynamic range) of 60% and with a very small variation multiple recording levels even in successively recorded areas (FIG. 37). In FIG. 37, one of successive marks is designated with arrow 139 and one of isolated marks with arrow 141.

In the above test, information was recorded in grooves of the medium by multi-level recording. Another test revealed that it could also be satisfactorily recorded even in lands.

Comparative Example 2-3

Information was recorded on the write-once-read-many optical recording medium prepared in Comparative Example 2-1 by eight-level recording under the following conditions using an optical disk checker DDU-1000 (a product of Pulstec Industrial Co., Ltd.; wavelength: 405 nm, numerical aperture NA: 0.65).

Recording Conditions

Recording linear density: cell length of 0.47 $\mu$m

Recording linear velocity: 3.5 m/s

Recording pattern: isolated mark and successive mark as in

Example 1-29

Figure 38:
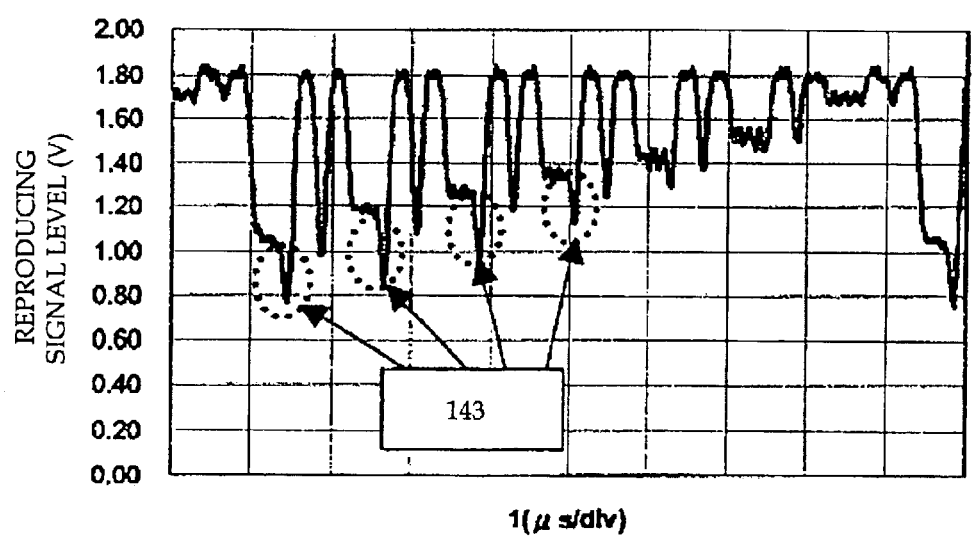
FIG. 38 is a diagram showing eight-level recording on a write-once-read-many optical recording medium according to Comparative Example 2-3.

The results are shown in FIG. 38, indicating that the medium shows "drops 143 in degree of modulation" in successively recorded areas and a very large variation in multiple recording levels, and that the medium is not suitable for multi-level recording. This is because the reproducing levels must be kept constant in such successively recorded areas in multi-level recording. At a low recording power, the medium showed no drop in degree of modulation but had a much decreased degree of modulation (dynamic range) of 20% and a decreased signal-to-noise ratio (SNR).

Then, the protective layer of ultraviolet curable resin and the Ag reflective layer were removed from the recorded write-once-read-many optical recording medium, the organic thin film was washed out with ethanol, and deformation of the surface of substrate was observed with an atomic force microscope (AFM).

Figure 39A:
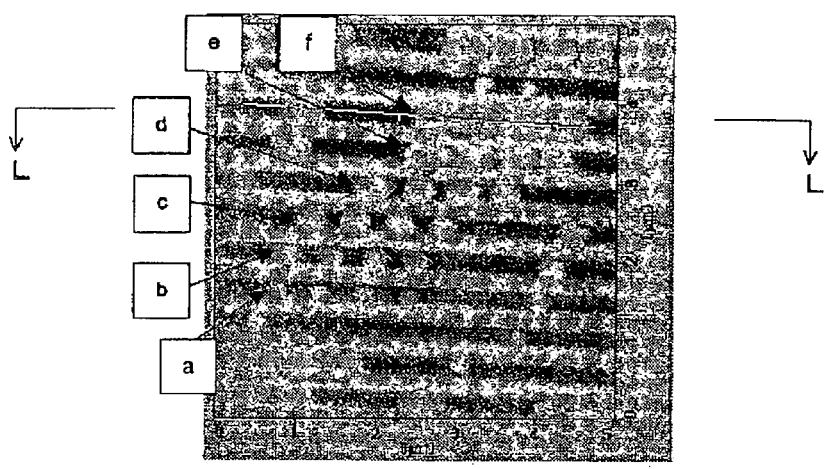
FIGS. 39A and 39B are an AFM image of the surface and a cross sectional view taken along the lines L—L of FIG. 39A, respectively, of a substrate of a write-once-read-many optical recording medium according to Comparative Example 2-3.
Figure 39B:
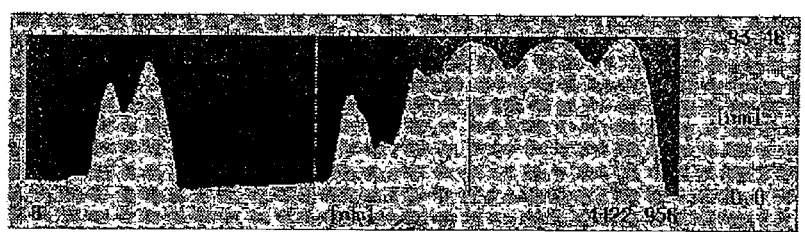

With reference to FIGS. 39A and 39B, nonlinear interference among recording marks was observed in successively recorded areas (d), (e) and (f) in which recording marks with large sizes were recorded in cells, showing that the "drops in degree of modulation" is caused by remarkable modification of deformed waveforms due to interference.

Figure 40:
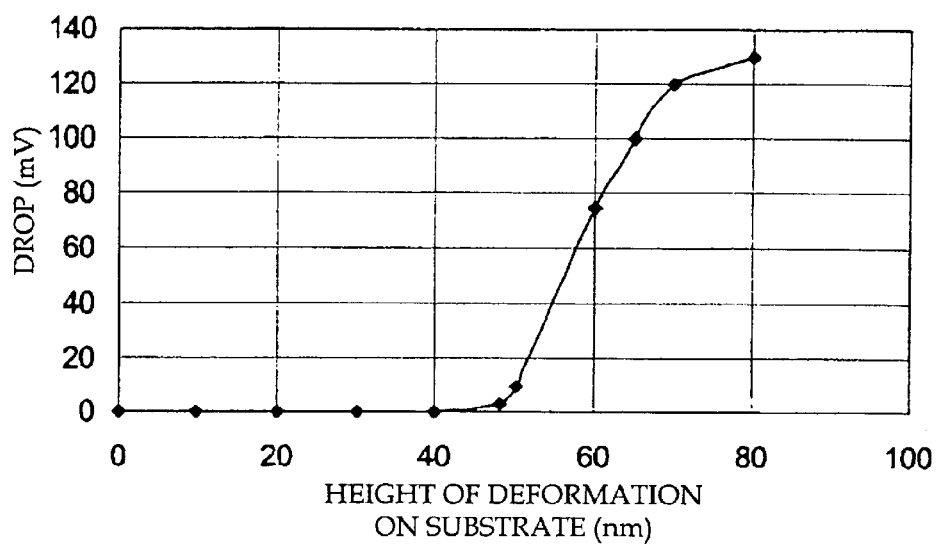
FIG. 40 is a diagram showing the relationship between a deformation height and the drops in degree of modulation of a write-once-read-many optical recording medium according to Comparative Example 2-3.

Then, the relationship between the deformation of the substrate and the drop in degree of modulation (the difference of reproducing levels between the head and tail of successively recorded marks) was determined (FIG. 40). At a deformation exceeding about 50 nm, information cannot be recorded at a uniform level in successively recorded areas, which is not suitable for multi-level recording.

More specifically, the write-once-read-many optical recording medium according to Comparative Example 1-4 cannot be applied to multi-level recording unless it has a reduced deformation. However, the medium cannot yield a sufficiently high degree of modulation unless it has a large deformation.

In the above test, information was recorded in grooves of the medium by multi-level recording. However, no information could be recorded in its lands.

Example 2-30

Information was recorded by eight-level recording procedure of Example 2-29, except at a smaller size of cells (assumed capacity: 25 GB) under the following conditions.

Recording Conditions

Recording linear density: cell length of 0.24 $\mu$m

Recording linear velocity: 5.0 m/s

Figure 41:
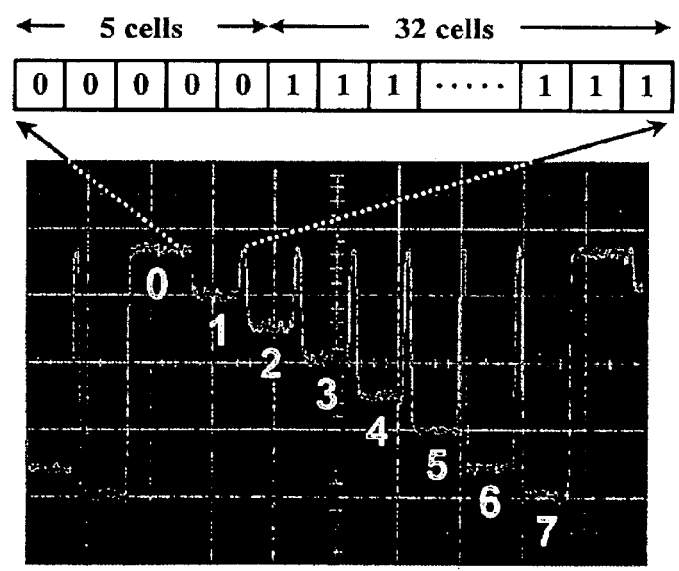
FIG. 41 is a diagram showing eight-level recording on a write-once-read-many optical recording medium according to Example 2-30.

Recording pattern: step-wise waveform (FIG. 41; signals with level 0 were recorded in five cells and signals with a varying level of 1 to 7 in successive 32 cells)

As a result, information could be recorded on the medium with a sufficiently high degree of modulation (dynamic range) of 60% and with a very small variation multiple recording levels even in successively recorded areas (FIG. 41).

Then, deformation was observed by removing the protective layer of ultraviolet curable resin and the Ag reflective layer from the recorded write-once-read-many optical recording medium, washing out the organic thin film with ethanol, and observing the surface of the BiFeO film with a scanning electron microscope (SEM).

Figure 42:
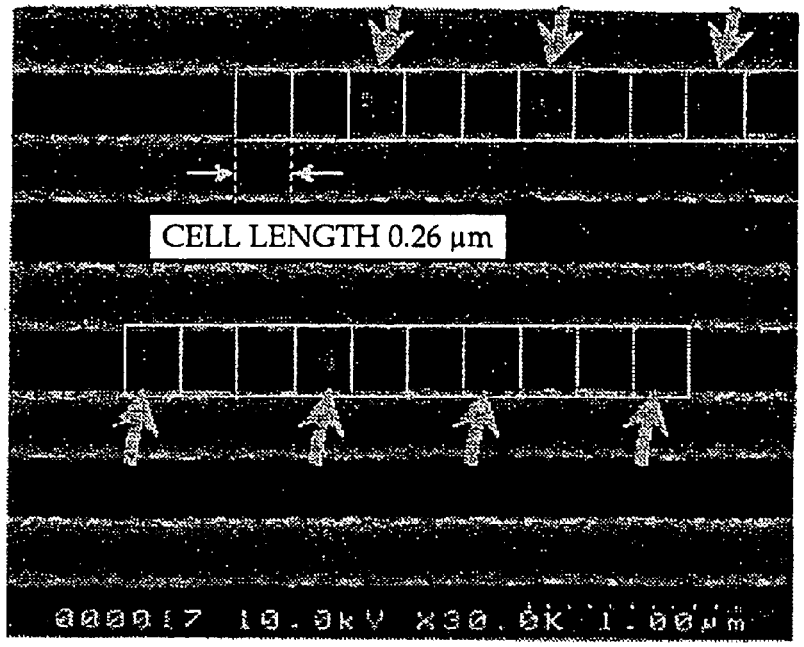
FIG. 42 is a scanning electron micrograph of deformation of a BiFeO surface of the write-once-read-many optical recording medium according to Example 2-30.

The result is shown in FIG. 42, showing that significant deformation is not observed in the scanning electron micrograph and recording marks are formed with substantially no deformation. To make recording marks clear, recording was performed at a cell length of 0.26 $\mu$m.

The surface and cross section of the recorded areas were observed as transmission electron micrographs (TEM), showing that information can be recorded on the write-once-read-many optical recording medium according to the present invention with multi-levels both in a plane direction and a thickness direction of the BiFeO thin film (first inorganic thin film), the ZnS—SiO$_2$ thin film (second inorganic thin film) and the organic thin film.

Example 2-31

Information was recorded by eight-level recording procedure of Example 2-29, except at a cell length of 0.24 $\mu$m under the following conditions.

Recording Conditions

Recording linear velocity: 3.0(m/s)

Recording pattern: repetitive recording with multiple levels of 0-1-0-3-0-5-0-7-0 (FIG. 5)

Then, deformation was observed by removing the protective layer of ultraviolet curable resin and the Ag reflective layer from the recorded write-once-read-many optical recording medium, washing out the organic thin film with ethanol, and observing the surface of the BiFeO film with a scanning electron microscope (SEM).

Figure 43:
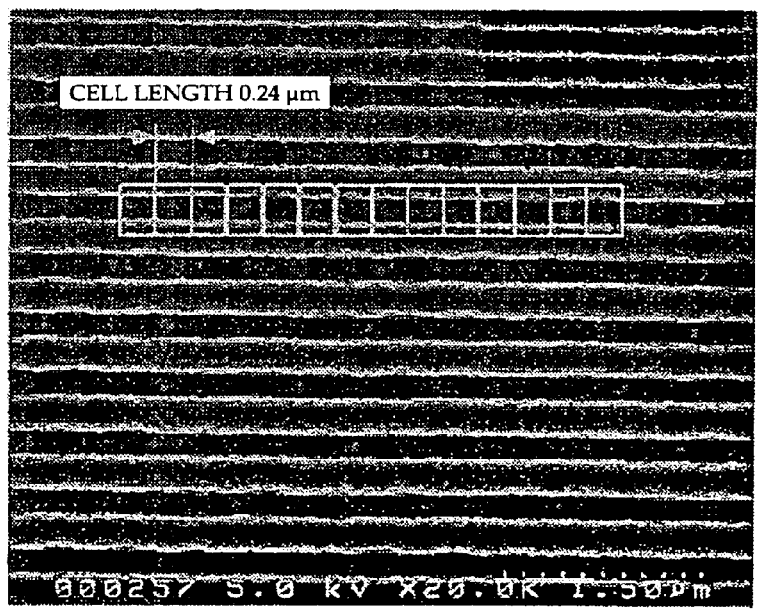
FIG. 43 is a scanning electron micrograph of deformation of a BiFeO surface of the write-once-read-many optical recording medium according to Example 2-31.
Figure 44:
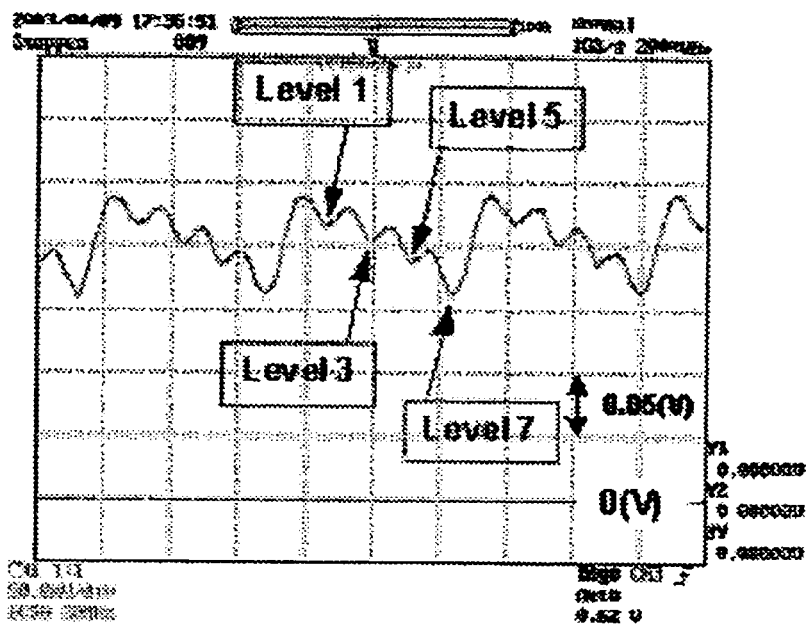
FIG. 44 is a diagram showing a reproducing signal obtained from a write-once-read-many optical recording medium according to Example 2-31.

FIGS. 43 and 44 illustrate a scanning electron micrograph and a reproducing signal, respectively, at a cell length of 0.24 μm.

These results show that recorded areas are formed on the BiFeO thin film without significant deformation to thereby yield reproducing signals at clearly distinguished multiple levels.

Comparative Example 2-4

Information was recorded by the eight-level recording procedure of Comparative Example 2-3, except at a cell length of 0.32 μm or 0.24 μm under the following conditions.

Recording Conditions

Recording linear velocity: 4.0 m/s at a cell length of 0.32 μm 3.0 m/s at a cell length of 0.24 μm Recording pattern: repetitive recording with multiple levels of 0-1-0-3-0-5-0-7-0 (FIG. 5)

Then, deformation was observed by removing the protective layer of ultraviolet curable resin and the Ag reflective layer from the recorded write-once-read-many optical recording medium, washing out the organic thin film with ethanol, and observing the surface of substrate with a scanning electron microscope (SEM).

Figure 45:
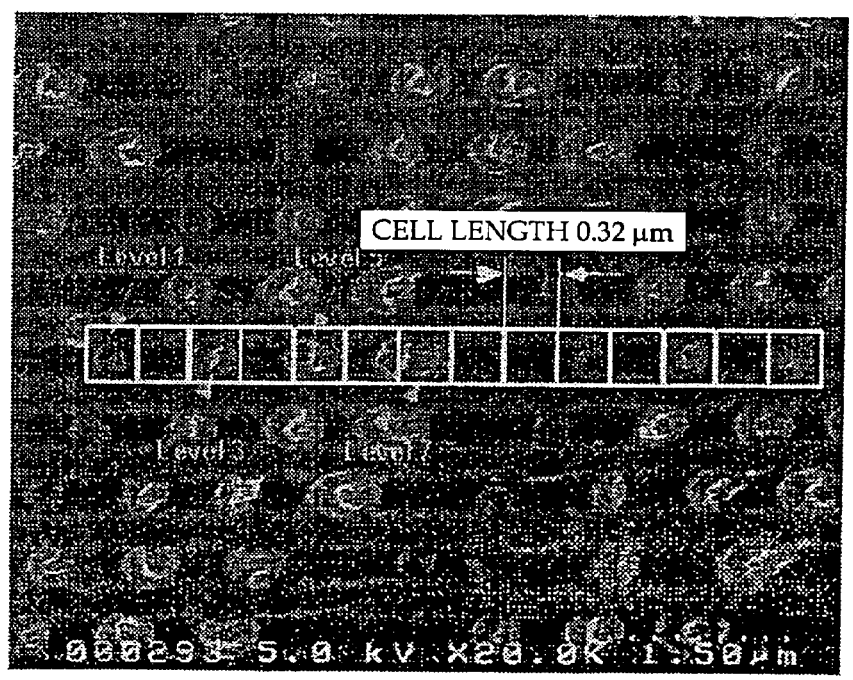
FIG. 45 is a scanning electron micrograph of deformation of a BiFeO surface of the write-once-read-many optical recording medium according to Comparative Example 2-4 at a cell length of 0.32 µm.
Figure 46:
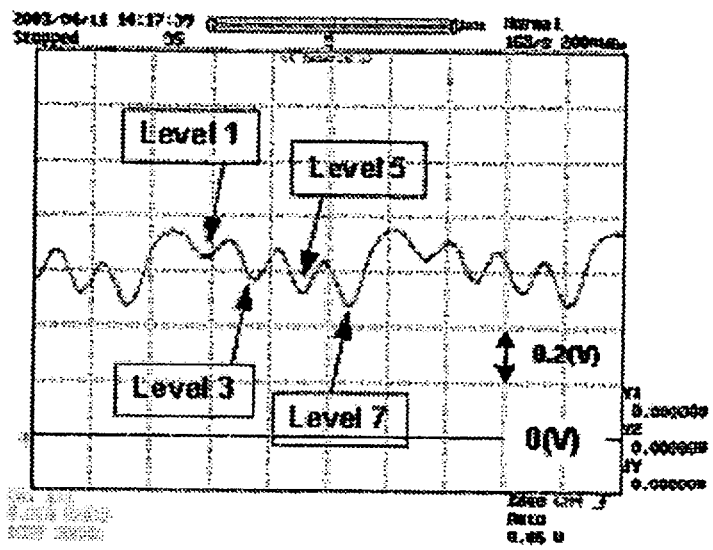
FIG. 46 is a diagram showing a reproducing signal obtained from a write-once-read-many optical recording medium according to Comparative Example 2-4 at a cell length of 0.32 µm.
Figure 47:
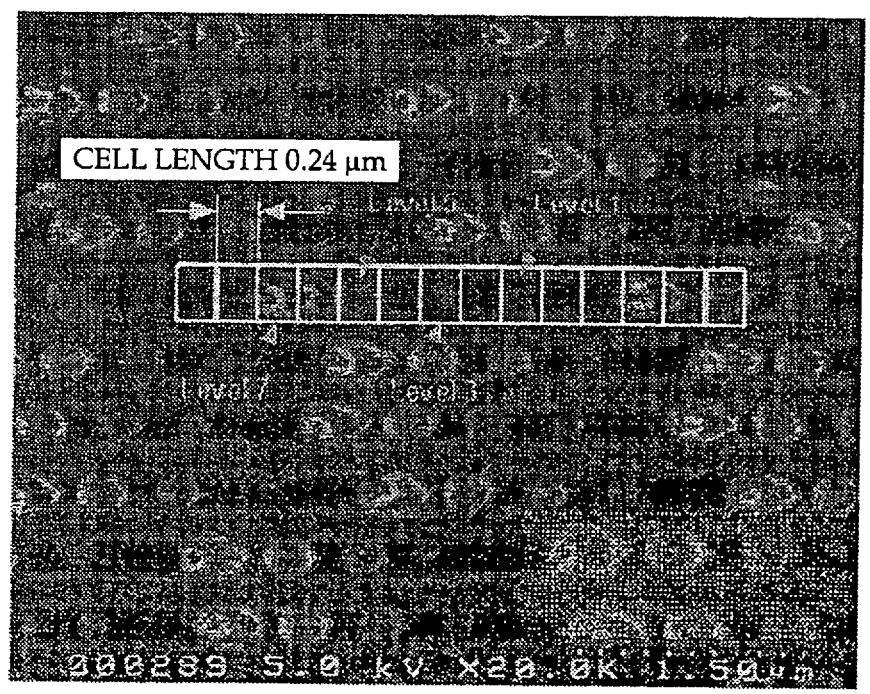
FIG. 47 is a scanning electron micrograph of deformation of a BiFeO surface of the write-once-read-many optical recording medium according to Comparative Example 2-4 at a cell length of 0.24 µm.
Figure 48:
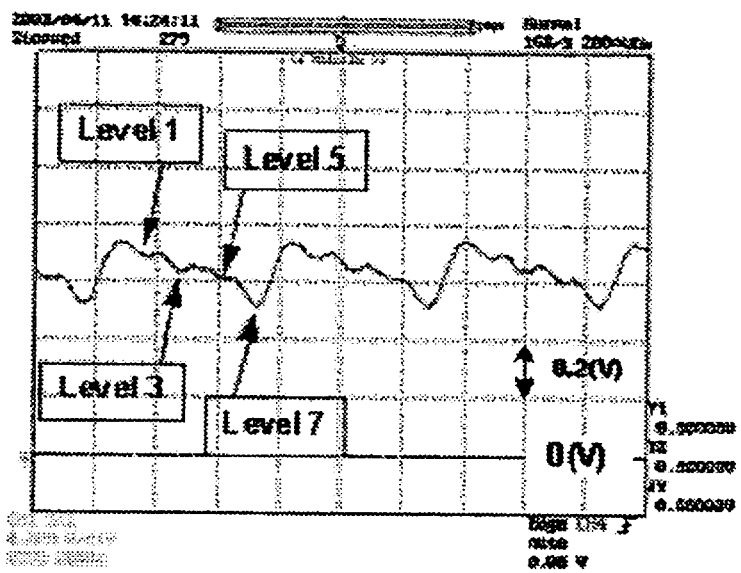
FIG. 48 is a diagram showing a reproducing signal obtained from a write-once-read-many optical recording medium according to Comparative Example 2-4 at a cell length of 0.24 µm.

FIGS. 45 and 46 illustrate a scanning electron micrograph and a reproducing signal, respectively, at a cell length of 0.32 μm; and FIGS. 47 and 48 illustrate a scanning electron micrograph and a reproducing signal, respectively, at a cell length of 0.24 μm.

These results show that recorded areas are formed with significant deformation in the conventional write-once-read-many optical recording medium, and interference among recording marks increases with a decreasing cell length (FIG. 47 wherein the mark with level 7 deforms due to thermal interference), to thereby yield reproducing signals at not clearly distinguishable multiple levels (FIG. 48), in contrast to the medium of the present invention (FIG. 44).

Example 2-32

Information was recorded on the write-once-read-many optical recording medium prepared in Example 2-23 by eight-level recording at a cell length of 0.24 μm under the following conditions.

Recording Conditions

Recording linear velocity: 3.0(m/s)

Recording pattern: repetitive recording with multiple levels of 0-1-0-3-0-5-0-7-0 (FIG. 5)

Figure 49:
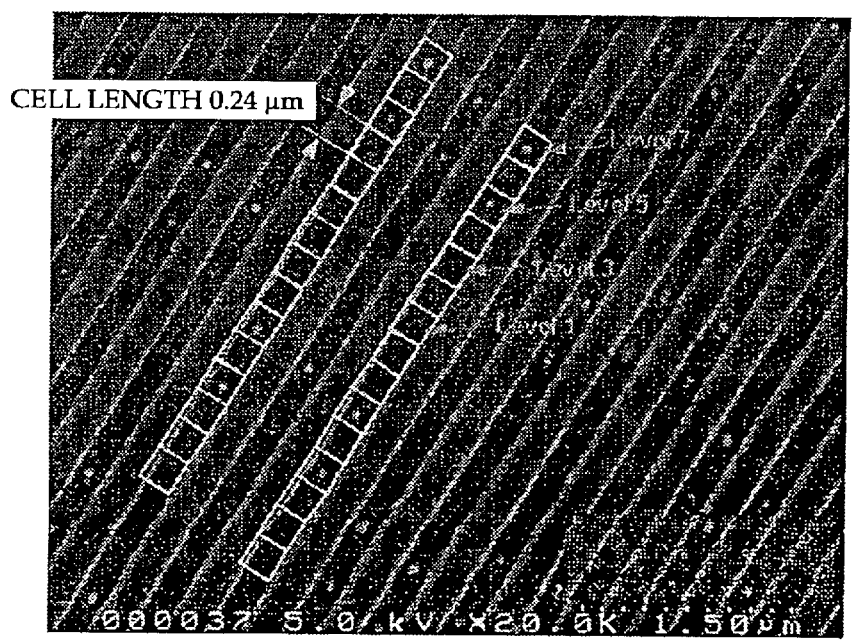
FIG. 49 is a scanning electron micrograph of deformation of a BiO surface of a write-once-read-many optical recording medium according to Example 2-32.
Figure 50:
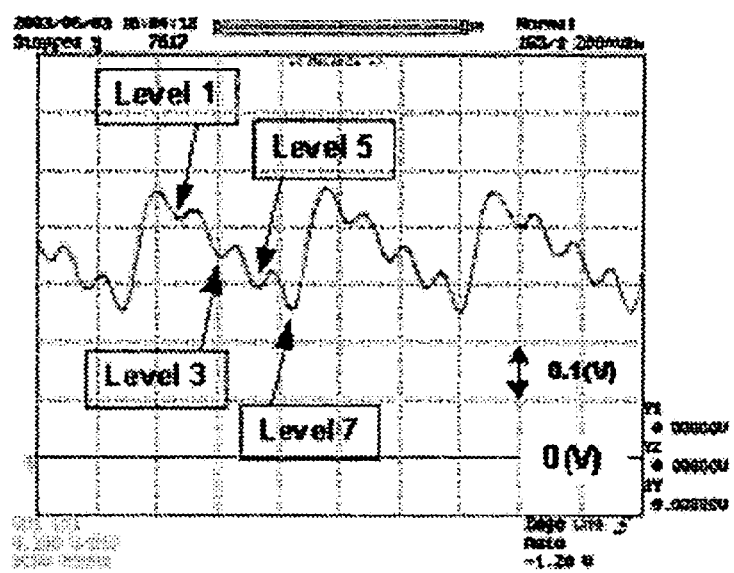
FIG. 50 is a diagram showing a reproducing signal obtained from a write-once-read-many optical recording medium according to Example 2-32.

Then, deformation was observed by removing the protective layer of ultraviolet curable resin and the Ag reflective layer from the recorded write-once-read-many optical recording medium, washing out the organic thin film with ethanol, and observing the surface of the BiO film with a scanning electron microscope (SEM). FIGS. 49 and 50 illustrate a scanning electron micrograph and a reproducing signal, respectively, at a cell length of 0.24 μm.

These results show that recorded areas are formed on the BiO thin film without significant deformation to thereby yield reproducing signals at clearly distinguished multiple levels. In this connection, slight deformation is observed in some areas but such areas have a very small size as compared with the cell length. In the above test, information was recorded in grooves by multi-level recording. It could also be satisfactorily recorded even in lands.

Example 2-33

A write-once-read-many optical recording medium according to the present invention was prepared in the following manner. On a polycarbonate substrate 0.6 mm thick with guide grooves 50 nm deep were sequentially formed a ZnS—SiO$_2$ thin film (second inorganic thin film, ZnS:SiO$_2$=85:15) 50 nm thick by sputtering; a BiO thin film (first inorganic thin film, target composition: Bi$_2$O$_3$) 20 nm thick by sputtering; an organic thin film comprising the colorant of Structural Formula (1) and having an average thickness of about 25 nm by spin coating; an Ag reflective layer 150 nm thick by sputtering; and a protective layer comprising an ultraviolet curable resin about 5 μm thick.

The colorant of Structural Formula (1) is for use in conventional DVD–R media and DVD+R media and has little absorption in blue-laser wavelengths.

Eight to sixteen modulation signals were recorded on the above-prepared optical recording medium under the following conditions using an optical disk checker DDU-1000 (a product of Pulstec Industrial Co., Ltd.; wavelength: 405 nm, numerical aperture NA: 0.65) according to a conventional binary recording procedure.

Recording Conditions

Recording linear density: cell length of 0.24 to 0.32 μm

Recording linear velocity: 5.0 m/s

Recording pattern: random pattern

Recording and reproduction were performed by the procedures under the conditions described in the following references (1), (2) and (3):

(1) A. Shimizu et al.: "Data Detection using Pattern Recognition for Multi-level Optical Recording", ISOM 2001 Technical Digest, Taipei, Taiwan, (October 2001), pp. 300–301;

(2) K. Sakagami et al.: "A New Data Modulation Process for Multi-level Optical Recording", ISOM/ODS 2002 Post-deadline Papers, Waikoloa, Hawaii, (July 2002), pp. 54–56; and (3) Y. Kadokawa et al.: "Multi-level Optical Recording Using a Blue Laser", ODS 2003 Technical Digest, Vancouver, BC Canada, (May 2003), pp. 294–296.

The properties in multi-level recording were evaluated based on sigma to dynamic range SDR. SDR is determined by calculation according to following Equation (1):

$$SDR = \frac{\sum_{k=0}^{n} \sigma_K}{DR \times n} \quad (1)$$

wherein $\sigma_K$ is a standard deviation at each level; DR is a dynamic range, i.e., the difference between the central value of a level with the maximum reflection level and the central value of another level with the minimum reflection level; and n is the number of multiple levels.

SDR must be 3.2% or less to perform recording at a bit error rate BER of $10^{-5}$ or less as described in the above references. Based on this precondition, SDR was determined at different cell lengths.

Figure 63:
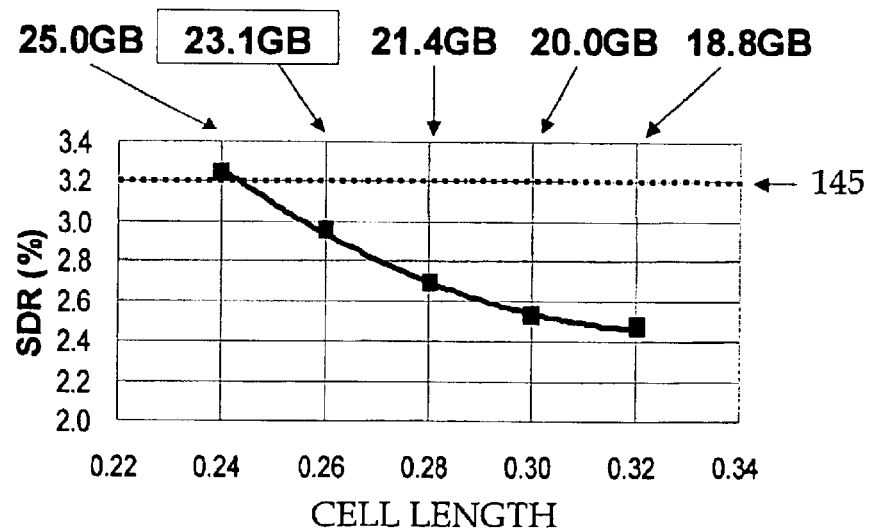
FIG. 63 is a diagram showing the sigma to dynamic range (SDR) at different cell lengths in multi-level recording on a write-once-read-many optical recording medium according to Example 2-33.

FIG. 63 shows recording capacities at different cell lengths. The broken line 145 in FIG. 63 represents a required level of SDR. Namely, SDR must be equal to or lower than this level. With reference to FIG. 63, SDR is 3.2% or less at cell lengths more than (longer than) about 0.24 μm, showing that information can be recorded at a very large capacity of 23 GB or more (single layer) on the write-once-read-many optical recording media of the present invention by multi-level recording, even in a system using a substrate 0.6 mm thick and an objective lens with numerical aperture NA of 0.65.

The present inventors know no other equivalents in which information can be recorded at a very large capacity of 23 GB or more (single layer) by multi-level recording, in a system using a substrate 0.6 mm thick and an objective lens with numerical aperture NA of 0.65.

Another test has revealed that information can be recorded at a very large capacity of 23 GB or more (single layer) on the write-once-read-many optical recording media of the present invention by multi-level recording, even in a system using a substrate 0.1 mm thick and an objective lens with numerical aperture NA of 0.85.

The present example shows an example of test results and is not intended to limit the recording capacity of the write-once-read-many optical recording media according to the present invention to 23 GB.

Example 2-34

A write-once-read-many optical recording medium was prepared by the procedure of Example 2-1-1, except for using $MoO_3$ instead of BiFeO as the first inorganic thin film, and a recording pattern was recorded thereon by the procedure of Example 2-30. The resulting recording waveform was similar to that of Example 2-30.

Example 2-35

A write-once-read-many optical recording medium was prepared by the procedure of Example 2-1-1, except for using $V_2O_5$ instead of BiFeO as the first inorganic thin film, and a recording pattern was recorded thereon by the procedure of Example 2-30. The resulting recording waveform was similar to that of Example 2-30.

Example 2-36

Information was recorded and reproduced on the write-once-read-many optical recording medium prepared in Example 2-1 by a PR (1,2,1) system at such a recording linear density as to yield a minimum mark length of 0.205 μm.

The medium had a bit error rate (BER) on the order of $10^{-5}$ when the signals were decoded by the PRML system, showing that information can be recorded and reproduced on the medium very satisfactorily.

Example 2-37

Information was recorded and reproduced on the write-once-read-many optical recording medium prepared in Example 2-23 by a PR (1,2,1) system at such a recording linear density as to yield a minimum mark length of 0.205 μm.

The medium had a bit error rate (BER) on the order of $10^{-5}$ when the signals were decoded by the PRML system, showing that information can be recorded and reproduced on the medium very satisfactorily.

Comparative Example 2-5

Information was recorded and reproduced on the write-once-read-many optical recording medium prepared in Comparative Example 2-1 by a PR (1,2,1) system at such a recording linear density as to yield a minimum mark length of 0.205 μm.

The medium showed a jitter exceeding 20% in regular binary recording and had a bit error rate (BER) on the order of $10^{-3}$ when the signals were decoded by the PRML system, showing that information cannot be recorded and reproduced on the medium at this recording linear density even by the PRML system.

Example 2-38

Figure 51:
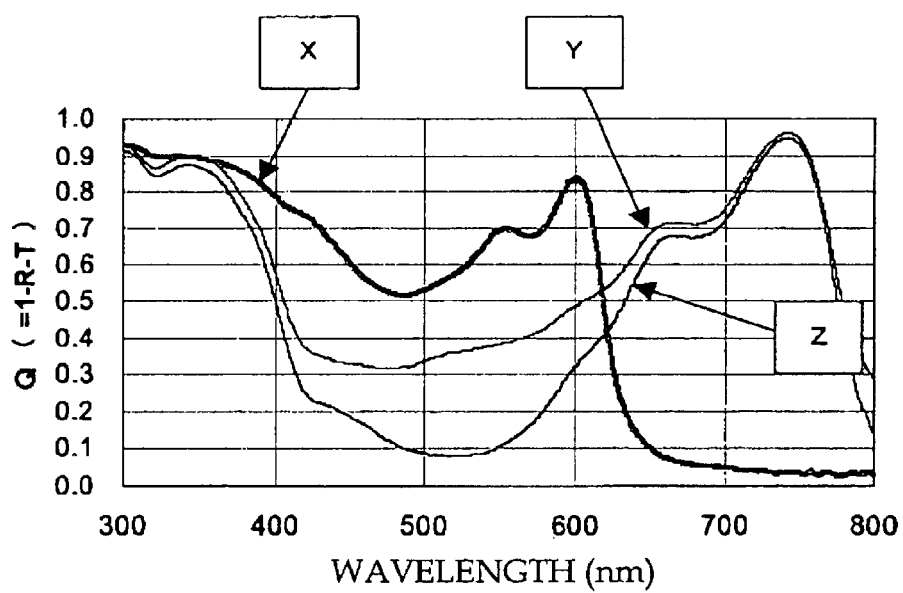
FIG. 51 is a diagram showing absorption factors Q of write-once-read-many optical recording media according to Example 2-1-1 and Comparative Example 2-1 and of a commercially available CD-R medium.

The absorption factor Q of the write-once-read-many optical recording medium prepared in Example 2-1 was determined (FIG. 51). More specifically, the reflectance R and the transmittance T of the optical recording medium were measured, and the absorption factor Q (X in FIG. 51) was calculated as 1-R-T.

For comparison, the absorption factors Q of a commercially available CD-R medium (Z in FIG. 51) using a phthalocyanine compound on which information can be recorded and reproduced even at blue-laser wavelengths and of the write-once-read-many optical recording medium prepared in Comparative Example 2-1 (Y in FIG. 51) were determined by the above procedure. In this connection, information cannot be recorded and reproduced on the commercially available CD-R medium using the phthalocyanine compound as intact at such a track pitch and thickness of the substrate as to be applied to the tester for tests at blue-laser wavelengths. However, information was recorded and reproduced on the commercially available CD-R medium using the tester for test at blue-laser wavelengths by breaking the medium, dissolving the phthalocyanine compound in a solvent to give a solution, and applying the solution to a substrate sensitive to blue-laser wavelengths.

With reference to FIG. 51, the write-once-read-many optical recording medium according to the present invention has a very little variation of absorption factor Q at wavelengths of 500 nm or less, typically at wavelengths around 400 nm.

These results show that the write-once-read-many optical recording media of the present invention have little variation in recording properties such as recording sensitivity, degree of modulation, jitter and error rate and in reflectance with varying recording-reproducing wavelengths.

Example 2-39

The absorption factor Q of the write-once-read-many optical recording medium prepared in Example 2-23 was determined by the procedure of Example 2-38. More specifically, the reflectance R and the transmittance T of the optical recording medium were measured, and the absorption factor Q (W in FIG. 52) was calculated as 1-R-T. The symbols Y and Z in FIG. 52 have the same meanings as in Example 2-38.

Figure 52:
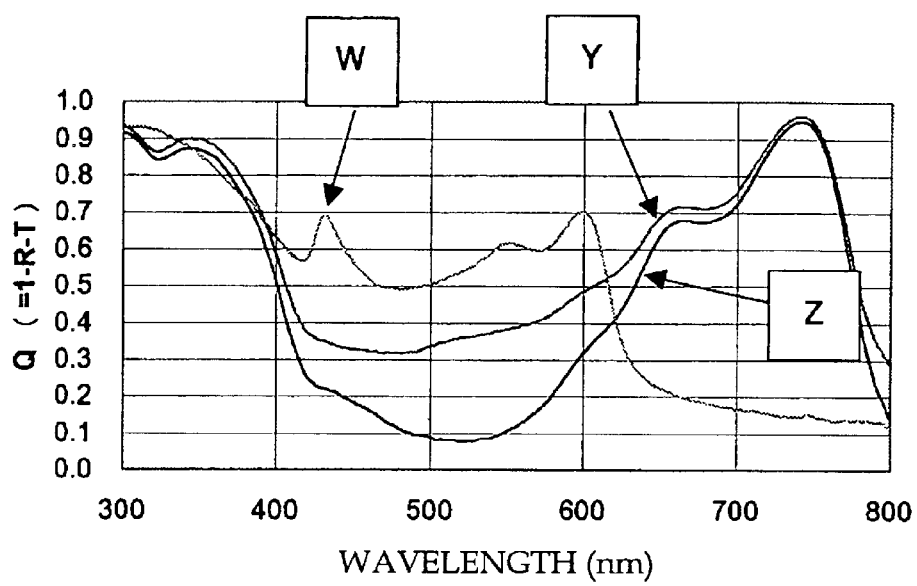
FIG. 52 is a diagram showing absorption factors Q of write-once-read-many optical recording media according to Example 2-23 and Comparative Example 2-1 and of a commercially available CD-R medium.

With reference to FIG. 52, the write-once-read-many optical recording medium according to the present invention has a very little variation of absorption factor Q at wavelengths of 500 nm or less, typically at wavelengths around 400 nm.

These results show that the write-once-read-many optical recording media of the present invention have little variation in recording properties such as recording sensitivity, degree of modulation, jitter and error rate and in reflectance with varying recording-reproducing wavelengths.

Example 240

To verify on which mechanisms recording marks are formed on the write-once-read-many optical recording media according to Example 2-1-1 and Example 2-1-2 and to verify whether or not the two recording mechanisms are different, a test was conducted.

Specifically, a recorded area of the write-once-read-many optical recording medium prepared in Example 2-1-1 and Example 2-1-2 was cut by a focused ion beam (FIB) micromachine and was observed with a transmission electron microscope (TEM).

Figure 54:
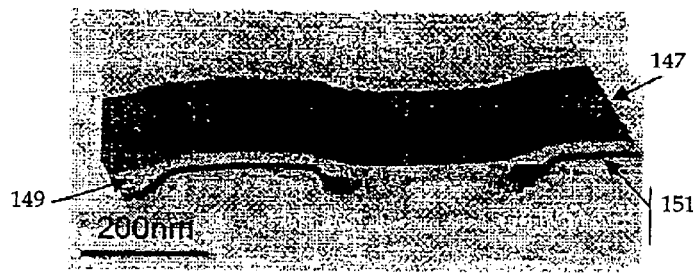
FIG. 54 is a transmission electron micrograph of a recorded area of a write-once-read-many optical recording medium according to Example 2-1-2 as a specimen cut in a radius direction by focused ion beam (FIB).

In the write-once-read-many optical recording medium according to Example 2-1-2, the BiFeO thin film in a recording mark with an rapidly increased degree of modulation by recording at a recording power higher than the minimum jitter significantly deformed and broken (FIG. 54), showing the significant deformation and breakage lead to increased jitter and decreased recording power margin. In FIG. 54, reference number 147 designates Ag reflective later, 149 organic thin film, and 151 BiFeO thin film.

Figure 53:
FIG. 53 is a transmission electron micrograph of a recorded area of a write-once-read-many optical recording medium according to Example 2-1-1 as a specimen cut in a radius direction by focused ion beam (FIB).

In contrast in the write-once-read-many optical recording medium according to Example 2-1-1, the BiFeO thin film does neither deform nor break in a recording mark (FIG. 53). In FIG. 53, reference number 153 designates Ag reflective later, 155 organic thin film, 157 BiFeO thin film, and 159 ZnS—SiO$_2$ thin film.

In addition, the interface between the BiFeO thin film 157 (the first inorganic thin film) and the ZnS—SiO$_2$ thin film 159 (the second inorganic thin film) becomes unclear, and the organic thin film 155 has some cavities, indicating that information is recorded by the aforementioned mechanisms according to the present invention.

These results show that information is recorded according to the present invention not mainly based on deformation.

Example 2-41

To verify on which recording mechanism the recorded area was formed on the write-once-read-many optical recording medium according to Example 2-31 at a cell length of 0.24 µm, the cross section of the recorded area was cut by a focused ion beam (FIB) micromachine and was observed with a transmission electron microscope (TEM) by the procedure of Example 2-40.

Figure 55:
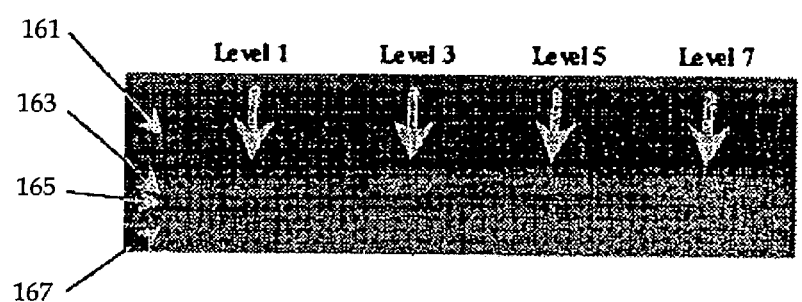
FIG. 55 is a transmission electron micrograph of a recorded area of a write-once-read-many optical recording medium according to Example 2-31 as a specimen cut in a guide groove direction by focused ion beam (FIB).

The results are shown in FIG. 55, indicating that recording marks are formed based on degradation-degeneration and cubical expansion of the organic thin film 163 (colorant layer), fine deformation of the BiFeO layer 165 and ZnS—SiO$_2$ layer 167, and conversion of the interface between these layers into an unclear interface due to fusing, mixing and/or diffusion of constitutional elements of the two layers. Here, reference number 161 designates the Ag reflective layer.

In addition, electron diffraction analysis shows that crystallization occurs and crystals are formed in the recorded area, indicating that information is recorded by the aforementioned mechanisms according to the present invention.

Example 2-42

A write-once-read-many optical recording medium according to the present invention was prepared in the following manner. On a polycarbonate substrate 0.6 mm thick with guide grooves 50 nm deep were sequentially formed a BiO thin film (first inorganic thin film; target composition: Bi$_2$O$_3$) about 10 nm thick and a ZnS—SiO$_2$ thin film (second inorganic thin film) about 100 nm thick by sputtering.

On the ZnS—SiO$_2$ thin film were sequentially formed an Ag reflective layer about 150 nm thick by sputtering and a protective layer comprising an ultraviolet curable resin to give the write-once-read-many optical recording medium.

Signals were recorded on the prepared write-once-read-many optical recording medium by single track procedure at a mark length of about 0.89 µm. The cross section of the recorded area was cut by a focused ion beam (FIB) micromachine and was observed with a transmission electron microscope (TEM) by the procedure of Example 2-40.

Figure 56:
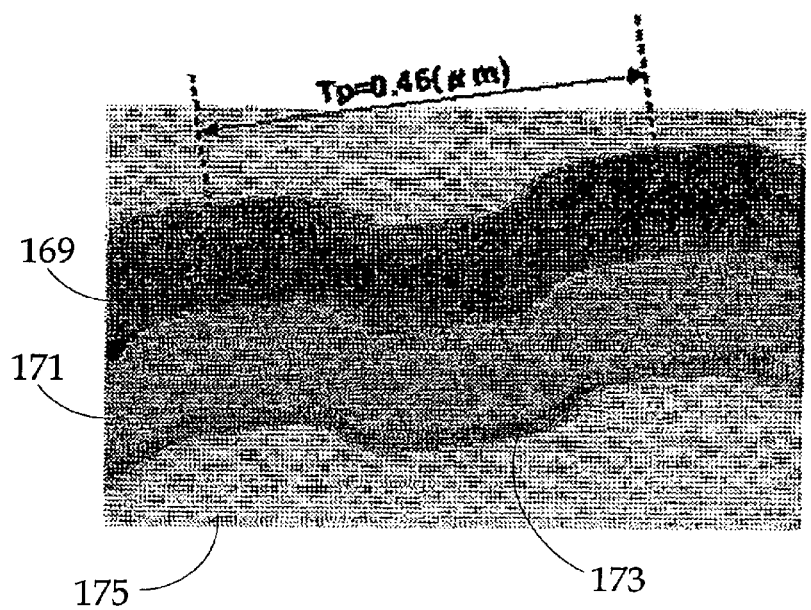
FIG. 56 is a transmission electron micrograph of an unrecorded area of a write-once-read-many optical recording medium according to Example 2-42 as a specimen cut in a radius direction by focused ion beam (FIB).
Figure 57:
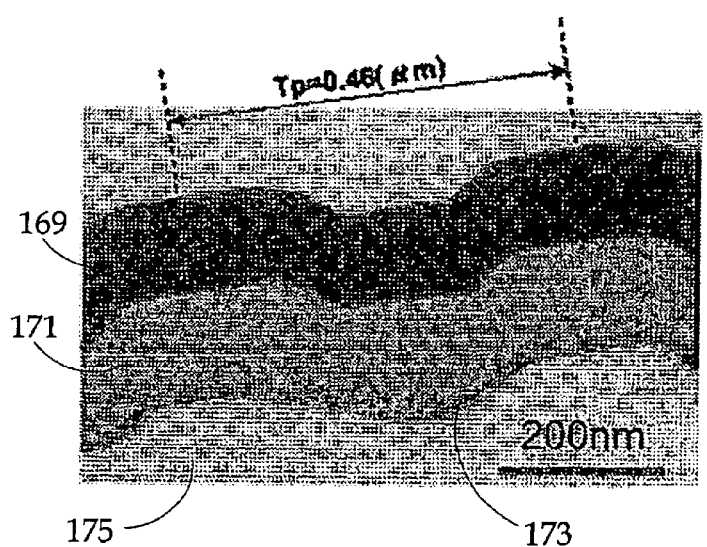
FIG. 57 is a transmission electron micrograph of a recorded area of a write-once-read-many optical recording medium according to Example 2-42 as a specimen cut in a radius direction by focused ion beam (FIB).

FIGS. 56 and 57 are cross sectional transmission electron micrographs of an unrecorded area and a recorded area, respectively. In these figures, BiO layer 173, ZnS—SiO$_2$ layer 171, and Ag reflective layer 169 are formed in this order on substrate 175. These results show that recording marks are formed based on fine deformation of the BiO layer and ZnS—SiO$_2$ layer, and conversion of the interface between the two layers into an unclear interface due to fusing, mixing and/or diffusion of constitutional elements of the two layers.

In addition, electron diffraction analysis shows that crystallization occurs and crystals are formed in the recorded area, indicating that information is recorded by the aforementioned mechanisms according to the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A write-once-read-many optical recording medium comprising:
   a first inorganic thin film; and
   at least one of a second inorganic thin film and an organic thin film,
   wherein the first inorganic thin film comprises at least "R" and "O," wherein "R" represents at least one element selected from the group consisting of Y, Bi, In, Mo, V and lanthanum series elements; and "O" represents oxygen atom, and
   the second inorganic thin film and the organic thin film are capable of suppressing at least one of deformation and breakage of the first inorganic thin film and receiving the change of state of the first inorganic thin film.

2. A write-once-read-many optical recording medium according to claim 1, wherein the change of state is at least one selected from the group consisting of fusing, change of composition, diffusion, change of crystalline state, oxidation and reduction.

3. A write-once-read-many optical recording medium according to claim 1, wherein the first inorganic thin film further comprises an element "M," wherein the element "M" is at least one selected from the group consisting of Al, Cr, Mn, Sc, In, Ru, Rh, Co, Fe, Cu, Ni, Zn, Li, Si, Ge, Zr, Ti, Hf, Sn, Pb, Mo, V and Nb.

4. A write-once-read-many optical recording medium according to claim 3, wherein the first inorganic thin film has a composition represented by R$_x$M$_y$O, wherein "x" and "y" are atomic ratios and satisfy the following condition: $[x/(x+y)] \geq 0.3$; and "M" represents the element "M."

5. A write-once-read-many optical recording medium according to claim 1, wherein the first inorganic thin film comprises the element "R" as an oxide of "R" (RO) and as another form than the oxide.

6. A write-once-read-many optical recording medium according to claim 3, wherein the first inorganic thin film comprises the element "M" as an oxide of "M" (MO) and the element "R" as another form than an oxide.

7. A write-once-read-many optical recording medium according to claim 3, wherein the first inorganic thin film comprises the element "M" as an oxide of "M" (MO) and the element "R" as an oxide of "R" (RO).

8. A write-once-read-many optical recording medium according to claim 3, wherein the first inorganic thin film comprises the element "M" as an oxide of "M" (MO) and the element "R" as an oxide of "R" (RO) and as another form than the oxide.

9. A write-once-read-many optical recording medium according to claim 1, wherein the first inorganic thin film comprises a bismuth oxide.

10. A write-once-read-many optical recording medium according to claim 1, wherein the first inorganic thin film comprises elementary bismuth and a bismuth oxide.

11. A write-once-read-many optical recording medium according to claim 3, wherein the first inorganic thin film has a composition represented by $Bi_a(4B)_bO_d$, wherein "4B" represents at least one of Group 4B elements of the Periodic Table of Elements; and "a," "b" and "d" are atomic percentages and satisfy the following conditions: $10 \leq a \leq 40$, $3 \leq b \leq 20$, $50 \leq d \leq 70$.

12. A write-once-read-many optical recording medium according to claim 11, wherein the at least one Group 4B element is at least one of Si and Ge.

13. A write-once-read-many optical recording medium according to claim 3, wherein the first inorganic thin film has a composition represented by $Bi_a(4B)_bX_cO_d$, wherein "4B" represents at least one of Group 4B elements of the Periodic Table of Elements; "X" represents at least one element selected from the group consisting of Al, Cr, Mn, In, Co, Fe, Cu, Ni, Zn, Ti and Sn; and "a," "b," "c," and "d" are atomic percentages and satisfy the following conditions: $10 \leq a \leq 40$, $3 \leq b \leq 20$, $3 \leq c \leq 20$, $50 \leq d \leq 70$.

14. A write-once-read-many optical recording medium according to claim 13, wherein the at least one Group 4B element is at least one of Si and Ge.

15. A write-once-read-many optical recording medium according to claim 1, wherein the organic thin film has a major absorption band at wavelengths longer than wavelengths at which information is at least one of recorded and reproduced.

16. A write-once-read-many optical recording medium according to claim 15, wherein the organic thin film has a complex refractive index with an imaginary part smaller than that of the first inorganic thin film at the wavelengths at which information is at least one of recorded and reproduced.

17. A write-once-read-many optical recording medium according to claim 15, wherein the organic thin film has an absorption band not belonging to the major absorption band in the vicinity of the wavelengths at which information is at least one of recorded and reproduced.

18. A write-once-read-many optical recording medium according to claim 1, wherein the second inorganic thin film comprises at least one of ZnS and ZnS—$SiO_2$.

19. A write-once-read-many optical recording medium according to claim 1, wherein the first inorganic thin film is arranged between the second inorganic thin film and the organic thin film.

20. A write-once-read-many optical recording medium according to claim 1, further comprising at least one of a substrate, a reflective layer and a cover layer.

21. A write-once-read-many optical recording medium according to claim 20, comprising at least the substrate, the first inorganic thin film, the organic thin film and the reflective layer arranged in this order.

22. A write-once-read-many optical recording medium according to claim 20, comprising at least the substrate, the organic thin film, the first inorganic thin film and the reflective layer arranged in this order.

23. A write-once-read-many optical recording medium according to claim 20, comprising at least the substrate, the reflective layer, the first inorganic thin film, the organic thin film and the cover layer arranged in this order.

24. A write-once-read-many optical recording medium according to claim 20, comprising at least the substrate, the reflective layer, the organic thin film, the first inorganic thin film and cover layer arranged in this order.

25. A write-once-read-many optical recording medium according to claim 20, comprising at least the substrate, the second inorganic thin film, the first inorganic thin film, the organic thin film and the reflective layer arranged in this order.

26. A write-once-read-many optical recording medium according to claim 20, comprising at least the substrate, the organic thin film, the first inorganic thin film, the second inorganic thin film and the reflective layer arranged in this order.

27. A write-once-read-many optical recording medium according to claim 20, comprising at least the substrate, the first inorganic thin film, the second inorganic thin film and the reflective layer arranged in this order.

28. A write-once-read-many optical recording medium according to claim 20, comprising at least the substrate, the reflective layer, the second inorganic thin film, the first inorganic thin film, the organic thin film and the cover layer arranged in this order.

29. A write-once-read-many optical recording medium according to claim 20, comprising at least the substrate, the reflective layer, the organic thin film, the first inorganic thin film, the second inorganic thin film and the cover layer arranged in this order.

30. A write-once-read-many optical recording medium according to claim 20, comprising at least the substrate, the reflective layer, the second inorganic thin film, the first inorganic thin film and the cover layer arranged in this order.

31. A write-once-read-many optical recording medium according to claim 1, on which recording marks capable of yielding reproducing signals at three or more levels can be formed and the types of the recording marks can be identified based on the reproducing signal levels.

32. A write-once-read-many optical recording medium according to claim 1, on which information can be at least one of recorded and reproduced according to a partial response maximum likelihood (PRML) signal processing system.

33. A write-once-read-many optical recording medium according to claim 1, on which recording marks can be formed by the photoabsorption function of the first inorganic thin film through at least one of the following (1) to (11):

(1) deforming at least one of the first inorganic thin film and the second inorganic thin film;

(2) changing the complex refractive index of at least one of the first inorganic thin film and the second inorganic thin film;

(3) changing the composition of at least one of the first inorganic thin film and the second inorganic thin film;

(4) fusing the first inorganic thin film;

(5) diffusing constitutional elements of the first inorganic thin film into at least one of the second inorganic thin film and the organic thin film;

(6) changing at least one of the crystalline state and crystalline structure of the first inorganic thin film;

(7) at least one of oxidizing and reducing a constitutional element of the first inorganic thin film;

(8) changing the composition distribution of the first inorganic thin film;

(9) changing the volume of the organic thin film;

(10) changing the complex refractive index of the organic thin film; and

(11) forming cavities in the organic thin film.

34. A write-once-read-many optical recording medium according to claim 33, on which recording marks capable of yielding reproducing signals at three or more different levels can be formed in a plane direction and a thickness direction of at least one of the first inorganic thin film and the organic thin film.

35. A write-once-read-many optical recording medium according to claim 33, on which recording marks capable of yielding reproducing signals at three or more different levels can be formed in a plane direction and a thickness direction of at least one of the first inorganic thin film and the second inorganic thin film.

36. A write-once-read-many optical recording medium according to claim 1, on which information can be at least one of recorded and reproduced using light at a wavelength of 500 nm or less.

37. A process for recording and reproducing information on a write-once-read-many optical recording medium, the write-once-read-many optical recording medium comprising:

a first inorganic thin film; and at least one of a second inorganic thin film and an organic thin film, wherein the first inorganic thin film comprises at least "R" and "O," wherein "R" represents at least one selected from the group consisting of Y, Bi, In, Mo, V and lanthanum series elements; and "O" represents oxygen atom, and the second inorganic thin film and the organic thin film are capable of suppressing at least one of deformation and breakage of the first inorganic thin film and receiving the change of state of the first inorganic thin film, the process comprising forming a recorded area by the photoabsorption function of at least one of the first inorganic thin film and the organic thin film at wavelengths at which at least one of recording and reproduction is performed.

38. A process for recording and reproducing information according to claim 37, further comprising:

forming recording marks capable of yielding reproducing signals at three or more different levels; and identifying the types of the recording marks based on the reproducing signal levels.

39. A process for recording and reproducing information according to claim 37, further comprising at least one of recording and reproducing information on the medium according to a partial response maximum likelihood (PRML) signal processing system.

40. A process for recording and reproducing information according to claim 37, further comprising forming recording marks by the photoabsorption function of the first inorganic thin film through at least one of the following (1) to (11):

(1) deforming at least one of the first inorganic thin film and the second inorganic thin film;

(2) changing the complex refractive index of at least one of the first inorganic thin film and the second inorganic thin film;

(3) changing the composition of at least one of the first inorganic thin film and the second inorganic thin film;

(4) fusing the first inorganic thin film;

(5) diffusing constitutional elements of the first inorganic thin film into at least one of the second inorganic thin film and the organic thin film;

(6) changing at least one of the crystalline state and crystalline structure of the first inorganic thin film;

(7) at least one of oxidizing and reducing a constitutional element of the first inorganic thin film;

(8) changing the composition distribution of the first inorganic thin film;

(9) changing the volume of the organic thin film;

(10) changing the complex refractive index of the organic thin film; and

(11) forming cavities in the organic thin film.

41. A process for recording and reproducing information according to claim 37, further comprising forming recording marks in a plane direction and a thickness direction of at least one of the first inorganic thin film and the organic thin film, the recording marks being capable of yielding reproducing signals at three or more different levels.

42. A process for recording and reproducing information according to claim 37, further comprising forming recording marks in a plane direction and a thickness direction of at least one of the first inorganic thin film and the second inorganic thin film, the recording marks being capable of yielding reproducing signals at three or more different levels.

43. A process for recording and reproducing information according to claim 37, further comprising at least one of recording and reproducing information on the medium using light at a wavelength of 500 nm or less.

* * * * *